United States Patent [19]

Ishikawa et al.

[11] Patent Number: 5,678,369
[45] Date of Patent: Oct. 21, 1997

[54] REFRACTORY/HEAT INSULATING PANELS

[75] Inventors: Takashi Ishikawa; Hideki Takiguchi; Fumio Takahashi; Minoru Saitoh; Hiroaki Konta; Takanobu Niizeki; Masahiko Suzuki; Hiroyuki Umetsu; Yoshihiko Kanno; Toshihide Kokubun, all of Yamagata, Japan

[73] Assignee: IG-Technical Research Inc., Yamagata, Japan

[21] Appl. No.: 290,945

[22] PCT Filed: Jun. 15, 1993

[86] PCT No.: PCT/JP93/00804

§ 371 Date: Aug. 24, 1994

§ 102(e) Date: Aug. 24, 1994

[87] PCT Pub. No.: WO94/15033

PCT Pub. Date: Apr. 7, 1994

[30] Foreign Application Priority Data

| Dec. 28, 1992 | [JP] | Japan | 4-360233 |
| Jan. 29, 1993 | [JP] | Japan | 5-034286 |
| Feb. 9, 1993 | [JP] | Japan | 5-045874 |
| Feb. 9, 1993 | [JP] | Japan | 5-045875 |
| Feb. 9, 1993 | [JP] | Japan | 5-045876 |
| Feb. 17, 1993 | [JP] | Japan | 5-053062 |

[51] Int. Cl.$^6$ .................. E04B 2/58; E04C 2/292
[52] U.S. Cl. .......... 52/309.9; 52/309.7; 52/478; 52/489.1; 52/592.1; 52/714; 52/781; 52/792.1; 52/794.1
[58] Field of Search ............ 52/309.2, 309.9, 52/309.14, 592.1, 592.4, 589.1, 588.1, 478, 489.1, 773, 774, 781, 714, 309.7, 309.16, 712

[56] References Cited

U.S. PATENT DOCUMENTS

| 3,501,883 | 3/1970 | Birum, Jr. . | |
| 3,560,285 | 2/1971 | Schroter et al. . | |
| 3,815,657 | 6/1974 | Malek et al. | 52/309.2 |
| 4,104,840 | 8/1978 | Heintz et al. | 52/309.9 |
| 4,109,436 | 8/1978 | Berloty | 52/309.2 |
| 4,843,779 | 7/1989 | Whitney, Jr. . | |
| 4,981,003 | 1/1991 | McCarthy | 52/309.7 |

FOREIGN PATENT DOCUMENTS

| 0 286 052 | 4/1988 | European Pat. Off. . |
| 2 332 391 | 11/1976 | France . |
| 51-137912 | 11/1976 | Japan . |
| 57-30349 | 7/1982 | Japan . |
| 57-185535 | 11/1982 | Japan . |

(List continued on next page.)

OTHER PUBLICATIONS

"Announcement from The Ministry of Construction", Japan.

*Primary Examiner*—Michael Safavi
*Attorney, Agent, or Firm*—Lowe, Price, Leblanc & Becker

[57] ABSTRACT

Disclosed is a refractory/heat insulating panel used in buildings and structures which must have a refractory performance. In the refractory/heat insulating panel (801), the mechanical strength and the fireproofing performance at the joint portions, which are weak portions in the panel, are increased by integrally forming inorganic boards (831) in the male and female joint portions (832, 836), filling a light-weight aggregate in the core material located at the male and female joint portions at a high density, or making the density of the core material at the joint portions higher than that at the center of the panel. Further, a nonwoven fabric is inserted between a core material (829) and a surfacing material (802) and between the core material (829) and a backing material (822), the surfaces of the surfacing material and the backing material facing the core material are embossed, a layer of isocyanurate foam and/or a layer of polyurethane foam are provided in the core material, or a wooden reinforcing material or a pipe-shaped member is buried in the core material to improve the adhesion between the core material and the surfacing material and between the core material and the backing material, the strength of the entire panel, refractory performance, etc. These structures also increase the strength and the refractory performance of the joint portions.

14 Claims, 58 Drawing Sheets

FOREIGN PATENT DOCUMENTS

| | | |
|---|---|---|
| 58-1538 | 1/1983 | Japan . |
| 59-89989 | 6/1984 | Japan . |
| 60-87946 | 6/1985 | Japan . |
| 62-10359 | 1/1987 | Japan . |
| 63-15444 | 4/1988 | Japan . |
| 63-185613 | 8/1988 | Japan . |
| 1-284658 | 11/1989 | Japan . |
| 1-290867 | 11/1989 | Japan . |
| 2-18230 | 4/1990 | Japan . |
| 4-202960 | 7/1992 | Japan . |
| 4-237756 | 8/1992 | Japan . |
| 5-31843 | 2/1993 | Japan . |
| 2 176 439 | 12/1986 | United Kingdom . |

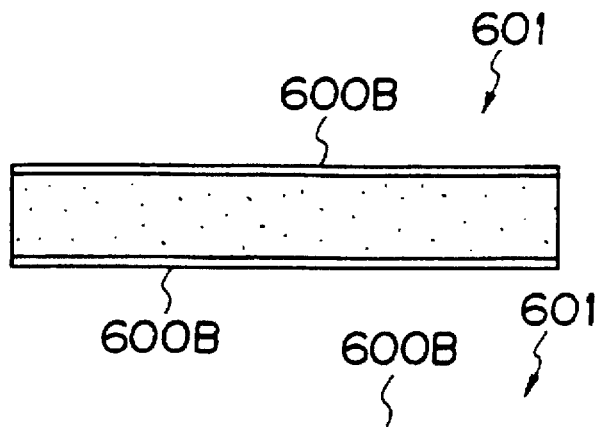
FIG. 29 (a)
FIG. 29 (b)
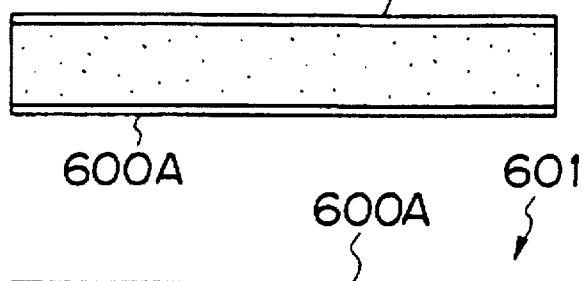
FIG. 29 (c)
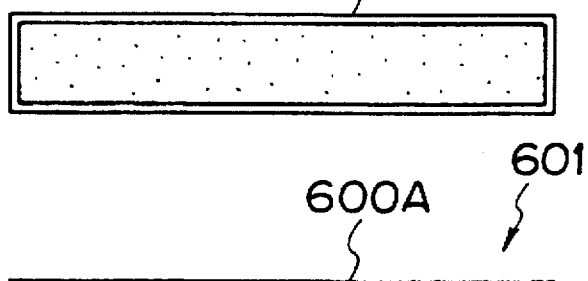
FIG. 29 (d)
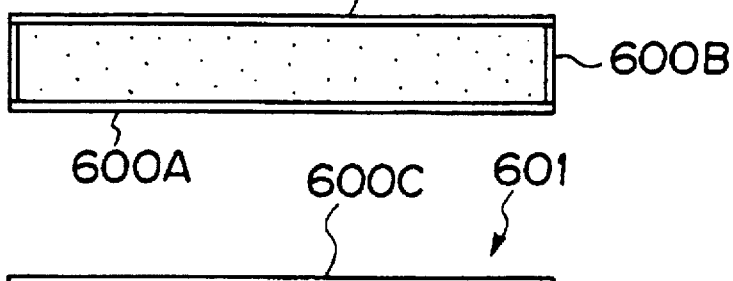
FIG. 29 (e)
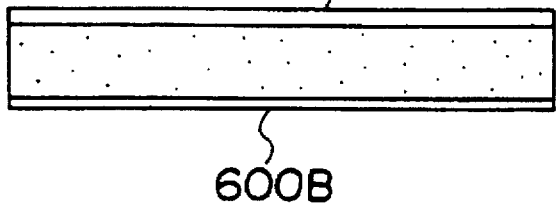

FIG. 46 (a)
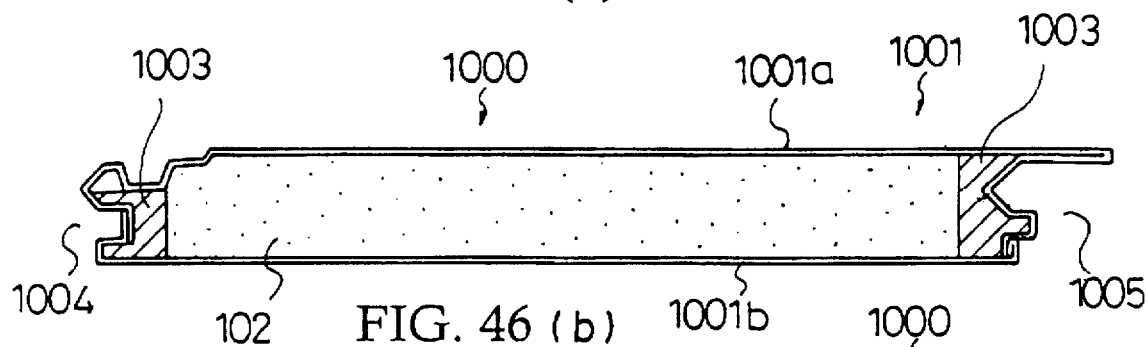
FIG. 46 (b)
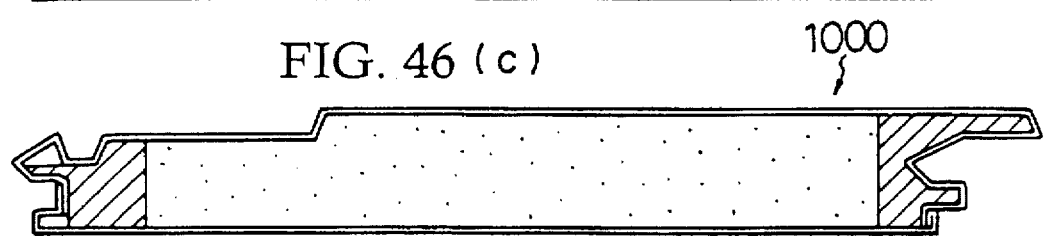
FIG. 46 (c)
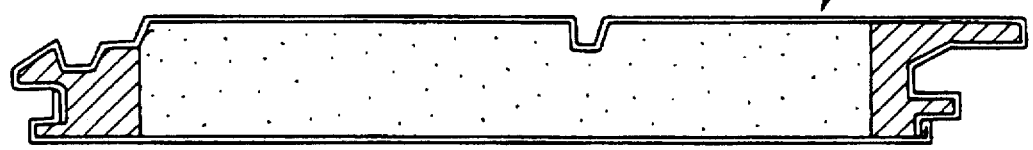
FIG. 46 (d)
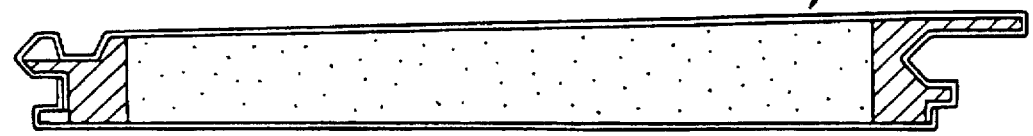
FIG. 46 (e)
FIG. 46 (f)
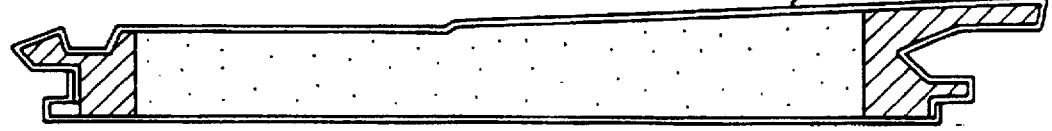
FIG. 46 (g)

FIG. 49 (a)
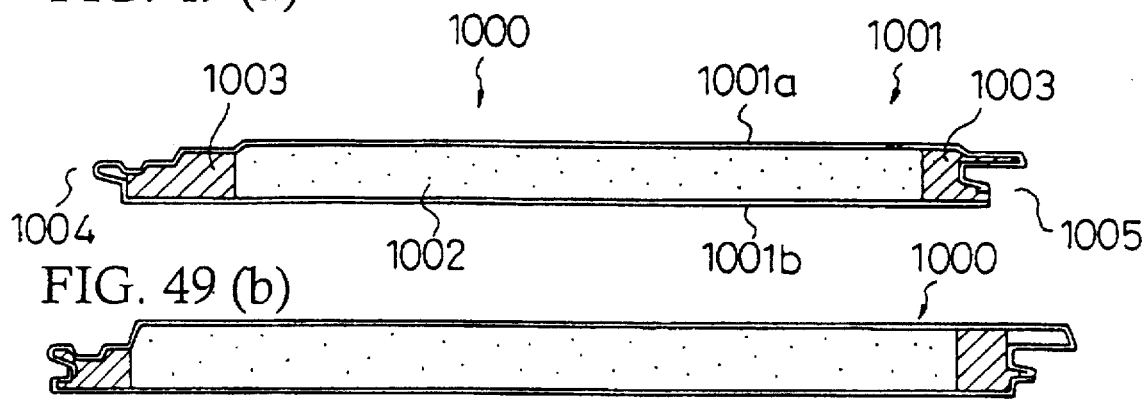
FIG. 49 (b)
FIG. 49 (c)
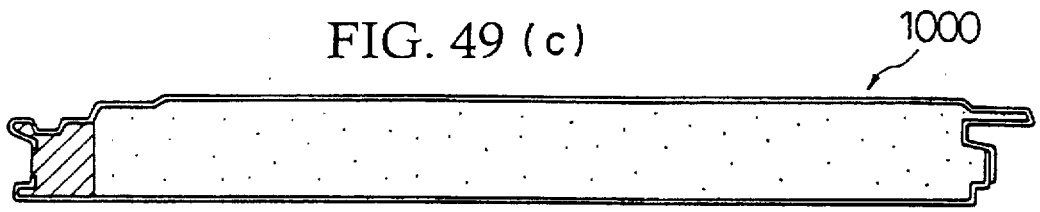
FIG. 49 (d)
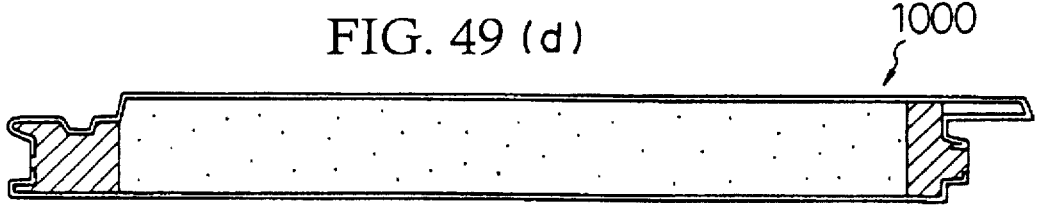
FIG. 49 (e)
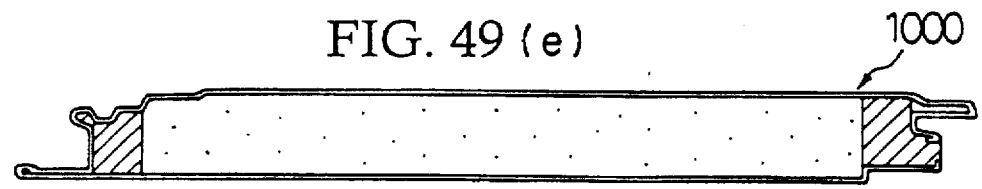
FIG. 49 (f)
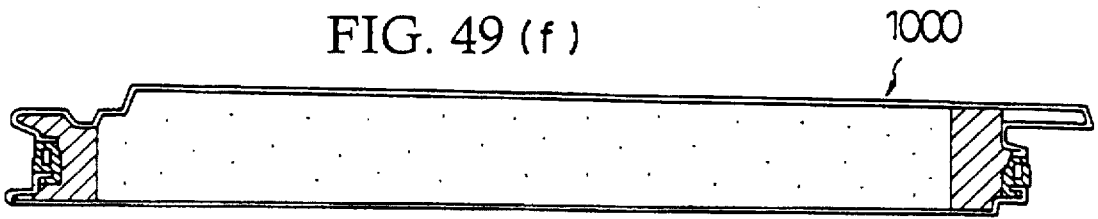

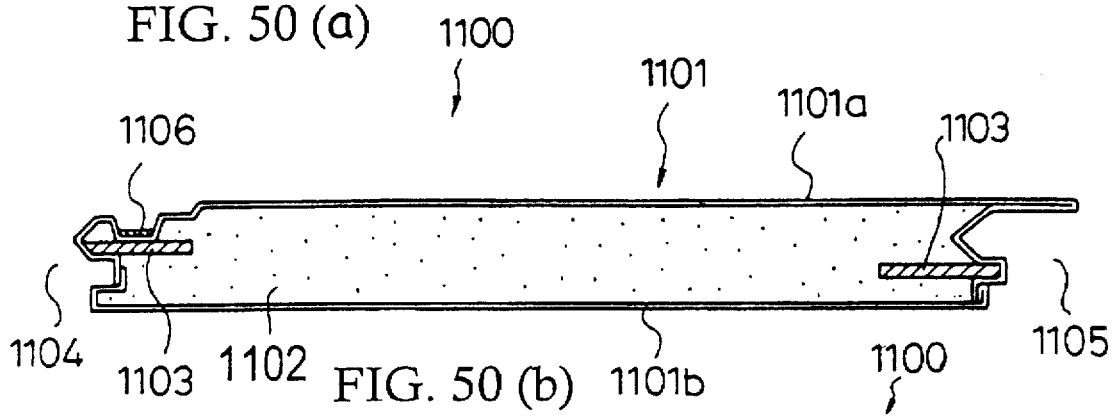
FIG. 50 (a)
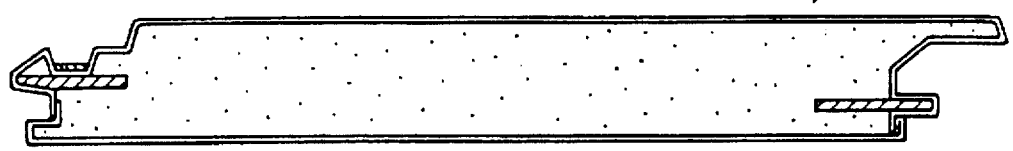
FIG. 50 (b)
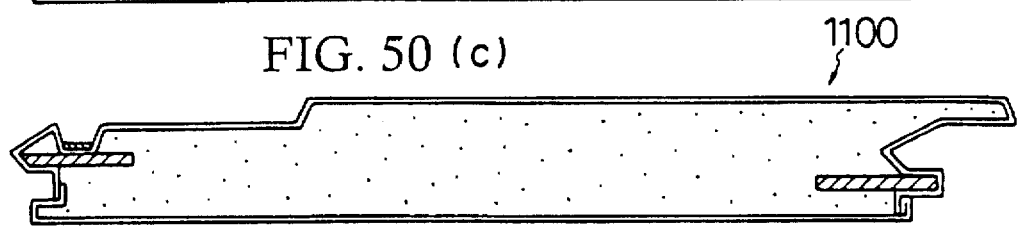
FIG. 50 (c)
FIG. 50 (d)
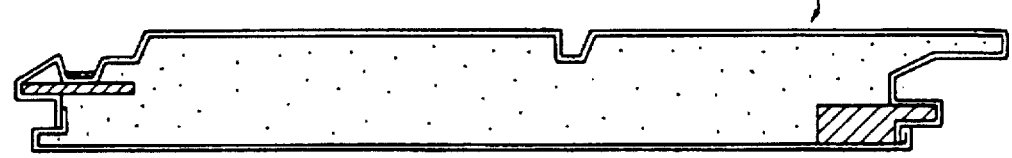
FIG. 50 (e)
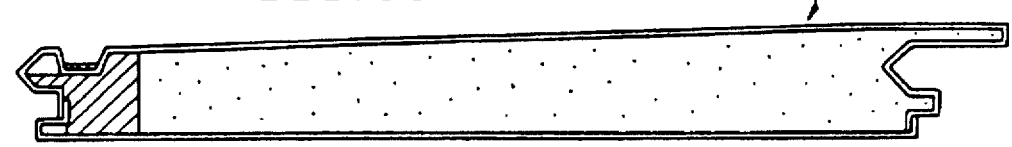
FIG. 50 (f)
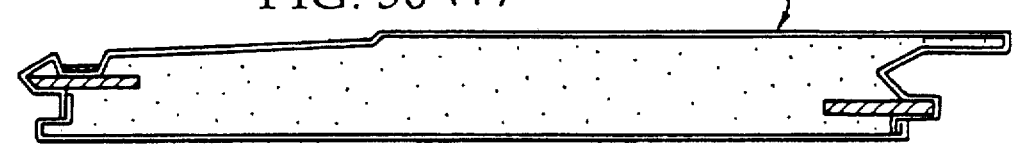
FIG. 50 (g)
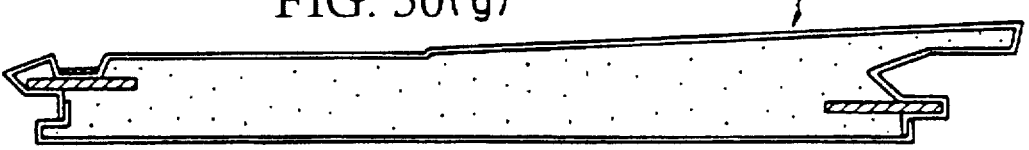

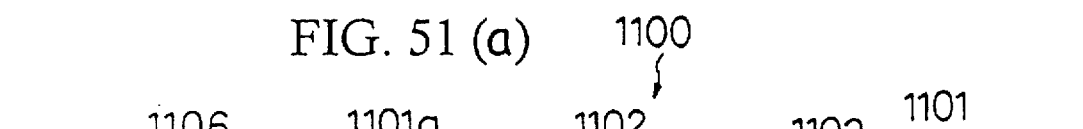
FIG. 51 (a)
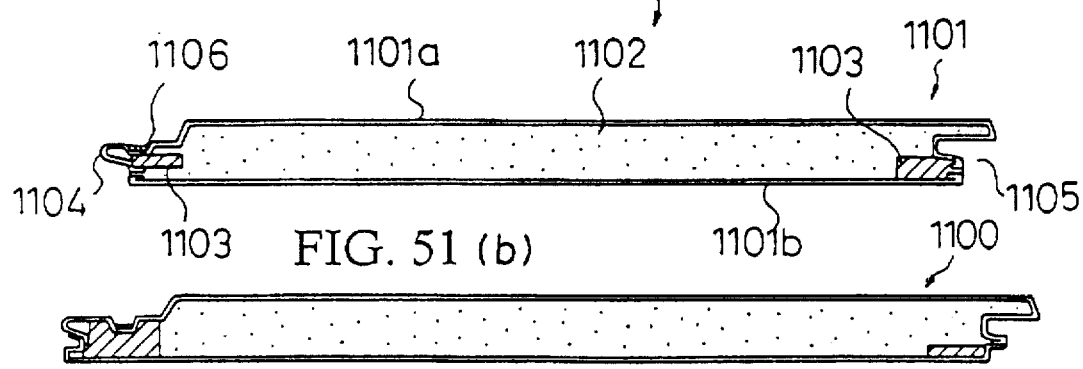
FIG. 51 (b)
FIG. 51 (c)
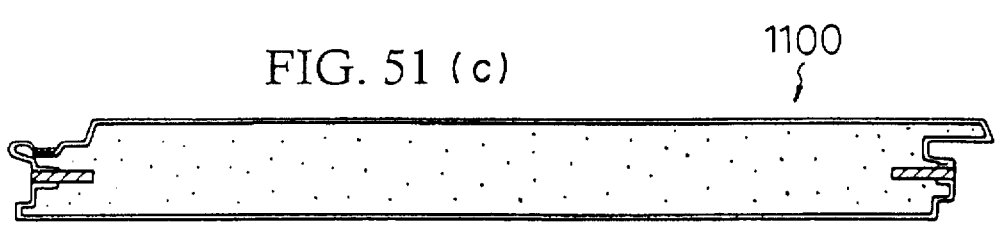
FIG. 51 (d)
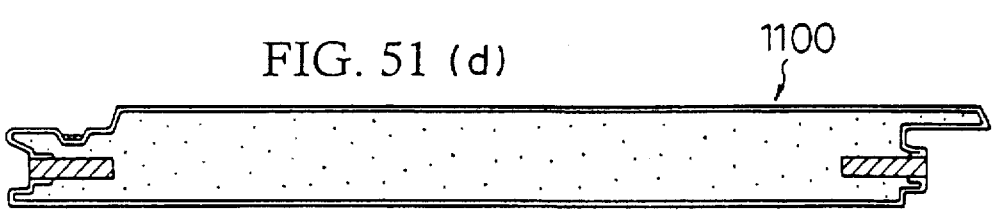
FIG. 51 (e)
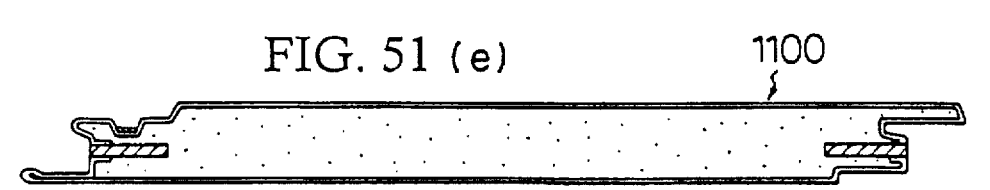
FIG. 51 (f)
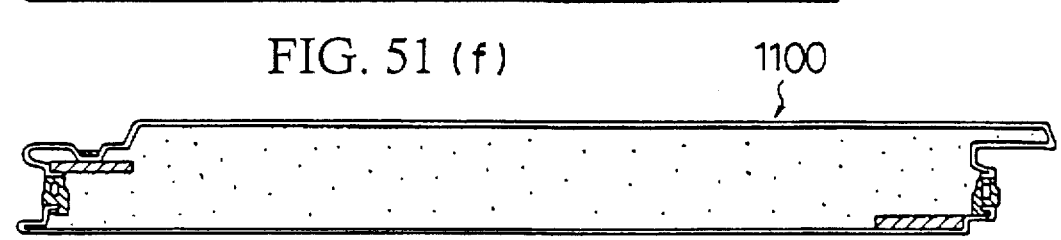

REFRACTORY/HEAT INSULATING PANELS

TECHNICAL FIELD

The present invention relates to refractory/heat insulating panels which are used as interior wall panels, exterior wall panels, roofing materials, ceiling materials, floor panels, partitions, fire doors, etc. of buildings and structures, which are required to be fire resistant, and more particularly to refractory/heat insulating panels which are light in weight, which have excellent fire resistance, thermal insulation and smoking resistance, and which have enhanced mechanical strength.

BACKGROUND ART

There are a number of known refractory panels for fire resistant structures which include, for example, Japanese Unexamined Patent Publication (kokai) No. 237756/1992, Japanese Unexamined Utility Model Publication (kokai) No. 185535/1982, Japanese Unexamined Utility Model Publication (Kokai) No. 1538/1983, Japanese Utility Model Publication (kokoku) No. 15444/1988, and Japanese Patent Publication (kokoku) No. 18230/1990. These prior art refractory panels have drawbacks as described below and improvement has so far been demanded.

First, the fire resistance of the joint parts of panels has turned out to be a weak point which affects the refractory performance of the structure of panels. In other words, deformation of a surfacing material and a backing material of a panel caused by the difference of thermal conduction under a high temperature makes crevices at the joint parts of panels, through which heat and flames spread to the opposite side. Thus, the 1-hour refractory construction test of JIS-A-1304 (Japanese Industrial Standards A-1304) cannot be passed.

Secondly, when a core material is formed by mixing a stock solution of resol-type phenol and a curing agent, and delivering the mixture for a foaming reaction, scores of percent, based on the total weight of the mixture, of condensed water generated during the reaction are held in the phenolic foams. The captured water is vaporized during the curing period of the product or after panels are assembled due to the change of the ambient temperature, etc., and the residual vapor is confined between the surfacing material and the core material of the refractory material because of no means of escape for the vapor. Thus, the surface of the panel swells, warps, etc. and the panel is adversely affected with passage of time.

Thirdly, the adhesion between the surfacing material and the core material or between the backing material and the core material is so weak that the surfacing material or the backing material easily separate from the core material by a slight impact at the adhesive portion of these materials.

On the other hand, there are disclosed techniques for improving the adhesion of refractory panels in Japanese Unexamined Patent Publication (kokai) Nos. 10359/1987 and 185613/1988. Techniques for improving the fire protecting performance by incorporating reinforcing fibers or short fibers to foams are also known. However, since such conventional techniques are constituted such that mat-like fibers are used as an aggregate, or short fibers are incorporated as an aggregate, viscosity is increased at the time of foaming, and it becomes difficult to uniformly impregnate a stock solution of unfoamed phenol into an aggregate for achieving a uniform foaming because of the uneven impregnation. Moreover, when short fibers are used, a large amount of fibers are needed, and yet foams of a high density must be achieved. This leads to low productivity and poor thermal insulation performance, increase of weight, and high costs, disadvantageously.

At present, refractory panels of this kind are attached to a wall substrate from the exterior side, i.e., from outside of a room. However, under such conditions that the space between buildings is too narrow to set up scaffolding for the assembly of panels from the exterior side, as seen in densely built-up areas of big cities, this construction method is hardly employed.

Accordingly, it is an object of the present invention to solve the aforementioned problems and to provide a refractory/heat insulating panel which has improved strength and excellent refractory/heat insulating performance. Further, another object of the present invention is to provide a structure of a joint portion for a refractory/heat insulating panel which promises more excellent assembly in such refractory/heat insulating panel. A further object of the present invention is to provide a structure of a refractory/heat insulating panel with which a panel can be attached to a wall substrate from the rear side of the panel, i.e., from the room side in the case where the panel can be attached with difficulty from the outer side.

DISCLOSURE OF THE INVENTION

A first feature of the refractory/heat insulating panels according to the present invention is that a noncombustible inorganic board is integrally formed with the joint portion of the panel. The inorganic board is formed of, for example, a calcium silicate board, a calcium carbonate board, a plaster board, a pearlite cement board, a rock wool board, a slate board, an ALC board, a PC board, other inorganic lightweight non-foaming and foaming materials, composite boards of these boards or materials, or super-high density resins (such as high density phenolic foams). It enhances the strength of the joint portion which is relatively weak to prevent easy deformation of the joint portion, thereby improving fire resistance of the panel. In addition, since the inorganic board is capable of absorbing condensed water generated during the foaming reaction of a core material made of phenolic foam, it prevents the adhesion between a core material and a surfacing material or a backing material from being deteriorated to suppress the separation of layers. Moreover, a further benefit can be obtained that the panel surface is kept flat, preventing swelling or warping of a surfacing material or a backing material.

A second feature of the refractory/heat insulating panels according to the present invention is that a nonwoven fabric is interposed between a surfacing material and a core material and/or between a backing material and a core material. The nonwoven fabric is a sheet made of fibers such as of polyester type, nylon type, boron type, carbon type, alumina type, silicon carbide type, or aramid type. The presence of a nonwoven fabric is effective in that the core material which undergoes reaction is controlled spontaneously to pass the nonwoven fabric. This is significant, because between the surfacing material or backing material and the core material, a thin adhesive layer of a high density to which is impregnated part of the core material is formed under such conditions and properties that permit the maximum adhesion to integrate the surfacing material, adhesive layer, core material and the backing material altogether. Furthermore, since the uneven surface of the nonwoven fabric and pores are filled with the core material, the nonwoven fabric exhibits an anchoring effect to intensify the adhesion between the surfacing material or the backing material and the core material, leading to an enhancement in the mechanical strength of the refractory/heat insulating panel. The enhanced mechanical strength further leads to improved flatness of decorative and backing surfaces, and also to improved assembly due to the elongated pitch of fastening to the building frame. Especially when venting grooves having an approximately U-shaped section are formed on the nonwoven fabric at a predetermined pitch to constitute air passages between the nonwoven fabric and the surfacing or backing material, the condensed water remaining in the core material over the curing period of the refractory/heat insulating panel after it is manufactured or even after panels are assembled can be effectively released outside from the panel. With the air passages, deformation (swelling, warping, etc. of the surface) of the panel with time after manufacture can be prevented. In addition, when the surfacing material and the backing material are of steel plates, there is also a secondary advantage that rusting and deterioration can be prevented because acidic substances contained in the core material can be discharged with the water content to a certain extent.

A third feature of the present invention is that a light-weight aggregate is packed closely at least at the joint sides of the core material of the refractory/heat insulating panel. Materials used for the light-weight aggregate include, for example, pearlite, glass beads, plaster slag, talc, and shirasu balloons. They enhance the strength of the joint portion which is a weak point of a refractory/heat insulating panel, to greatly improve the fire resistance of the panel. With this, a refractory/heat insulating panel which passes the 1-hour refractory construction test of JIS-A-1304 can be obtained.

A fourth feature of the present invention is that a core material of the refractory/heat insulating material is formed so that the density of the side edge of the core material facing the joint portion is greater than that of the central part of the panel. With this structure, the fire resistance of the joint portion, which is a weak point of a refractory/heat insulating panel, is greatly improved, and therefore, a refractory/heat insulating panel which passes the 1-hour refractory construction test of JIS-A-1304 can be obtained. Moreover, since the central portion of a panel has a relatively high strength and fire resistance, the density of a core material can be suppressed to a lower level, thereby reducing the weight and cost when compared with the conventional products of the same performance.

A fifth feature of the present invention is that the surface of a surfacing material of a refractory/heat insulating panel which faces a core material and/or the surface of a backing material of a refractory/heat insulating panel which faces a core material is emboss-finished. The uneven surface obtained by embossing, while playing a role of an anchor, intensifies the adhesion between the core material and the surfacing material or the backing material, and enhances the mechanical strength of the refractory/heat insulating panel. Also, the strain which has been produced at the time of molding the surfacing and backing materials is apparently suppressed on the surface to present a beautiful appearance. Accordingly, assembly is improved by elongating the pitch of fastening to the building frame.

A sixth feature of the present invention is that an isocyanurate foam layer and/or a polyurethane foam layer are provided in a core material of the refractory/heat insulating panel. With the isocyanurate foam layer and/or the polyurethane foam layer, the strength of the overall refractory/heat insulating panel is greatly enhanced. Moreover, the panel is made difficult to deform by heat and thus the heat resistance at the joint portion is markedly improved. In addition, since the isocyanurate foam layer and/or the polyurethane layer function as an air passage, the condensed water remaining in the core material over the curing period of the refractory/heat insulating panel after it is manufactured or even after panels are assembled can be effectively released outside from the panel. As a result, deformation (swelling, warping, etc. of the surface) of the panel over time after the manufacture can be prevented.

A seventh feature of the present invention is that a wooden reinforcing material is buried in a core material of the refractory/heat insulating panel. That is, for example, a grid is formed with wooden skeleton members which have a water content of about 15% and which are buried in a core material. With this structure, the mechanical strength of the core is greatly enhanced. Moreover, since the condensed water produced during the reaction of the core material is absorbed by the wooden skeleton members, the reaction is not inhibited and effective foaming can be achieved. Furthermore, changes such as shrinkage can be suppressed because the moisture content in the core material can be controlled by the wooden skeleton members. In addition, even if water immersion should take place, the wooden skeleton members function to exhaust moisture (moisture controlling function). There is also an attendant advantage of the reinforcing material in that the reinforcing material can be directly fastened to the building frame through metal fittings hammered and provided on the rear side if desired. Accordingly, refractory/heat insulating panels which are light and have very excellent mechanical strength and fire resistance can be obtained.

An eighth feature of the present invention is that a pipe-shaped member capable of passing air therethrough is buried in a core material of the refractory/heat insulating panel. With this structure, a pipe-shaped member placed in the core material functions as a reinforcing material for the core material to enhance the mechanical strength of the refractory/heat insulating panel. As a result, the pitch of fastening to the building frame at the time of assembly can be made longer. Moreover, since the pipe-shaped member allows the passage of air, the condensed water remaining in the core material over the curing period of the refractory/heat insulating panel after it is manufactured or even after panels are assembled can be effectively released outside from the panel. Therefore, deformation (swelling, warping, etc. of the surface) of the panel with time after the manufacture can be prevented. In addition, when the surfacing material and the backing material are of steel plates, there is also a secondary advantage that rusting and deterioration can be prevented because acidic substances contained in the core material can be discharged with the water content to a certain extent.

According to the present invention, the refractory/heat-insulating panel comprises a core material which is formed by mixing 50 to 300 parts by weight of aluminum hydroxide, 1 to 25 parts by weight of ammonium polyphosphate, 2 to 30 parts by weight of graphite, 2 to 50 parts by weight of a foaming agent, and 10 to 50 parts by weight of a curing agent, all based on 100 parts by weight of resol type phenolic foam, and allowing the mixture to foam and cure. Namely, phenolic foams of a resol type (hereinafter simply referred to as phenol foams) are generally prepared by a continuous foam molding method. Their characteristics include noncombustibility, low smoke generation, and low toxicity compared with other synthetic foams (plastic foams). As to the aluminum hydroxide, it particularly preferably has 0 to 30% water content, a grain size of 10 to 100 microns, and a purity of 90% or more. If such an aluminum hydroxide is used, it functions very effectively as a flame-retardant, fire-resisting agent, or a heat-resisting agent. As to the ammonium polyphosphate, it particularly preferably has a grain size of 10 to 100 microns, and such an ammonium polyphosphate functions very effectively as a reaction regulator or as a flame-retardant. Graphite swells by heat in the event of fire and effectively fills the voids which have been formed as a result of the carbonization of phenol foams. Therefore, it works very well in preventing the refractory performance from being deteriorated by shrinkage of the core material. Preferable examples of the foaming agent include methylene chloride and carbonates (powders). Preferable curing agents are those of an organic phosphate type or mixtures of a phosphate type and a PSA type. When these components are mixed in the above-described proportions, it is possible to obtain core materials that have optimum properties in terms of stable foaming, curability, adhesiveness to the surfacing material and the backing material, etc.

It is preferred that the butt surface of the refractory/heat insulating panels be coated using a water-proof coating treatment. Moreover, it is preferred that a flap be provided from the butt end of the surfacing material to extend over the rear face. When the butt surface is coated using the waterproof coating treatment with various paints or by lining with film seals, rainwater and the like can be effectively prevented from entering the butt surface. The flap which extends from the butt end is useful in that when a caulking material is filled in vertical joints formed between panels, it can be an object to which the caulking material is adhered. Moreover, the mechanical strength and the flatness of the surfacing material can also be improved.

With respect to joining or connecting the refractory/heat insulating panels as described above, a refractory/heat insulating panel is provided with a male joint portion at its one joint end and a female joint portion at its other joint end, so that two panels are joined when the male and the female portions are interlocked with each other. At the male joint portion, an upper protrusion and an inwardly depressed insertion concave portion are formed in this order. The upper protrusion is formed by outwardly projecting the lower end of one side edge of a decorative surface and downwardly slanting an upper surface of the tip portion, with a fixation groove having a concave cross section being formed in the middle. It is preferred that at the female joint portion, a cover portion for covering the fixation groove, an insertion groove for receiving the upper protrusion, and a main convex portion projecting outwardly and being received by the insertion concave portion are formed in this order. When male and female joint portions having such structures are interlocked and joined to each other, the above-mentioned advantages of the features of the invention can be even more enhanced, and therefore, a refractory/heat insulating panel having an increased strength and excellent fire resistance can be provided.

In the above-described joint structure, an inorganic packing material is preferably interposed between the insertion concave portion of the male joint portion and the main convex portion of the female joint portion which is received by the insertion concave portion, in view that the dimensional errors of the interlocking surfaces can be absorbed by such a packing material, and what is more, thermal insulation properties and air tightness are enhanced, resulting in improvement in waterproofness and soundproofness as well as fire resistivity. Examples of the inorganic packing material may include rock wool felt and ceramic wool. If a waterproof packing material is interposed between the upper protrusion of the male joint portion and the insertion groove of the female joint portion which is received by the insertion concave portion, or if a packing material made of EPDM (this material is excellent in weather resistance, heat resistance, ozone resistance, chemical resistance, etc.) is provided in the fixation groove of the male joint portion, more preferable results are obtained with improved airtightness and waterproofness. The waterproof packing material may be commercial products of polyvinyl chlorides, chloroprenes, polyethylene chlorosulfonates, ethylene propylenes, asphalt-impregnated polyurethanes and EPDMs. When space functioning as an air ventilating passage is provided in the upper protrusion of the male joint portion, the condensed water produced during the reaction, etc. can be released outside through the passage. As a result, the moisture in the refractory/heat insulating panel can be effectively prevented from remaining, resulting in an effective prevention of the deterioration of the strength of a refractory/heat insulating panel itself.

The following is the feature of mounting a refractory/heat insulating panel having the above-described joint structure onto a substrate made of a long C-shaped steel material which has a rear portion having a vertical flat surface, side portions formed by perpendicularly bending both lateral edges of said rear portion, and flaps formed by inwardly bending the tip portions of the side portions, thereby forming a C-like cross section. In the present invention, the refractory/heat insulating panel is fixed to the substrate material by using a mounting bracket composed of a fixation portion and an engagement portion, the fixation portion being provided with a setting section having a vertically flat shape, a fixation section formed by almost perpendicularly bending one of the side edge portions of said setting section, and an engagement section having an engagement groove being substantially a U-like shape and formed by almost perpendicularly bending the other side edge portion of the setting section and further bending the tip portion of the bent portion in a hook-like shape, one or more concave or convex reinforcing rib being formed at the engagement groove; and the engagement portion being formed by bending the lower end of the setting section in an approximately horizontal direction and having a shape which is substantially the same as the shapes of the end surfaces of the male and female joint portions of the refractory/heat insulating panel, and wherein fixation of the refractory/heat insulating panel to the substrate material is achieved by interposing the engagement portion of the mounting bracket between the male joint portion and the female joint portion of refractory/heat insulating panels, fitting the engagement groove of the mounting bracket on the flap, and fixing the fixation section to the rear portion of the substrate material with a fixture. With such a mounting structure, a refractory/heat insulating panel can be mounted onto the substrate not from the exterior side, i.e., outside the room, but from the back side, i.e., inside the room, without impeding the general mounting strength or construction efficiency. Therefore, the panels according to the present invention is especially beneficial for use in densely built-up areas of big cities.

BRIEF DESCRIPTION OF THE DRAWINGS

FIG. 29 presents sectional views showing the essential part of other embodiments of a core material of a type which contains wooden skeleton members as buried therein.

FIG. 46 presents sectional views showing the essential part of other embodiments of a refractory/heat insulating panel according to the ninth embodiment of the invention.

FIG. 49 presents sectional views showing the essential part of other embodiments of a refractory/heat insulating panel according to the ninth embodiment of the invention.

FIG. 50 presents sectional views showing the essential part of other embodiments of a refractory/heat insulating panel according to the ninth embodiment of the invention.

FIG. 51 presents sectional views showing the essential part of other embodiments of a refractory/heat insulating panel according to the ninth embodiment of the invention.

BEST MODE FOR CARRYING OUT THE INVENTION

Embodiment of the present invention will be described below.

First embodiment (FIG. 1 through FIG. 15)

Figure 1:
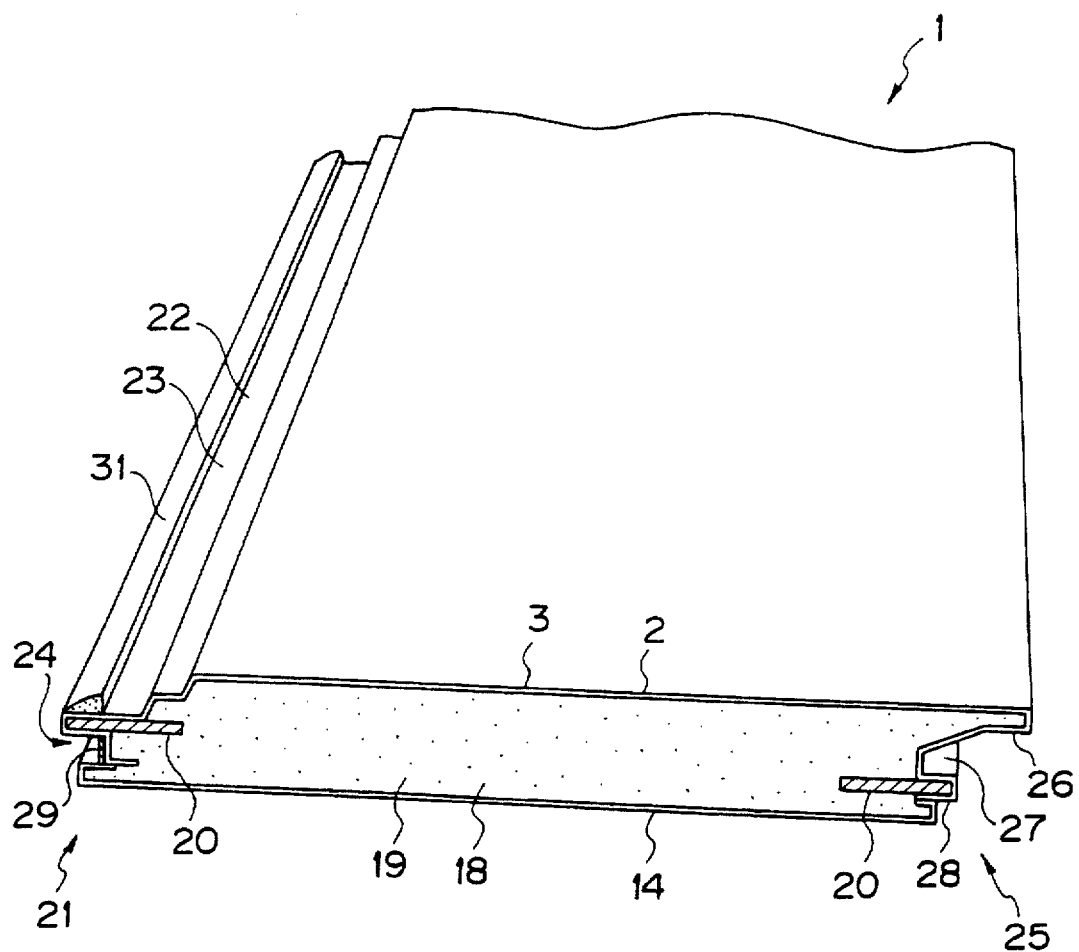
FIG. 1 is a perspective view showing the essential part of a refractory/heat insulating panel according to the first embodiment of the invention.

A refractory/heat insulating panel according to the present embodiment is an example in which inorganic boards are used, and FIG. 1 shows a typical example of a refractory/heat insulating panel having inorganic boards. Numeral 1 denotes a refractory/heat insulating panel having a sandwich structure which is realized by integrally interposing a core material 18 between a surfacing material 2 and a backing material 14. Further, a male joint portion 21, and a female joint portion 25 are provided at both longitudinal ends of the refractory/heat insulating panel 1.

To describe in detail, the surfacing material 2 and the backing material 14 are made of a thin metallic plate such as of iron, aluminum, copper, stainless steel, titanium, steel plated with an alloy of aluminum and zinc, porcelain enameled steel, clad steel, laminated steel (polyvinyl chloride-coated steel plate or the like), a sandwiched steel (vibration damping steel plate or the like), or the like (of course, colored metallic plates which are obtained by painting the above-mentioned materials in various colors can be used). A material selected from the above-described materials is formed in various arbitrary shapes by roll molding, press molding, extrusion or the like. Alternatively, the surfacing material 2 and the backing material 14 are made of an inorganic material. In this case, the inorganic material is subjected to extrusion, press molding, autoclave cure molding, or the like to obtain various arbitrary shapes.

Figure 2A:
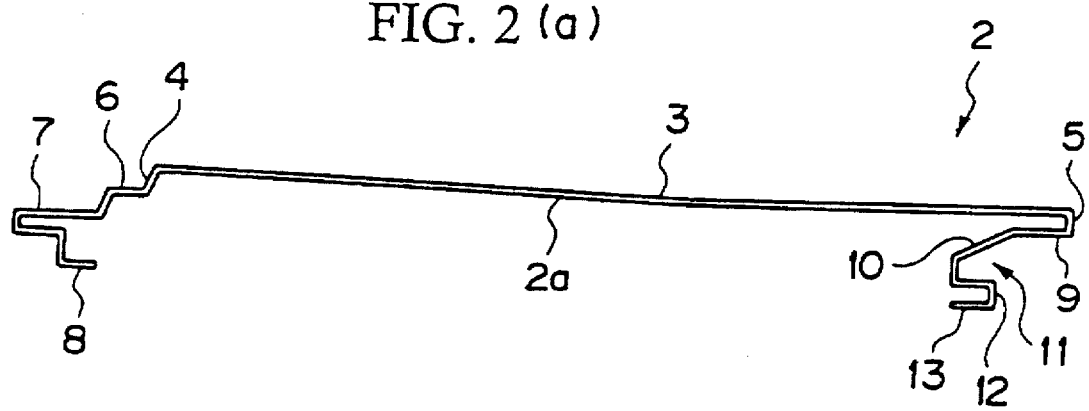
FIG. 2 presents side views of the surfacing material and the backing material shown in FIG. 1.

Further, as shown in FIG. 2(a), the surfacing material 2, for example, includes a laterally elongated decorative surface portion 3, side edges 4 and 5 which are formed by bending both lateral side edges of the decorative surface portion 3 inwardly. Formed at one end of the surfacing material 2 are a joint bottom surface 6 extending from the lower end of the side edge 4, a fixation convex portion 7 which is formed by downwardly bending the tip of the joint bottom surface 6 and which is projected outward to have a U-like shape, and a reinforcing flap 8 which is formed by inwardly bending the lower edge portion of the fixation convex portion 7 in an L-like shape.

Further, formed at the other end of the surfacing material 2 are a lower edge 9 formed by inwardly and horizontally extending the lower end portion of the side edge 5, a step portion 10 formed by slanting and bending the tip of the lower edge 9 downwardly, an insertion groove 11 formed by inwardly bending the lower end portion of the step portion 10 to obtain a U-shaped cross section, an insertion convex portion 12 which is formed by outwardly bending the tip of the insertion groove 11 and which is projected outward to have a U-like shape, and a receiving surface 13 extending from the lower edge of the insertion convex portion 12.

Figure 2B:
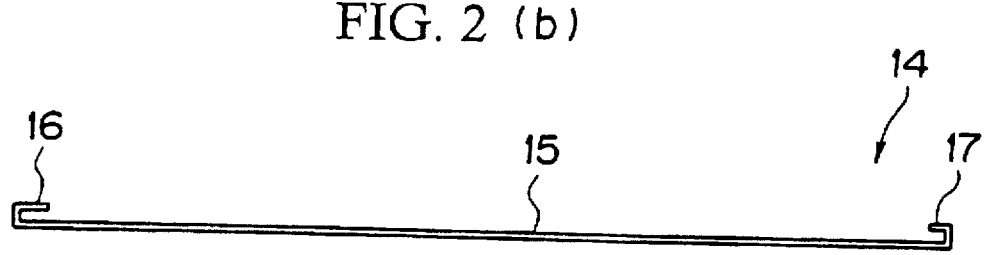

As shown in FIG. 2(b), the backing material 14 includes a laterally elongated bottom surface 15 facing the decorative surface portion 3, and flaps 16 and 17 which are formed by inwardly bending both end portions of the bottom surface 15 in a U-like shape.

The core material 18 is made of a plastic foam 19, and inorganic boards 20 are embedded at both ends thereof. The plastic foam 19 acts as a heat insulating material, a fire resistant material, an adhesive, a reinforcing material, a buffering material, a sound-absorbent material, a volume increasing material, a weight reducing material and the like.

An unfoamed raw material of the plastic foam 19 is distributed into the space between the surfacing material 2 and the backing material 14, and is then allowed to react and foam, so that all the structural materials are integrally fixed to each other. The plastic foam typically includes those obtained by incorporating a foaming agent, aluminum hydroxide, ammonium polyphosphate, graphite, and a curing agent into a foam having itself a fire protecting performance equal to or superior to quasi-noncombustible materials, preferably comparable to noncombustible materials, such as a resol type phenol foam, and the mixture is allowed to foam and cure. The resol type phenol foam is then integrated with the surfacing material 2 and the backing material 14 by the self-adhesive of the phenol foam produced during the time of foaming and curing of the resin.

The resol type phenolic foam (hereinafter simply referred to as "phenol foam") is mainly manufactured by a continuous foam molding process, and has a higher noncombustibility, a lower smoke generation property, and a lower toxicity compared with other synthetic resin foams (plastic foams). Further, the phenol foam provides a required mechanical strength when the phenol foam has a density of about 50 to 300 Kg/m$^3$. Moreover, metal siding materials, which are formed by sandwiching the phenol foam between metal plates, have a fire protecting performance which pass the fire resistant construction test of JIS-A-1301 (a fire resistance test for wooden portions of buildings) and the fire resistant construction test of JIS-A-1302 (a fire resistance test for noncombustible construction portions of buildings).

The foaming agent is mixed in the stock solution of the phenol foam in an amount of 2 to 50 parts by weight based on 100 parts by weight of the stock solution of the phenol foam. Examples of foaming agents include methylene chloride, carbonate (powder), and the like.

Aluminum hydroxide is mixed in the stock solution of the phenol foam in an amount of 50 to 300 parts by weight based on 100 parts by weight of the stock solution of the phenol foam. The aluminum hydroxide is useful as a flame-retardant, a fireproofing agent and a heat-resistant agent. It is preferred that aluminum hydroxide have a moisture percentage of 0 to 30%, a grain size of 10 to 100μ, and a purity of 90% or more.

Ammonium polyphosphate is mixed in the stock solution of the phenol foam in an amount of 1 to 25 parts by weight based on 100 parts by weight of the stock solution of the phenol foam. The ammonium polyphosphate is useful as a reaction regulating agent and a flame-retardant property imparting agent, and it is preferred that the ammonium polyphosphate have a grain size of 10 to 100μ.

Graphite is mixed in the stock solution of the phenol foam in an amount of 2 to 30 parts by weight based on 100 parts by weight of the stock solution of the phenol foam. In the case of fire, space is formed in the panel due to carbonization of the phenol foam, and the space is filled with graphite which has expanded due to heat. Therefore, the graphite is effective in preventing the fire resistance from deteriorating due to the shrinkage.

A curing agent is mixed in the stock solution of the phenol foam in an amount of 10 to 50 parts by weight based on 100 parts by weight of the stock solution of the phenol foam. The curing agent is a mixture of an organic phosphoric acid type and a PSA type, or a phosphoric acid type and a PSA type.

Of course, the core material 18 includes a foamed material in which long or short fibers (glass wool, rock wool, carbon fibers, graphite and the like) are uniformly dispersed and locally placed.

The inorganic boards 20 are used for enhancing the fire properties of a joint portion which will be described later. The inorganic board 20 is made of a material selected from the group consisting of calcium silicate, calcium carbonate, plaster, pearlite cement, rock wool, slate, ALC, PC, other light-weight inorganic materials, light-weight inorganic foaming materials, composite boards composed of these boards and materials, and super high density resins such as high density phenol foam. The inorganic boards 20 are elongated materials each having an arbitrary cross section such as a rectangular shape, a square shape and a circular shape, and are integrally embedded in the core material with inserted into the fixation convex section 7 and the insertion convex section 12.

Figure 3:
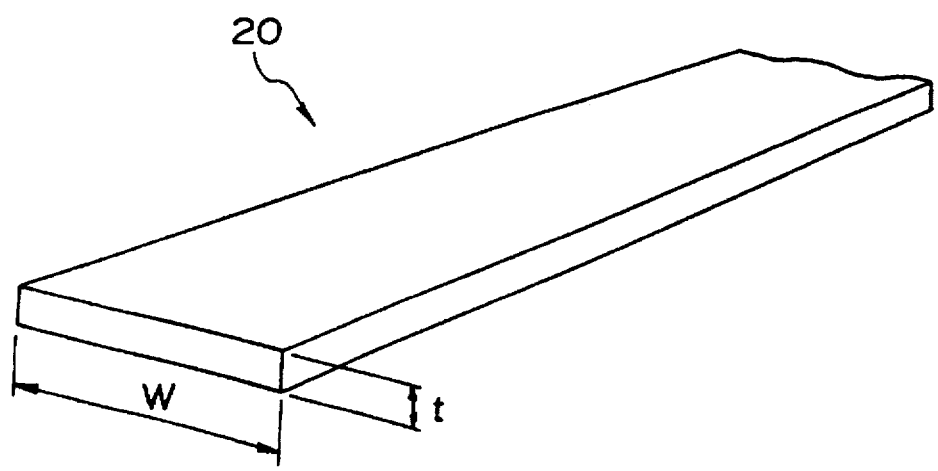
FIG. 3 is a perspective view showing the essential part of the inorganic board shown in FIG. 1.

Each of the inorganic board 20, for example, has a shape shown in FIG. 3, and the thickness t thereof ranges from about 3 to 100 mm while the width thereof ranges from about 5 to 100 mm. A single continuous board or plurality of short boards are formed depending on the length of the refractory/heat insulating panel 1.

The male joint portion 21 is a side end portion which is integrally formed by the stationary convex section 7, the reinforcing flap 8, and the flap 16. The male joint portion 21 has a step portion 22 which is formed by depressing one side edge of the decorative surface portion 3 so as to receive a cover portion 26 of the female joint portion 25 such that the cover portion 26 is flush with the decorative surface portion 3 without projecting therefrom. The male joint portion 21 also has an upper protrusion 23 for acting as a guide and for increasing engagement force, and an insertion concave portion 24 engageable with a main convex portion 28 which will be described later.

The female joint portion 25 is composed of a cover portion 26 for covering the step portion 22, an insertion groove 27 having a U-like cross section, and a main convex portion 28 which will be inserted into the insertion concave portion 24.

Numeral 29 denotes an inorganic packing material made of, for example, rock wool felt, ceramic wool, glass-wool, or the like. The inorganic packing material mainly provides functions as a refractory material, a waterproof material and the like.

Figure 4:
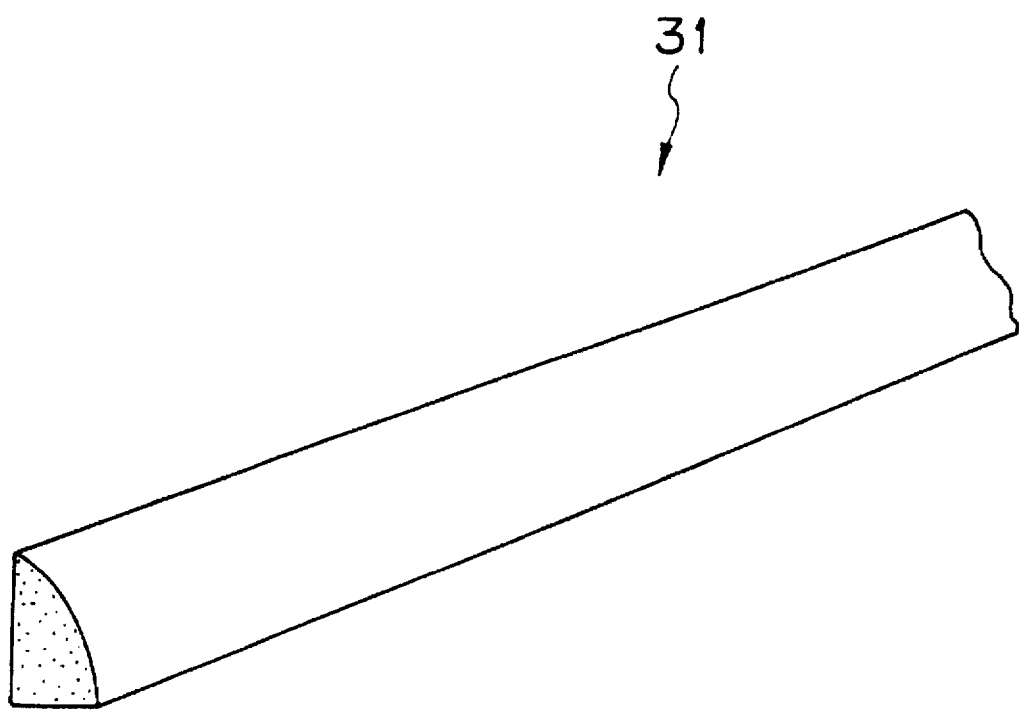
FIG. 4 is a perspective view showing the essential part of the fixture guide shown in FIG. 1.
Figure 6:
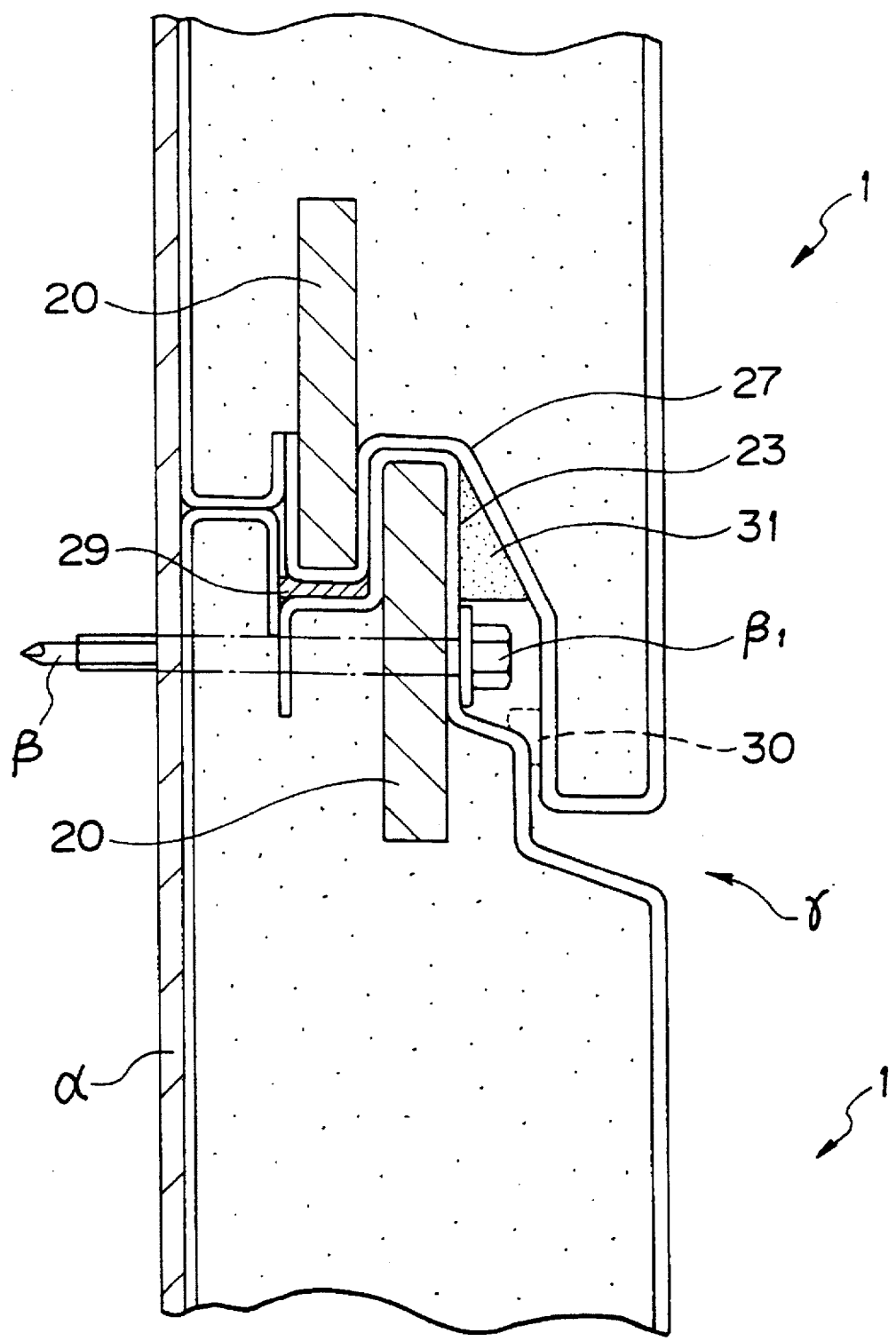
FIG. 6 is a longitudinal sectional view of the essential part of joint portions after refractory/heat insulating panels according to the first embodiment of the invention have been assembled.

A packing material 30 disposed in the joint portion γ and illustrated by a dotted line in FIG. 6 prevents rain or the like from entering through the joint portion γ. The packing material 30 is made of a commercially available material such as polyvinyl chlorides, chloroprenes, chlorosulfonated polyethylenes, ethylene propylenes, and asphalt-impregnated polyurethanes. The packing material 30 is useful for providing functions as a waterproof material, a hermetic material, and the like. The packing material is optionally processed for forming. Numeral 31 is a fixture guide, which has an elongated shape as shown in FIG. 4 or a short shape (not shown). The material of the fixture guide 31 is an extrusion (plastic material) of a soft synthetic resin selected from the group consisting of polyethylene, polypropylene, polystyrene, vinyl chloride resin, styrol resin, methacrylic resin, polyurethane, phenol resin, urea resin, melamin resin, fluororesin, silicon resin, and fiber-reinforced plastics. Alternatively, the fixture guide 31 is of commercially available packing materials having a predetermined shape and elasticity such as polyvinyl chlorides, chloroprenes, chloro-sulfonated polyethylenes, ethylene propylenes, and asphalt impregnated polyurethanes. The guide 31 is useful for providing functions as a waterproof material, a hermetic material, and the like. An extruded product of vinyl chloride is good in terms of productivity, cost and performances.

Figure 5:
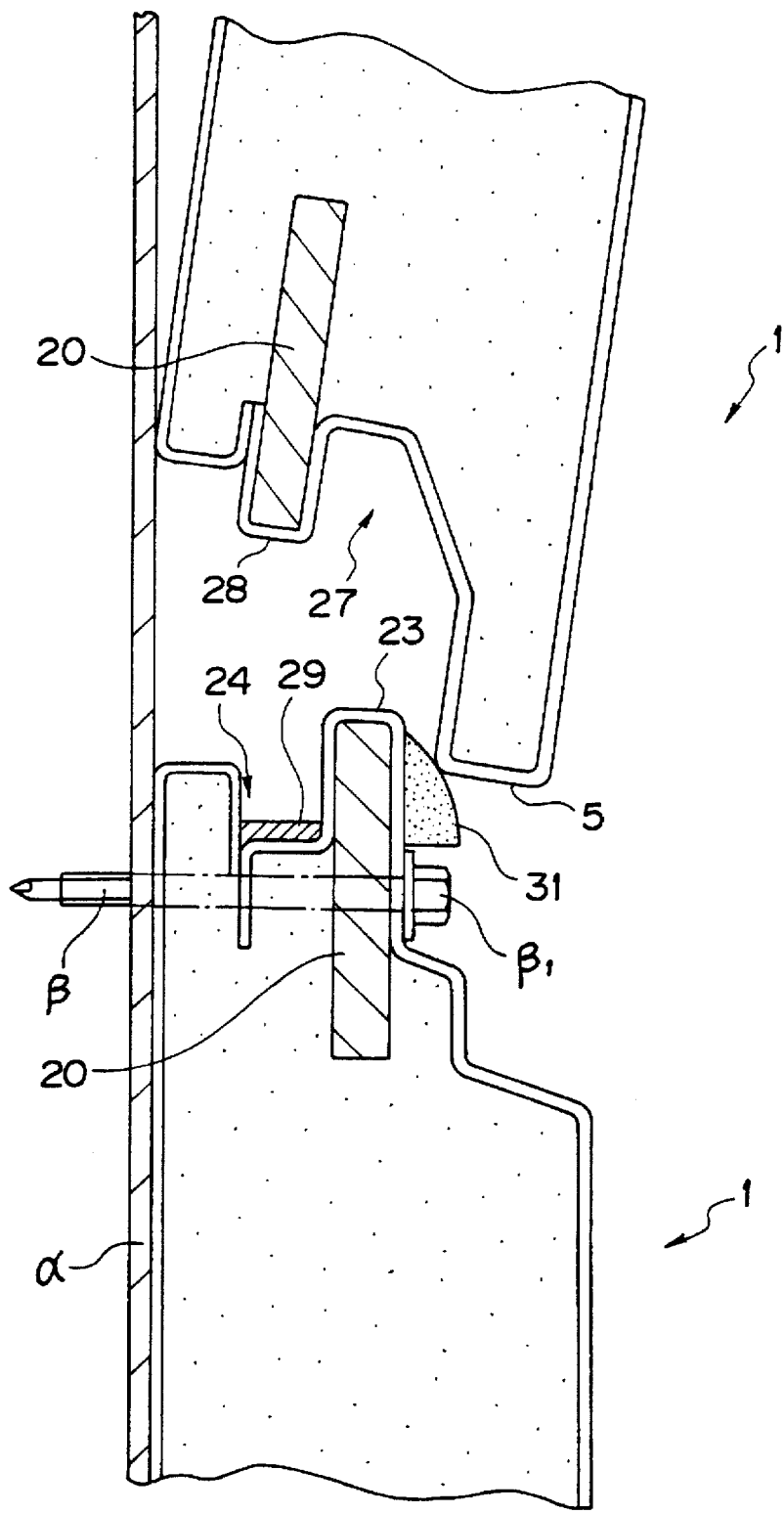
FIG. 5 is a longitudinal sectional view of the essential part of joint portions in the course of assembling refractory/heat insulating panels according to the first embodiment of the invention.

To describe in more detail, the fixture guide 31 covers the head portion $β_1$ of a fixture β, which fixes the refractory/heat insulating panel 1 to a frame α, as shown in FIG. 5. The fixture guide 31 is provided for eliminating the problem that smooth assembly is hindered by an interference between the head portion $β_1$ of the fixture β and a side edge 5 of the lower end of the refractory/heat insulating panel 1, which may occur when an upper refractory/heat insulating panel 1 is joined with a lower refractory/heat insulating panel 1. Incidentally, for adhering the fixture guide 31 to the upper protrusion 23, treatment of heat fusion or with an adhesive is employed.

Next, an example of assembly will be described. An assumption is made that the refractory/heat insulating panel 1 shown in FIG. 1 is used for assembling as shown in FIGS. 5 and 6. A water drip, a starter and the like are fixed to the lower end of the frame α although they are not shown in the drawings. As shown in the drawing, an n-th refractory/heat insulating panel 1 is fixed to the frame α via the fixture β. Subsequently, the female joint portion 25 of an n+1-th refractory/heat insulating panel 1, which will become an upper panel, is placed on the male joint portion 21 of the n-th refractory/heat insulating panel 1, as shown in FIG. 6. Accordingly, in order to form an exterior wall, the above-described step is repeated from the ground sill toward the caves.

Figure 7:
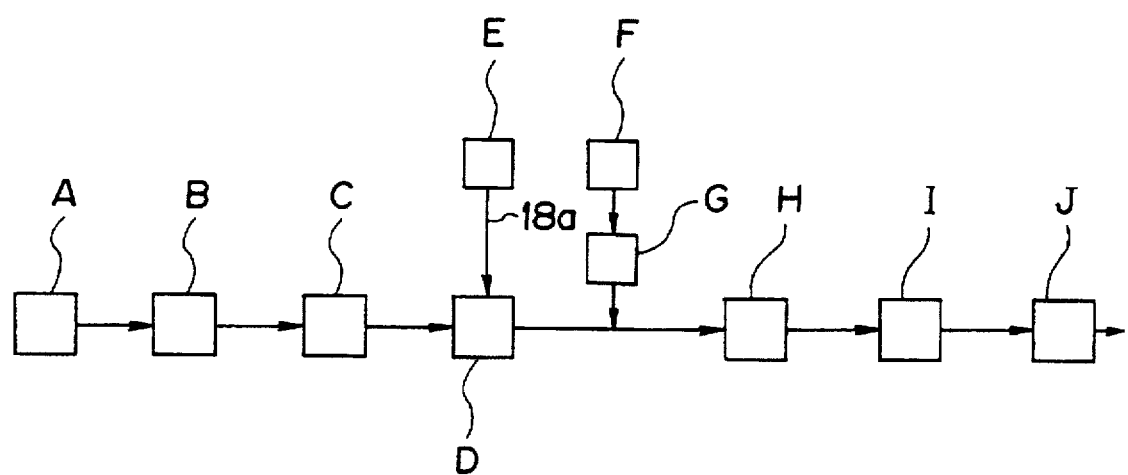
FIG. 7 is a schematic view showing the steps of manufacturing a refractory/heat insulating panel according to the first embodiment of the invention.

Next, an example of a method of manufacturing the refractory/heat insulating panel 1, which is used in the mounting structure of refractory/heat insulating panels according to the present invention is shown in FIG. 7. First, a surfacing material 2, for example, made of a color steel sheet (having a thickness of 0.5 mm) is red from a supply step A (for example, an uncoiler or a lifter) to a molding step B in which the surfacing material 2 is molded into a shape shown in FIG. 1. Subsequently, inorganic boards 20 each made of an elongated calcium silicate panel and having a thickness of 10 mm and a width of 50 mm are inserted from both lateral sides in an inorganic board forming step C. The surfacing material 2 is then transported to a starting material delivering step D in which a stock solution 18a of the core material 18 is delivered from a delivering machine E on the back surface 2a of the surfacing material 2 to obtain a final density of about 70 to 300 Kg/m³. The stock solution 18a is obtained by mixing various flame-retardants and reaction adjusting agents into an unfoamed stock solution of resol type phenol, and uniformly stirring them. A backing material 14 made of a color steel sheet (having a thickness of 0.5 mm) supplied from the supply step F (uncoiler, lifter or the like) is formed in a molding step G, and is then laminated on the surfacing material 2, which is then transported to a cure oven H having a predetermined shape in which curing is effected at a temperature of about 30° to 100° C. for 5 to 30 minutes by a continuous foaming process so that the mixture is allowed to foam and cure, thereby integrating the materials. It is then cut into a shape with a predetermined size by a cutter I, and is then fed to a packaging step J, thereby obtaining final products. Needless to say, the fixture cover 31 is bonded to the panel in a step following the step H of the cure oven, or in a later step.

Further, in order to confirm the fire properties of the mounting structure of the refractory/heat insulating panel 1, a 1-hour refractory construction test of JIS-A-1304 was performed. As a result, it was confirmed that the panel passed the test. The refractory/heat insulating panel 1 used in the test is such that the surfacing material 2 and the backing material 14 are formed of a color steel sheet having a thickness of 0.5 mm, the core material 18 is made of a phenol foam (having a density of about 160 Kg/m³), and each inorganic board 20 is made of a calcium silicate board having a thickness of about 10 mm, and which has a total thickness of 50 mm. Further, an inorganic packing material 29 made of rock wool felt is continuously formed at the joint portion γ.

The joint portion of the above-described refractory/heat insulating panel 1 may have the following structures.

Figure 8:
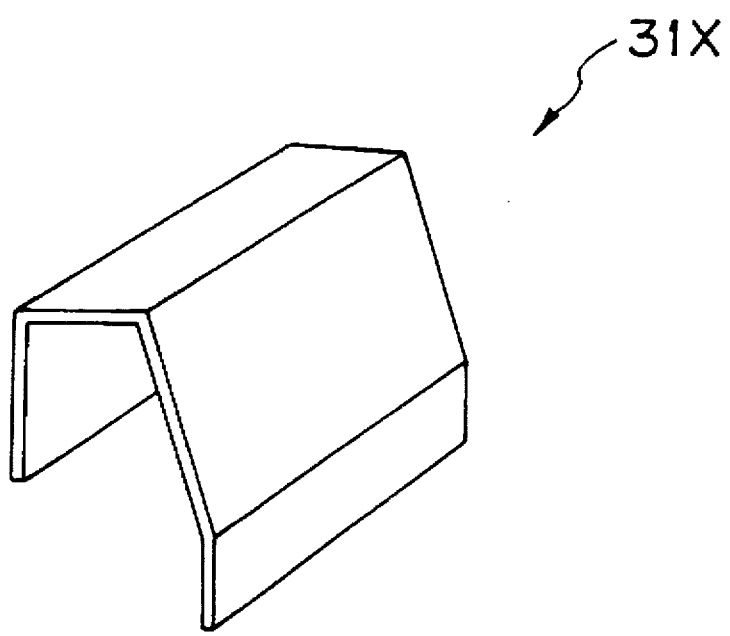
FIG. 8 is a perspective view showing an example of a fixture cover which is used when refractory/heat insulating panels are joined with each other.
Figure 9:
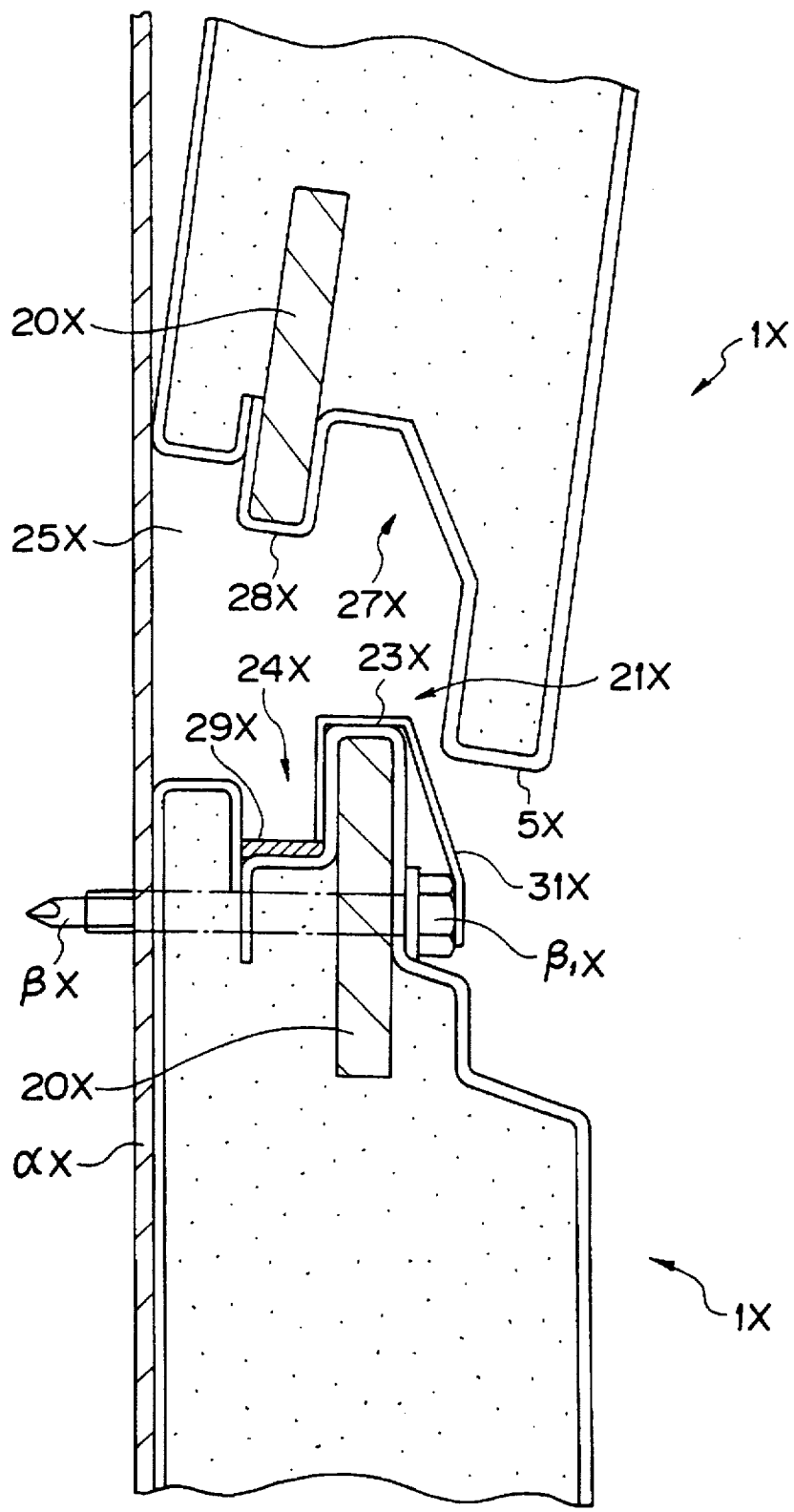
FIG. 9 is a longitudinal sectional view of the essential part of joint portions in the course of assembling refractory/heat insulating panels using a fixture cover shown in FIG. 8.
Figure 10:
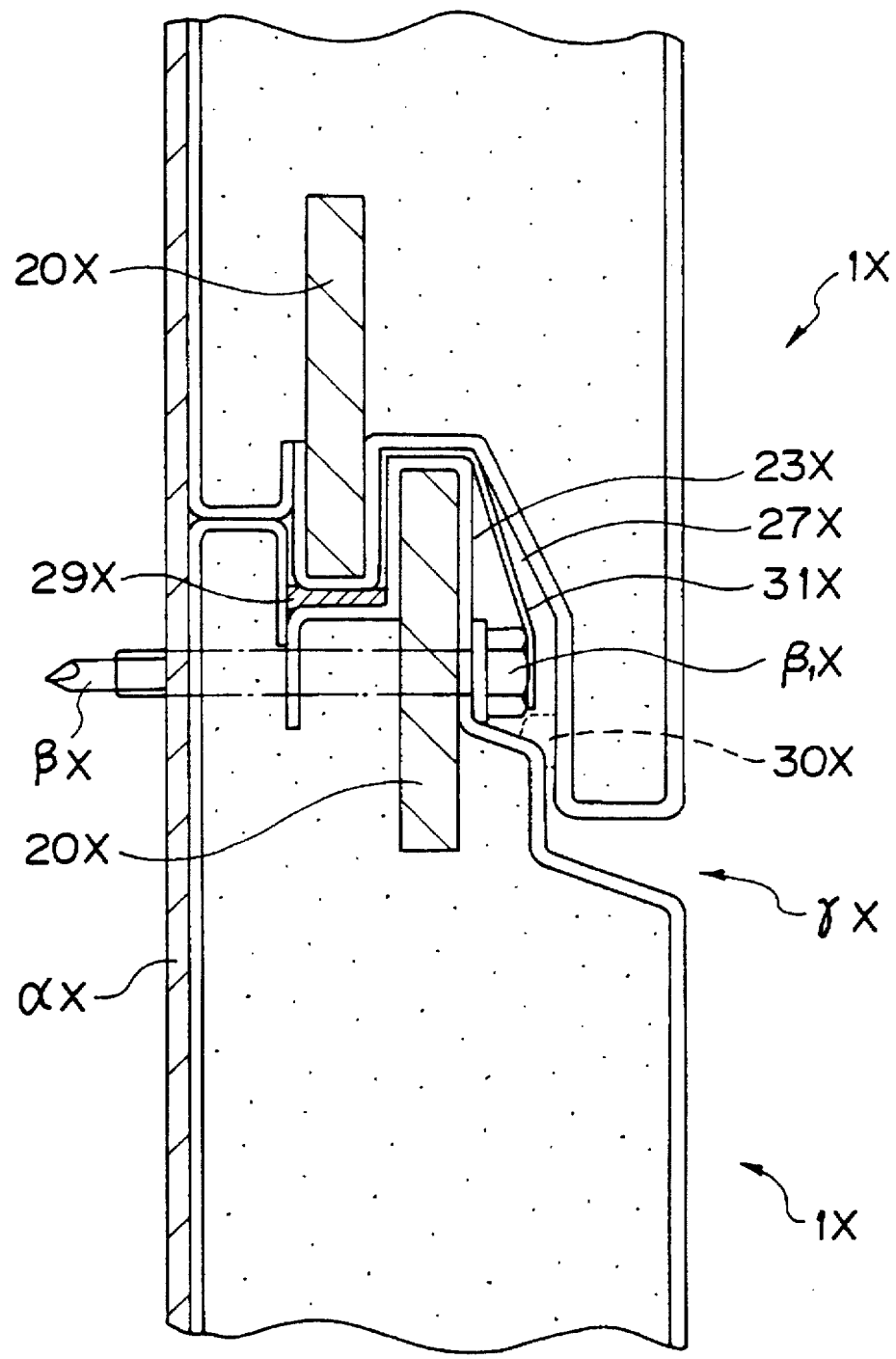
FIG. 10 is a longitudinal sectional view of the essential part of joint portions after refractory/heat insulating panels have been assembled using a fixture cover shown in FIG. 8.

Namely, a fixture cover 31X shown in FIG. 8 through FIG. 10 may be used instead of the fixture guide 31. The fixture cover 31X has a short shape as shown in FIG. 8 or an elongated shape (not shown). The material of the cover 31X is a similar metallic material as used for the surfacing material, a plastic material or the like.

Figure 11:
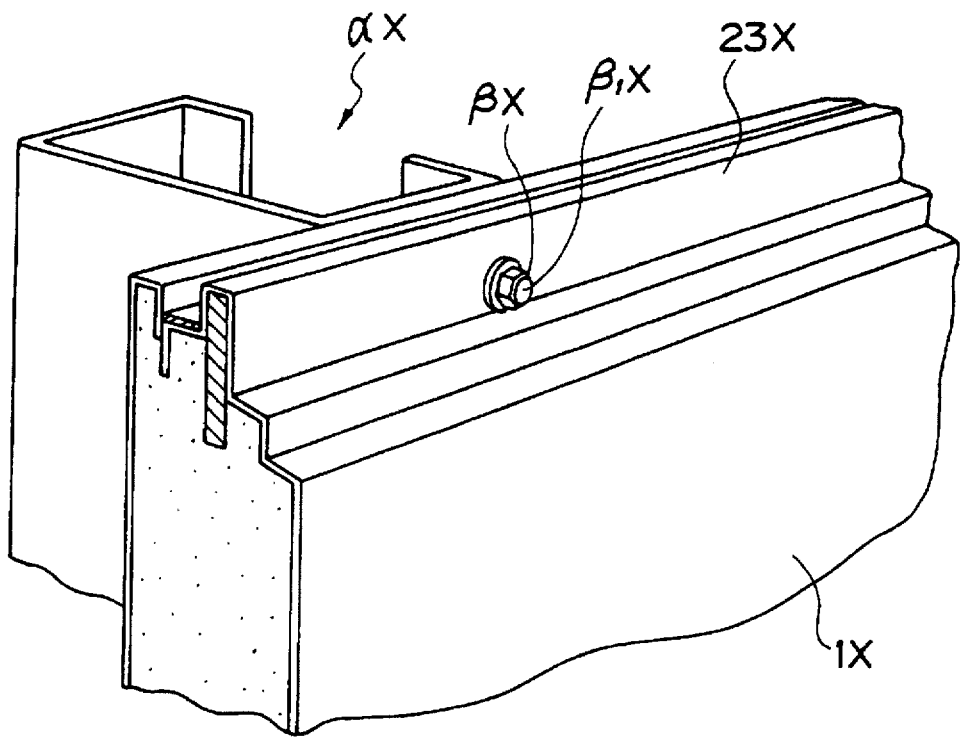
FIG. 11 presents schematic views of the essential part showing how the fixture cover shown in FIG. 8 is used.
Figure 11:
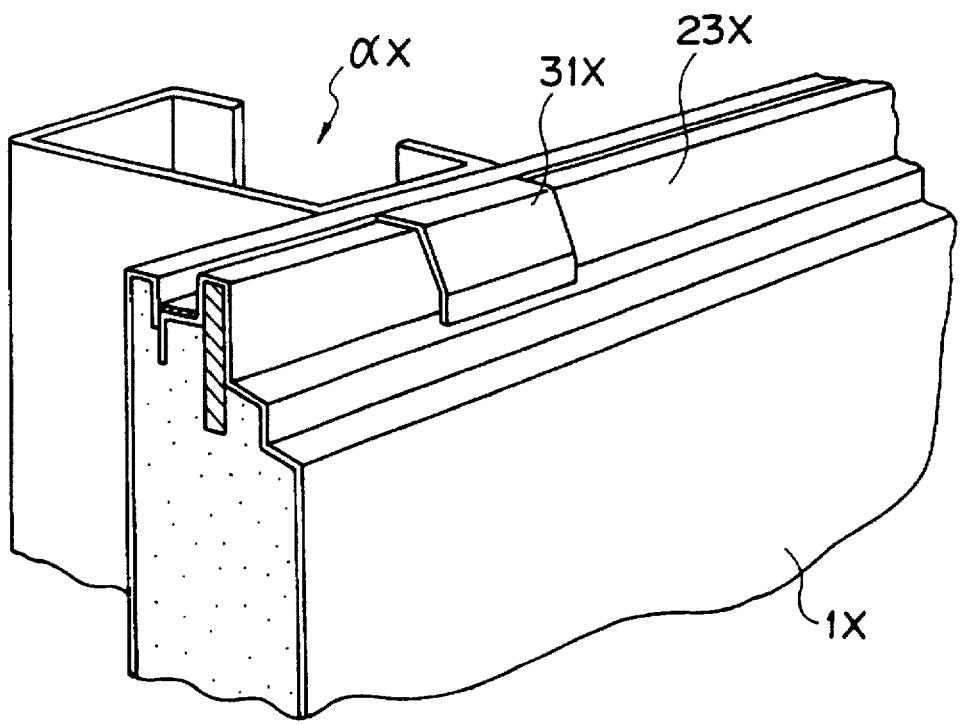
Figure 12:
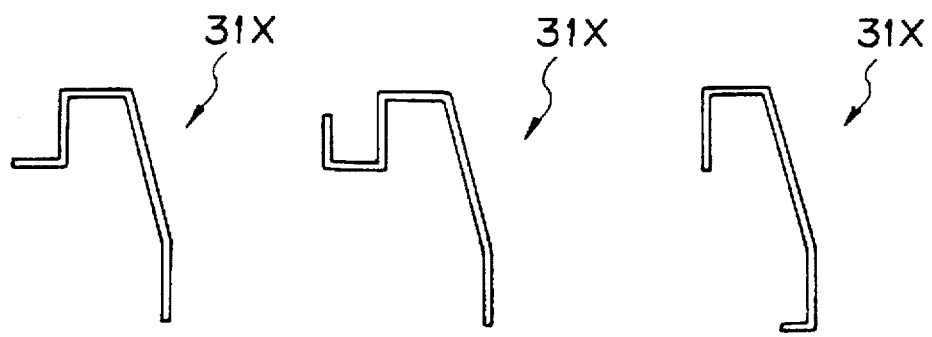
FIG. 12 presents sectional views showing other embodiments of a fixture cover.
Figure 12:
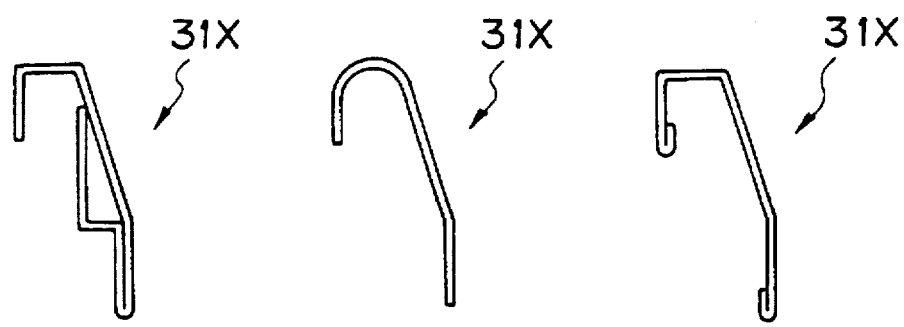

To describe more specifically, the fixture cover 31X covers the head portion $\beta_1$ X of a fixture $\beta$X, which fixes a refractory/heat insulating panel 1X to a frame αX. The refractory/heat insulating panel 1X is provided with male and female joint portions having similar shapes as those of the refractory/heat insulating panel 1, as shown in FIG. 9 through FIG. 11 (however, the fixture guide 31 is not provided). The fixture cover 31X is provided for eliminating the problem that smooth assembly is hindered by an interference between the head portion $\beta_1$ X of the fixture $\beta$X and a side edge 5X of the lower end of the refractory/heat insulating panel 1X, which may occur when an upper refractory/heat insulating panel 1X joint with a lower refractory/heat insulating panel 1X, as shown in FIG. 9.

Next, an example of assembly using the above-described fixture cover 31X will be described. First, an n-th refractory/heat insulating panel 1X is fixed to the frame α X via the fixture $\beta$X in a manner similar to that used in the above-described example of assembly.

Subsequently, the fixture $\beta$X fixed to the frame αX is covered by the fixture cover 31X, as shown in FIG. 11(a) and FIG. 11(b). The female joint portion 25X of an (n+1)-th refractory/heat insulating panel 1X, which will become an upper panel, is placed on the male joint portion 21X of the n-th refractory/heat insulating panel 1X, as shown in FIG. 9. Accordingly, in order to form an exterior wall, the above-described step is repeated from the ground sill toward the eaves.

The fixture cover 31X may have the shapes shown in FIG. 12(a) through FIG. 12(f).

Figure 13:
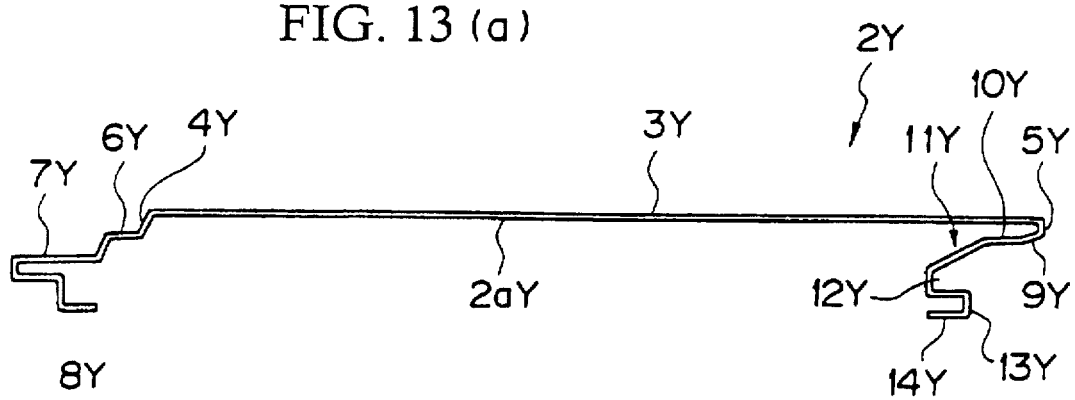
FIG. 13 shows side views of a surfacing material and a backing material of a refractory/heat insulating panel in which assembling performance is improved by forming a slant face in a female joint portion.
Figure 13:
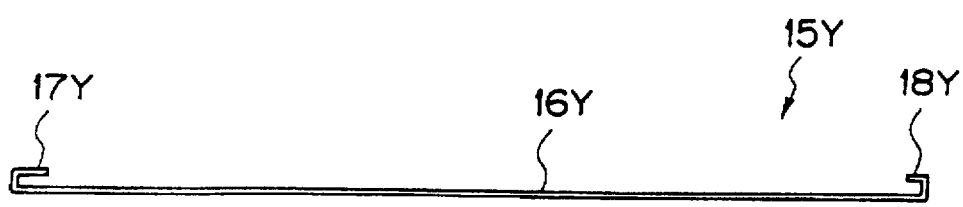
Figure 14:
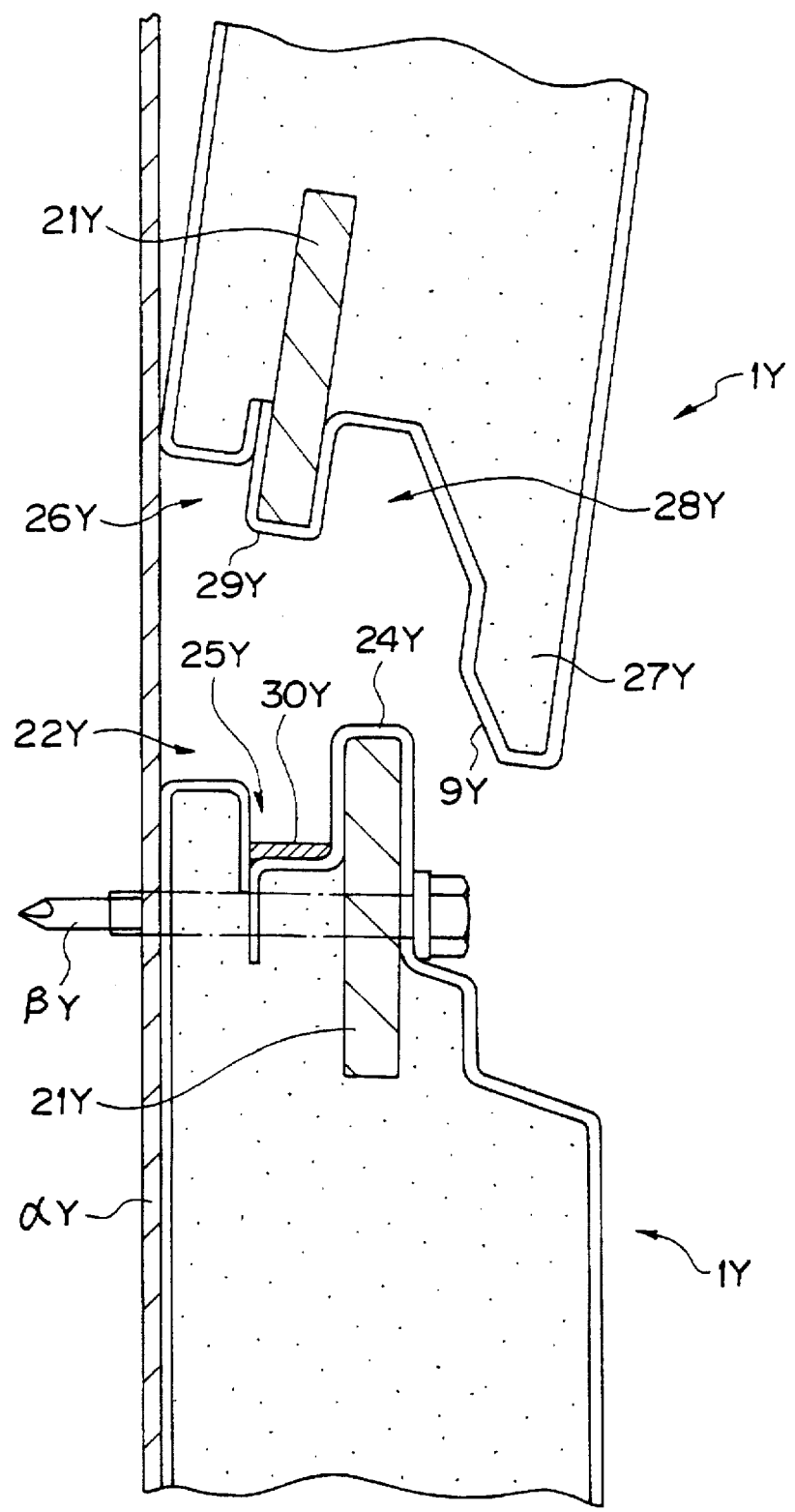
FIG. 14 is a longitudinal sectional view of the essential part of joint portions in the course of assembling refractory/heat insulating panels formed by the surfacing material and the backing material shown in FIG. 13.
Figure 15:
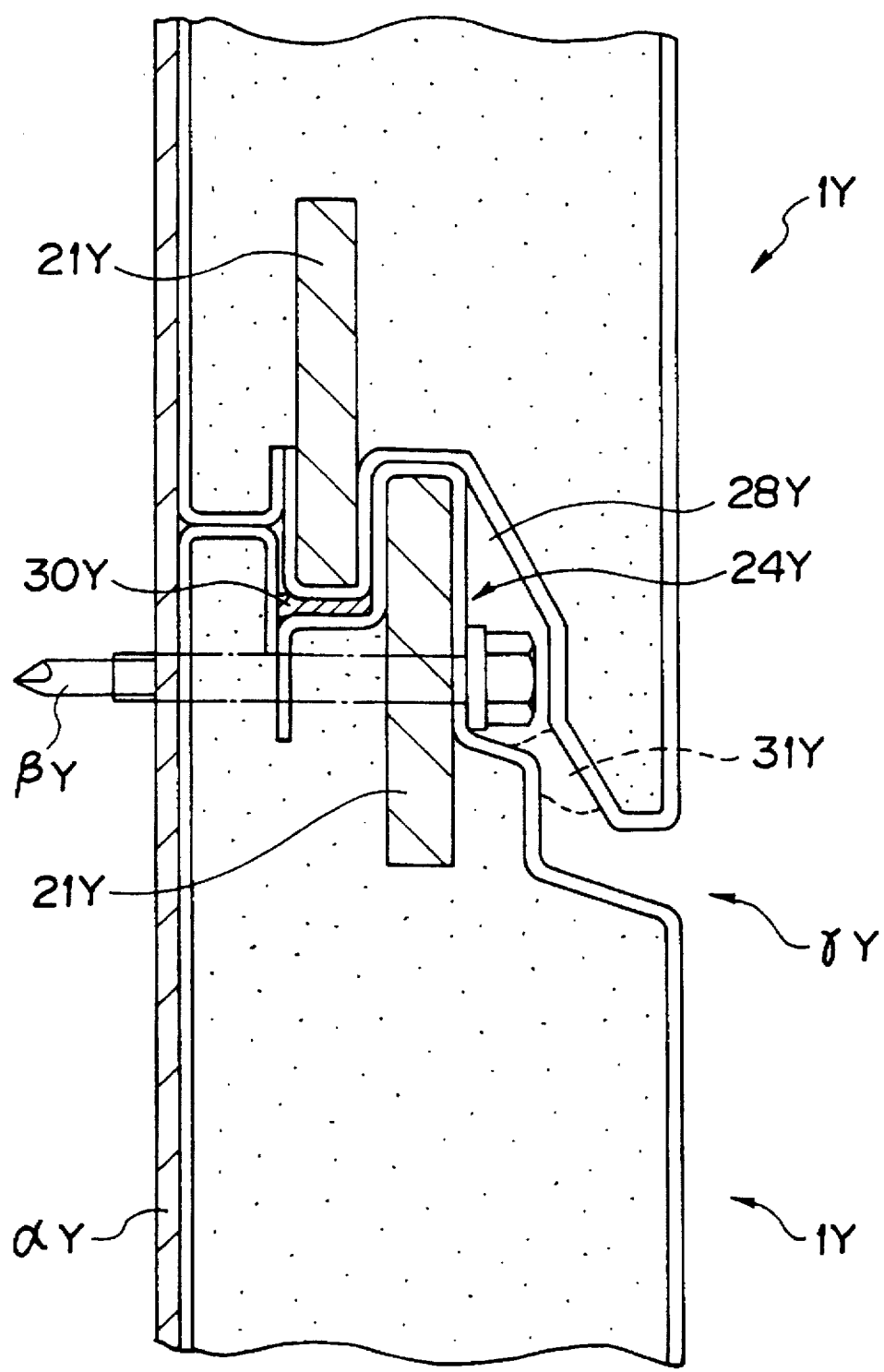
FIG. 15 is a longitudinal sectional view of the essential part of joint portions after refractory/heat insulating panels formed by the surfacing material and the backing material shown in FIG. 13 have been assembled.

Further, a slanted surface may be provided at the cover portion of the female joint portion instead of the fixture guide 31 and the fixture cover 31X. An example of such a structure is shown in FIG. 13 through FIG. 15. A refractory/heat insulating panel 1Y used in this example has a substantially similar structure as the aforementioned refractory/heat insulating panel 1, and is provided with a male joint portion 22Y and a female joint portion 26Y at both longitudinal side edges.

As shown in FIG. 13(a), the surfacing material 2Y, for example, includes a laterally elongated decorative surface portion 3Y, and side edges 4Y and 5Y which are formed by bending both lateral side edges of the decorative surface portion 3 inwardly. Formed at one end of the surfacing material 2Y are a joint bottom surface 6Y outwardly extending from the lower end of the side edge 4Y, a fixation convex portion 7Y which is formed by downwardly bending the tip of the joint bottom surface 6Y and which is projected outward to have a U-like shape, and a reinforcing flap section 8Y which is formed by inwardly bending the lower edge portion of the fixation convex portion 7Y in an L-like shape. Further, formed at the other end of the surfacing material 2Y are a slanted surface 9Y formed by inwardly extending the lower end portion of the side edge 5Y with inclination, a lower edge 10Y formed by further extending the tip of the slanted surface 9Y in a horizontal direction, a step portion 11Y formed by slanting and bending the tip of the lower edge 10Y downwardly, an insertion groove 12Y formed by inwardly bending the lower end portion of the step portion 11Y to obtain an approximately U-shaped cross section, an insertion convex portion 13Y which is formed by outwardly bending the tip of the insertion groove 12Y and which is projected outward to have a U-like shape, and a receiving surface 14Y extending from the lower edge of the insertion convex portion 13Y. The slanted surface 9Y is provided for eliminating the problem that joint of the refractory/heat insulating panes is hindered by an interference between the head portion of the fixture $\beta$ Y and the lower end of a side edge 6Y of the refractory/heat insulating panel 1Y, which may occur when the refractory/heat insulating panels 1Y are joined with each other, as shown in FIG. 14. This greatly improves the assembly.

As shown in FIG. 13(b), the backing material 15Y includes a laterally elongated bottom surface 16Y facing the decorative surface portion 3Y, and flaps 17Y and 18Y which are formed by inwardly bending both end portions of the bottom surface 16Y in a U-like shape.

The male joint portion 22Y is a side end portion which is integrally formed by the stationary convex section 7Y, the reinforcing flap section 8Y, and the flap 17Y. The male joint portion 22Y has a step portion 23Y which is formed by depressing one side edge of the decorative surface portion 3Y so as to receive a cover portion 27Y of the female joint portion 26Y such that the cover portion 27Y is flush with the decorative surface portion 3Y without projecting therefrom. The male joint portion 22Y also has an upper protrusion 24Y for acting as a guide and for increasing engagement force, and an insertion concave portion 25Y engageable with a main convex portion 29Y which will be described later.

The female joint portion 26Y is composed of a cover portion 27Y for covering the step portion 23Y, an insertion groove 28Y having an approximately U-like cross section, and the main convex portion 29Y which will be inserted into the insertion concave portion 25Y.

Next, an example of assembly will be briefly described. An assumption is made that the above-described refractory/heat insulating panel is assembled in the manner shown in FIG. 14 and FIG. 15. A water drip, a starter and the like are fixed to the lower end of the frame α Y although they are not illustrated in the drawings. As shown in the drawing, an n-th refractory/heat insulating panel 1Y is fixed to the frame αY via the fixture βY.

Subsequently, the female joint portion 26Y of an (n+1)-th refractory/heat insulating panel 1Y, which will become an upper panel, is placed on the male joint portion 22Y of the n-th refractory/heat insulating panel 1Y. Accordingly, in order to form an exterior wall, the above-described step is successively carried out from the ground sill toward the eaves.

A packing material 31Y disposed in the joint portion γY and illustrated with a dotted line in FIG. 15 is a similar one to the above-described packing material 30, and prevents rain or the like from entering through the joint portion γY. The packing material 31Y mainly provides functions as a waterproof material, an air-tight material and the like, and is provided as necessary.

Figure 16:
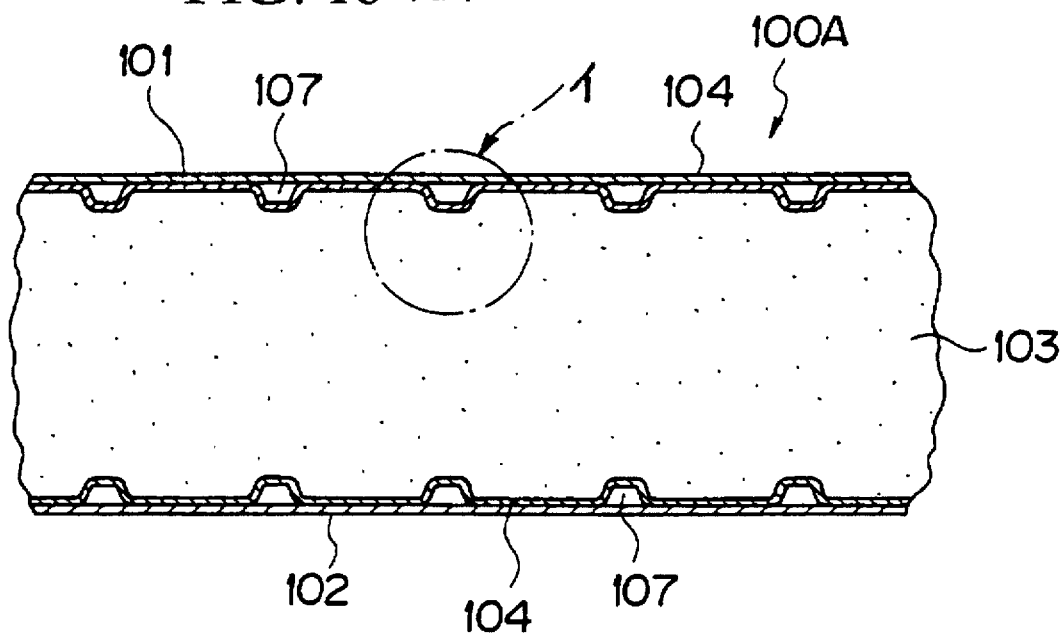
FIG. 16 shows sectional views of the essential part of a refractory/heat insulating panel according to the second embodiment of the invention.
Figure 16:
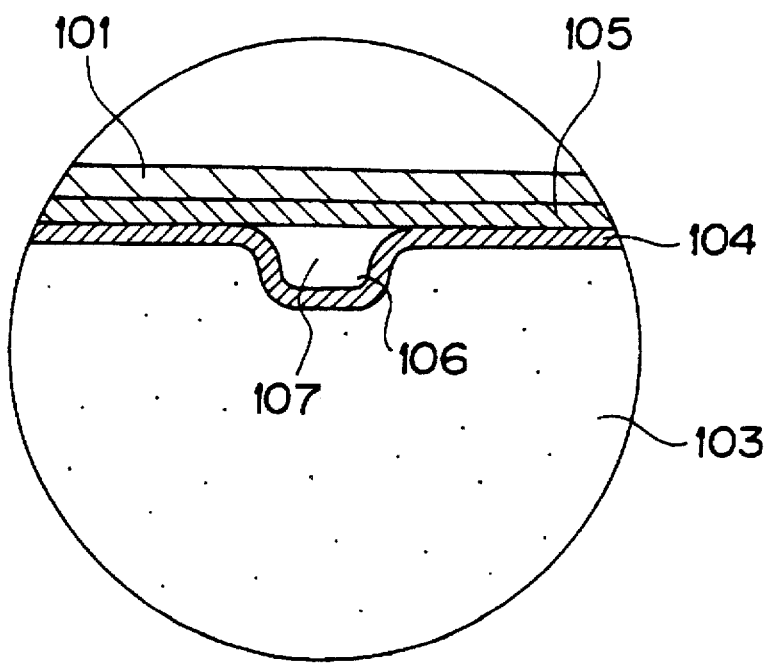
Figure 17:
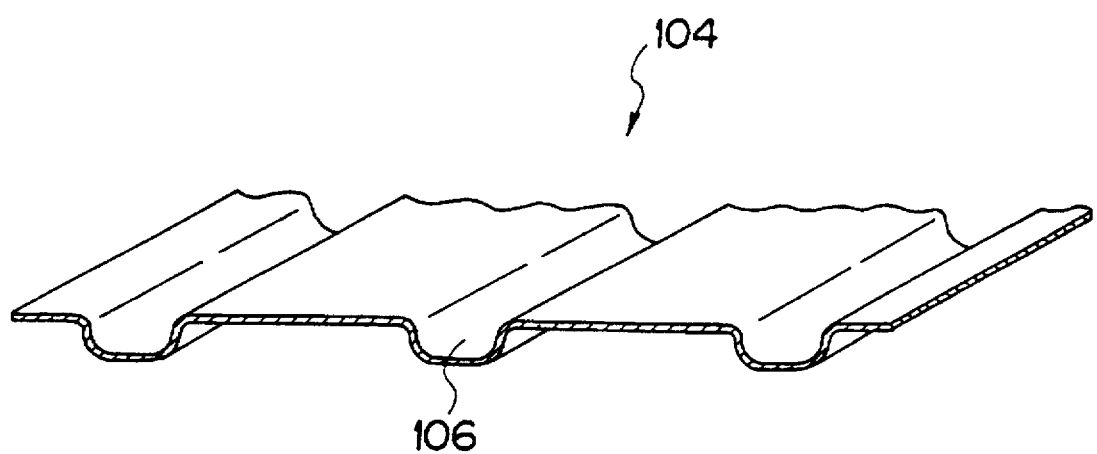
FIG. 17 is a perspective view of the essential part of an example of the nonwoven fabric in FIG. 16.
Figure 18:
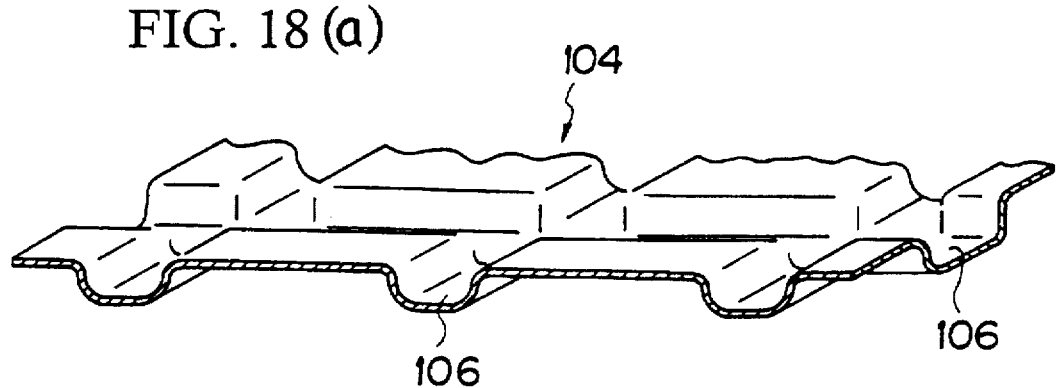
FIG. 18 presents perspective views showing the essential part of other embodiments of a nonwoven fabric.
Figure 18:
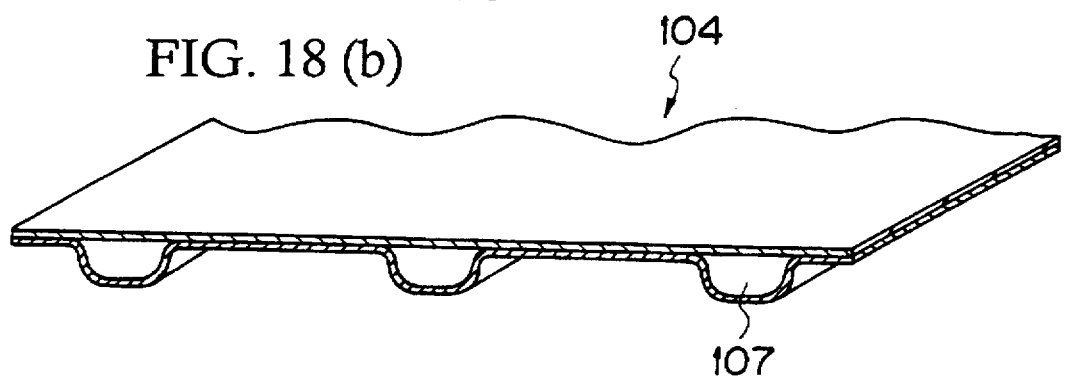
Figure 18:
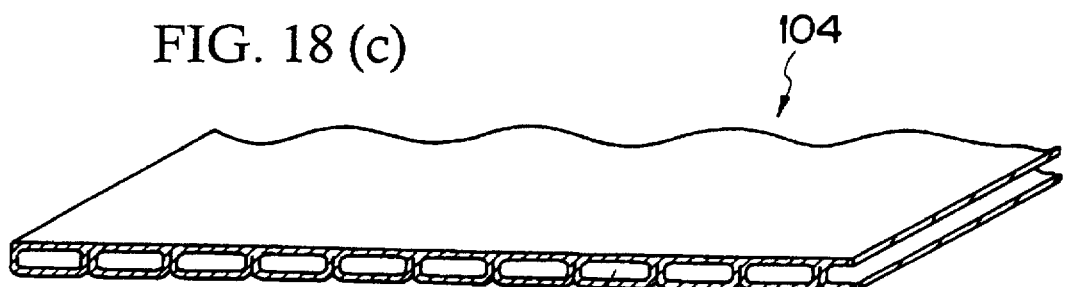
Figure 18:
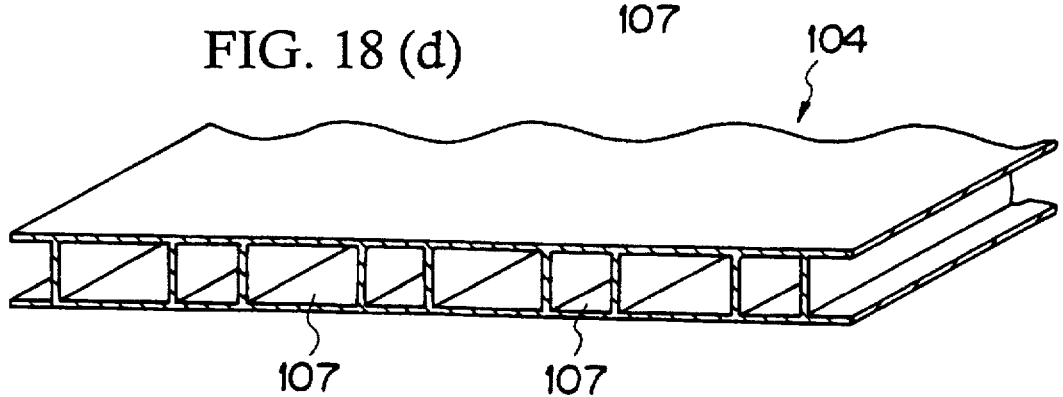

Second embodiment (FIG. 16 through FIG. 18)

This embodiment refers to an example of a refractory/heat insulating panel in which a nonwoven fabric is used, and the cross section of a typical example thereof is schematically shown in FIG. 16(a) and FIG. 16(b) which is an enlarged cross section of the portion A of FIG. 16(a). As shown in the drawings, a refractory/heat insulating panel 100A is composed of a surfacing material 101, a backing material 102, a core material 103, and a nonwoven fabric 104.

Similar materials as used in the first embodiment are used for the surfacing material 101, the backing material 102 and the core material 103. Further, it is possible to enhance the refractory performance and the fire protecting performance by mixing a light-weight aggregate (pearlite, glass beads, plaster slag, talc, shirasu balloons, or the like), or fibers (glass wool, rock wool, carbon fibers, graphite and the like) into the core material 103 as fire-retardants.

As shown in FIG. 16(b), the core material 103 is sandwiched between the surfacing material 101 and the backing material 102 via the nonwoven fabric 104. The nonwoven fabric 104 is bonded, with an adhesive material 105, to the inner surface of the surfacing material 101 and the inner surface of the backing material 102, both the inner surfaces facing the core material 103. The nonwoven fabric 104 is a sheet made of one or more kinds of fibers selected from polyester type, nylon type, boron type, carbon type, alumina type, silicon carbide type, aramid type, glass fiber type and rock wool type. The sheet may have a net-like shape. The nonwoven fabric 104 has an air ventilating function and increases the mechanical strength of the panel 100A. As a result, the flexural strength and the wind pressure resisting strength of the panel 100A are increased, and the pitch at which the plate is mounted to a building frame can be made longer. When the surfacing material 101, the backing material 102 and the core material 103 are integrally bonded by the self-adhesiveness of the phenol foam, the unevenness of the nonwoven fabric 104 produces an anchor effect, thereby increasing the adhesive force between the surfacing material 101 and the core material 103 and between the core material 103 and the backing material 102. In addition, the nonwoven fabric 104 has a function of increasing the flatness of the surfacing material 101 and the backing material 102.

Although it is preferred to form ventilating grooves 106 in the nonwoven fabric 104 as shown in FIGS. 16 to 18 so as to form an air ventilating passage 107 which will be described later, the nonwoven fabric 104 may have a flat shape without providing especially ventilating grooves 106. The nonwoven fabric 104 by itself has a function for releasing outside the condensed water and vapor produced during the formation of the phenol foam, a function for separating them, a water absorbing function, a retaining function, a function of acting as a flat material, a function of controlling the phenol foam reaction system, a reinforcing function, a function of forming a fire-protecting and non-combustible layer, and an anchor function. Especially, the air gaps, thickness, and hydrophilic nature of the nonwoven fabric 104 realize the discharge of condensed water which are produced during the reaction of the phenol foam, the prevention of decrease in the adhesiveness due to the condensed water, and the control of reaction in which the curing of the phenol foam is effected in an optimal state during the time when it permeates the nonwoven fabric 104. These functions are useful for enhancing the integration between the nonwoven fabric 104 and the phenol foam. Although not illustrated in the drawings, since the nonwoven fabric 104 has a permeability or a hydrophilic nature, an adhesive and a phenol foam (core material 103) properly permeate into the nonwoven fabric 104 during the manufacturing process, thereby greatly increasing the adhesive force between the surfacing material 101 and the core material 103 and between the core material 103 and the backing material 102. In addition, it is possible to suppress deformations of the surfacing material 101, the backing material 102 and the core material 103 which may occur with time after the manufacture, thereby maintaining the beautiful appearance over a prolonged period of time.

As the adhesive 105, a material is selected from the group consisting of types in which curing is effected by polymerization reaction such as cyano acrylate, epoxy; emulsion types such as rubber type, vinyl acetate type; and hot melt types such as ethylene-vinyl acetate type, EVA and the like.

The unwoven fabric 104 has a sheet-like shape, as shown in FIG. 17, and a plurality of ventilating grooves 106 having an approximately concave cross section are formed at a predetermined pitch. As shown in FIG. 16(b), the ventilating grooves 106 form air ventilating passages 107 in cooperation with the surfacing material 101 and the backing material 102. Accordingly, it is possible that condensed water remaining in the phenol foam of the core material 103 over the curing period of the refractory/heat insulating panel 100A after it is manufactured or even after panels are assembled can be effectively released outside from the butt ends of the panel 100A through the air ventilating passages 107. As a result, deformation (swelling, warping, etc. of the surface) of the panel 100A with time after the manufacture can be prevented. Additionally, since acidic components contained in the phenol foam of the core material 103 is released outside to a certain extent together with moisture, development of rust and deterioration in quality of the surfacing material 101 and the backing material 102 can be prevented in the cases where they are made of a steel plate or the like, respectively.

The above-described embodiment is an example of refractory/heat insulating panels in which a nonwoven fabric is used, and the embodiment may be modified as follows. FIG. 18(a) through FIG. 18(d) are other examples of the nonwoven fabric 104. In the example shown in FIG. 18(a), ventilating grooves 106 extending in a lateral direction are formed as well as ones extending in a longitudinal direction. In the example shown in FIG. 18(b), air ventilating passages 107 are previously formed in the nonwoven fabric 104 by superimposing two nonwoven fabrics one on the other. In the example shown in FIG. 18(c), pipe-shaped air ventilating passages 107 are formed such that the ventilating passages 107 are successively connected. In the example shown in FIG. 18(d), the nonwoven fabric 104 has a layered structure.

Figure 19:
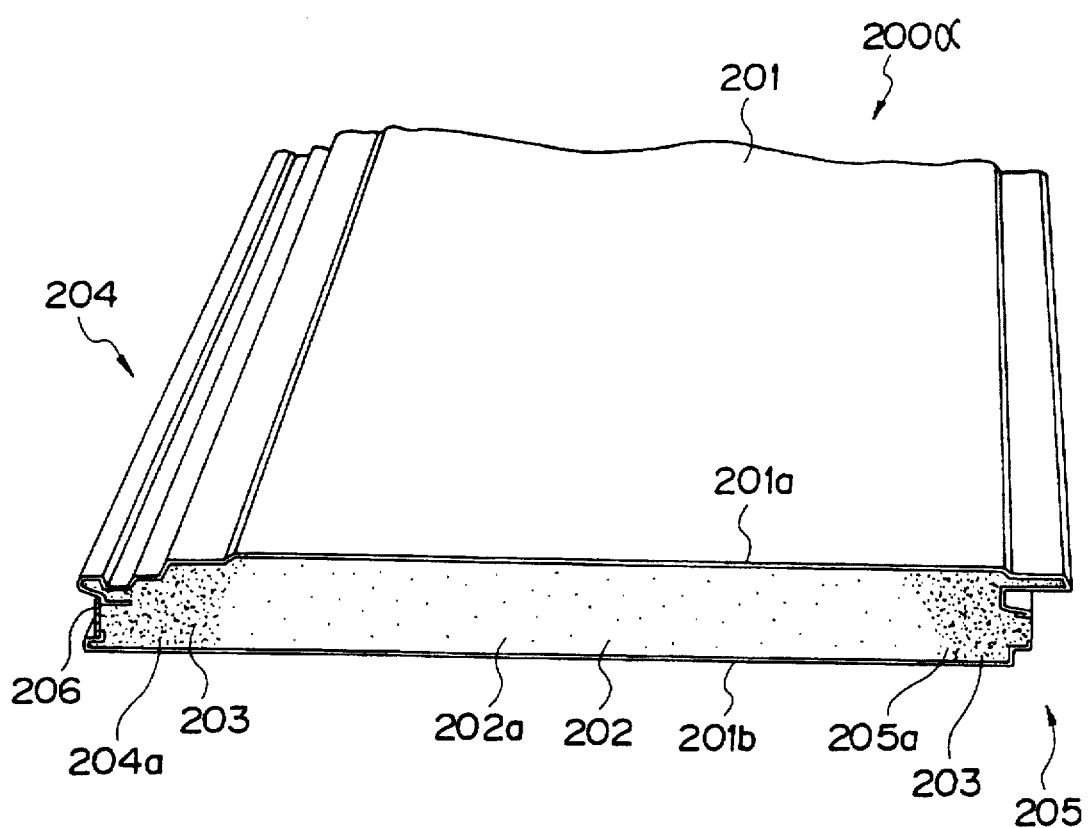
FIG. 19 is a perspective view of the essential part of a refractory/heat insulating panel according to the third embodiment of the invention.
Figure 20:
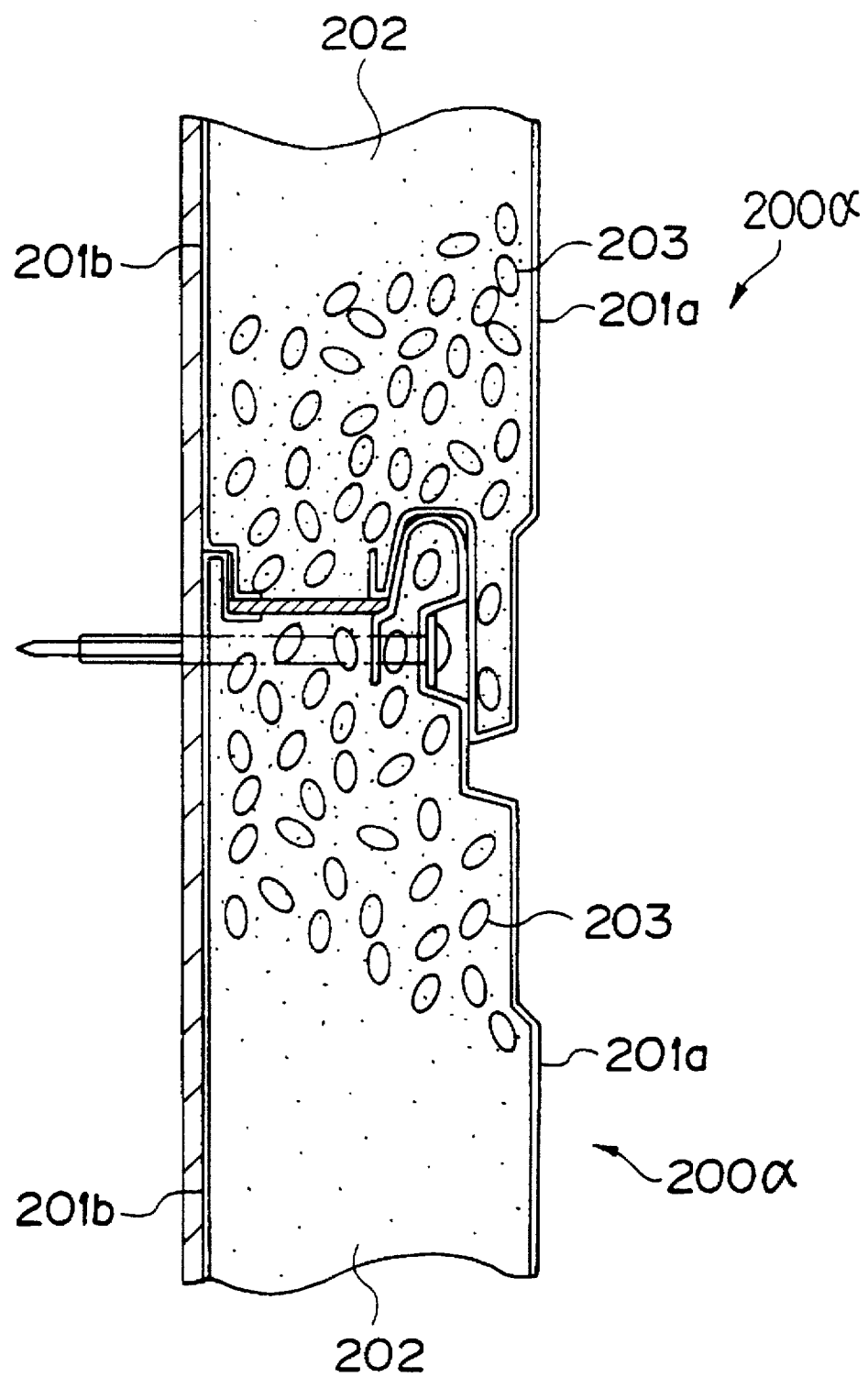
FIG. 20 is a longitudinal sectional view of the essential part of joint portions of refractory/heat insulating panels according to the third embodiment when assembled.

Third embodiment (FIG. 19 and FIG. 20)

A refractory/heat insulating panel according to the present embodiment is an example in which a light-weight aggregate is used, and a typical example thereof is shown in FIG. 19 and FIG. 20. Numeral 201 denotes a noncombustible substrate material composed of a surfacing material 201a and a backing material 201b. Numeral 202 denotes a core material, 203 a lightweight aggregate, 204 a male joint portion, and 205 a female joint portion.

Although similar materials as used in the above-described embodiments are used for the noncombustible substrate material 201 and the core material 202, the light-weight-aggregate 203 is incorporated in side portions for joining the core material 202, i.e., in the male joint portion 204 and the female joint portion 205. The light-weight aggregate is made of pearlite, glass beads, plaster slag, talc, shirasu balloons, or the like, which are widely used as general purpose products. The light-weight aggregate is mixed in an amount which is determined in accordance with a desired performance.

Since the refractory/heat insulating panel 200α manufactured in the above-described manner includes the light-weight aggregate 203 incorporated in the joint portions which are the weakest portions in terms of refractory performance, the fire resistance and the mechanical strength of the joint portions can be greatly increased. Therefore, it is possible to obtain a refractory/heat insulating panel which passes the 1-hour refractory construction test of JIS-A-1304 (a method of testing refractory performance of building structures).

Figure 21:
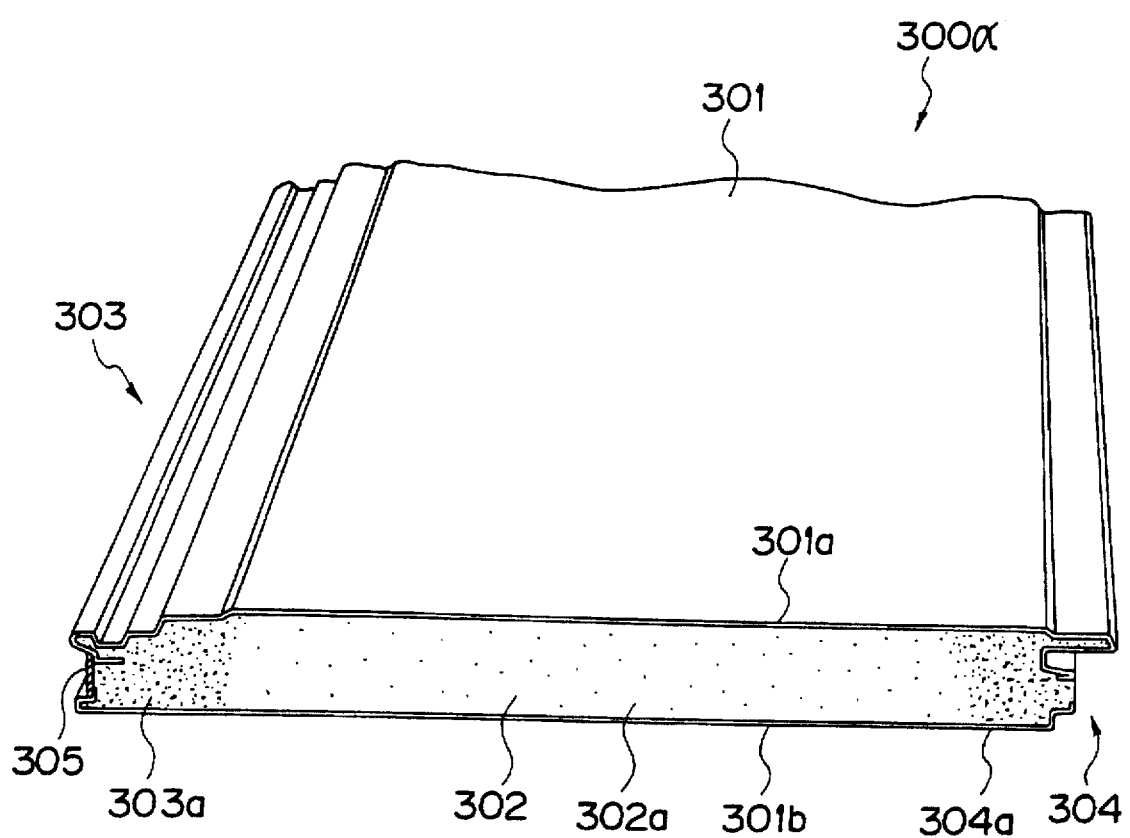
FIG. 21 is a perspective view of the essential part of a refractory/heat insulating panel according to the fourth embodiment of the invention.
Figure 22:
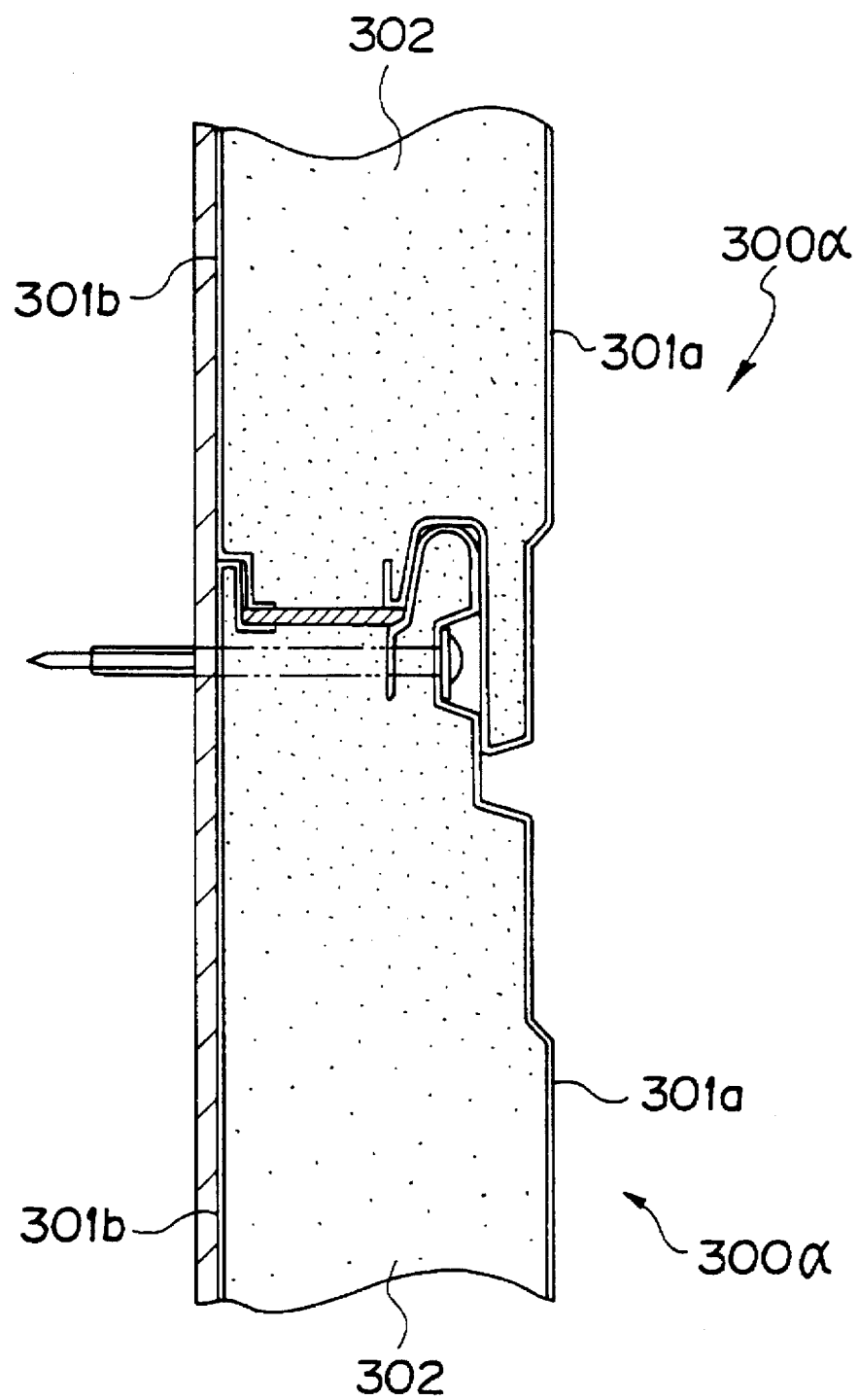
FIG. 22 is a longitudinal sectional view of the essential part of joint portions of refractory/heat insulating panels according to the fourth embodiment when assembled.
Figure 23:
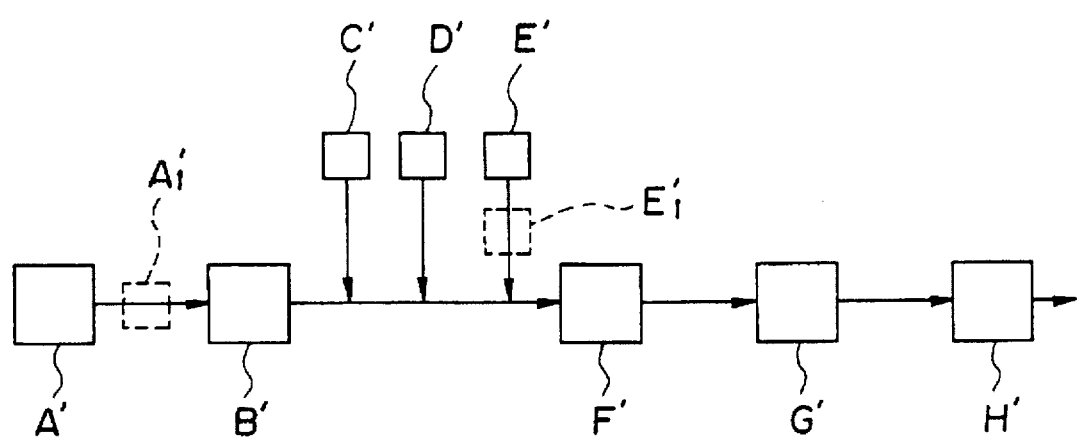
FIG. 23 is a schematic view showing the steps of manufacturing a refractory/heat insulating panel according to the fourth embodiment of the invention.

Fourth embodiment (FIG. 21 through FIG. 23)

A refractory/heat insulating panel according to the present embodiment is an example in which the density of a core material is increased at joining ends, and a typical example thereof is shown in FIGS. 21 and 22. Numeral 301 denotes a noncombustible substrate material composed of a surfacing material 301a and a backing material 301b. Numeral 302 denotes a core material, 303 a male joint portion, and 304 a female joint portion. Although the similar materials as used in the above-described embodiments are used for the noncombustible substrate material 301 and the core material 302, the core material 302 has different densities at different portions.

Namely, the core material 302 is divided into a left side portion 303a corresponding to the male joint portion 303, a right side portion 304a corresponding to the female joint portion 304, and a central portion 302a located therebetween. The left side portion 303a and the right side portion 304a are made of a high density phenol foam which is fire resistant and has a density of about 100 to 500 Kg/m³, while the central portion 302a is made of a low density phenol foam having a density of about 50 to 200 Kg/m³. Of course, the boundaries between the left side portion 303a and the central portion 302a and between the central portion 302a and the right side portion 304a are not strictly defined, and the high density phenol foam and the low density phenol foam both exist around the boundaries.

In the refractory/heat insulating panel 300a manufactured in the above-described manner, a high density phenol foam having refractory performance is used at the joint portions which are the weakest portions in terms of the fire resistance. Therefore, it is possible to obtain a refractory/heat insulating panel α which passes the 1-hour refractory construction test of JIS-A-1304 (a method of testing refractory performance of building structures). In addition, since the central portion 302a, which is the main portion of the panel, has a low density, the amount of an expensive phenol foam resin to be used can be reduced.

An example of a method of manufacturing the above-described refractory/heat insulating panel 300α is shown in FIG. 23. First, a noncombustible substrate material 301 such as a color steel sheet (having a thickness of 0.5 mm), which will be used as a surfacing material 301a, is fed from a supply step A' (for example, an uncoiler or a lifter) to a heating step B' in which the noncombustible substrate material 301 is heated at a temperature of about 20° to 80° C. Subsequently, an unfoamed resol type phenol foam in the form of a stock solution is delivered to the left and right side portions of the noncombustible substrate material 301 from a delivering machine C' such that the final density as high as 100 to 500 Kg/m³ is obtained. Further, the raw material, phenol foam, is delivered to the central portions of the noncombustible substrate material 301 from a delivering machine D' such that the density becomes as low as 50 to 200 Kg/m³. Another noncombustible substrate material 301 such as a color steel sheet (having a thickness of 0.5 mm), which will be used as a backing material 301b, is fed from a supply step E', is superposed onto the phenol foams, and then fed to a prescribed cure oven F' in which curing is effected at a temperature of about 30° to 100° C. for 7 to 15 minutes in a continuous process or in a batch process. It is then cut into a predetermined size by a cutter G', and is then fed to a packaging step H. Of course, molding steps A1' and E1' exist after the supply steps A' and E' as shown by dotted lines so as to mold the noncombustible substrate material 301 in various shapes. The core material 302 is finally formed to have an approximately uniform density of 50 to 300 Kg/m³.

It is possible to incorporate various flame-retardants into the core material 302 to provide a refractory/heat insulating panel 300α to improve further the fire resistance. Needless to say, the densities and the like of the left side portion 303a, the right side portion 304a and the central portion 302a can be varied in accordance with the desired performances.

Figure 24:
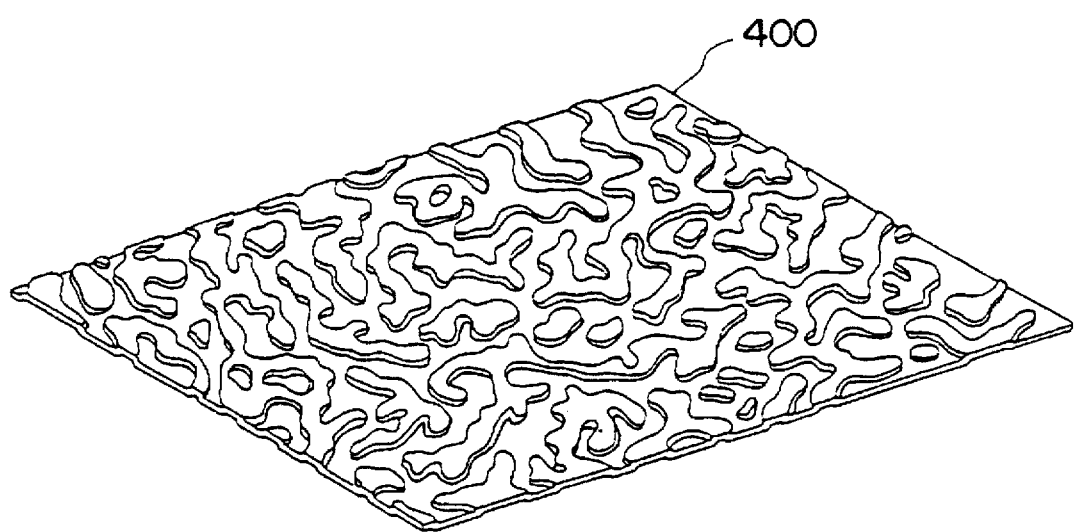
FIG. 24 is a perspective view of the essential part of a surfacing material or backing material of a refractory/heat insulating panel according to the fifth embodiment of the invention.

Fifth embodiment (FIG. 24)

A refractory/heat insulating panel according to the present embodiment is an example in which embossing is effected on the surfacing material and/or the backing material. Although the similar materials as used in the above-described embodiments are used for the surfacing material, the backing material and the core material, the surfacing material and/or the backing material 400 are provided with uneven surfaces formed by embossing as shown in FIG. 24. The uneven surfaces formed by embossing act as anchors so that the adhesiveness between the surfacing material and the core material, or between the core material and the backing material, is enhanced, and the mechanical strength of the refractory/heat insulating panel also increases. Accordingly, the mounting pitch at which the panel is mounted to a frame can be prolonged, thereby facilitating construction work.

Figure 25:
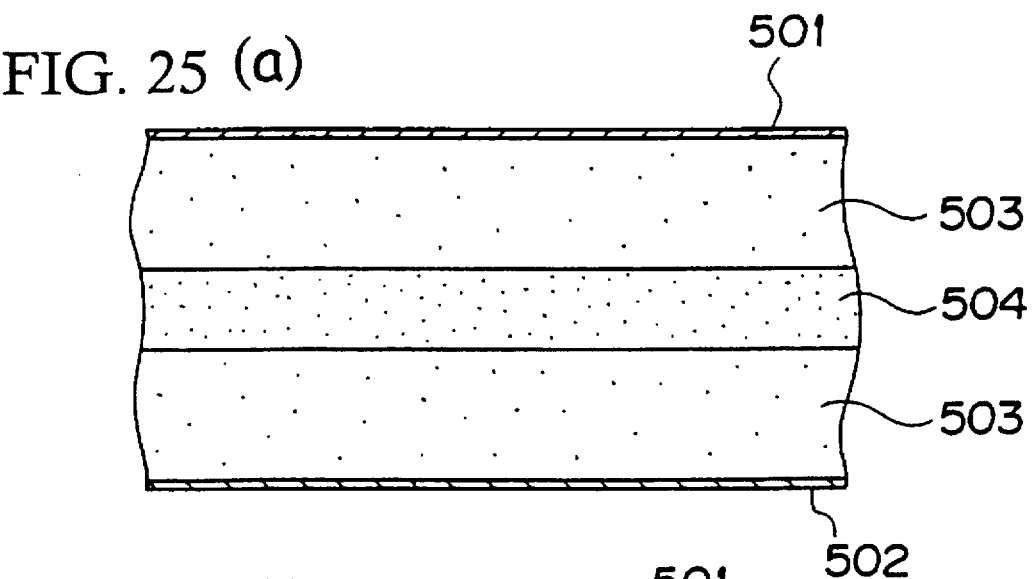
FIG. 25 presents sectional views of the essential part of a refractory/heat insulating panel according to the sixth embodiment of the invention.
Figure 25:
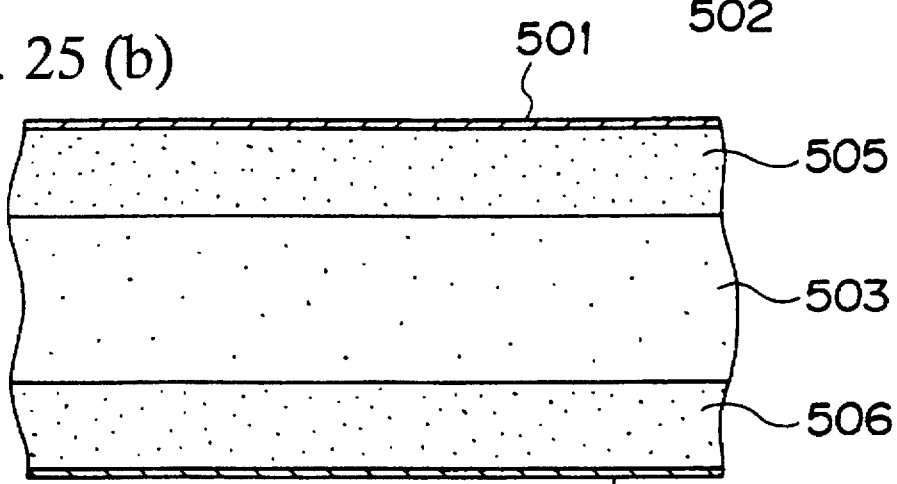
Figure 25:
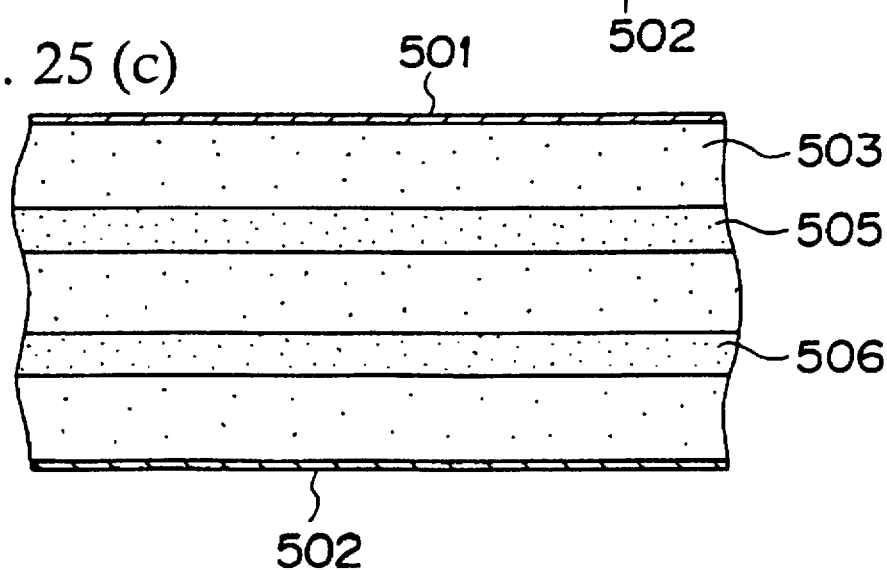

Sixth embodiment (FIG. 25)

A refractory/heat insulating panel according to the present embodiment is an example in which an isocyanurate foam layer and/or a polyurethane foam layer are provided in the core material. Although the similar materials as used in the above-described embodiments are used for the surfacing material 501, the backing material 502 and the core material 503, the core material 503 is provided with a single layer of an isocyanurate foam layer or a polyurethane foam layer 504 formed therein, as shown in FIG. 25(a). Alternatively, an isocyanurate foam layer 505 and a polyurethane foam layer 506 (or isocyanurate foam layers 505 and 506, or polyurethane foam layers 505 and 506) are provided such that these layers are placed in the core material 503 or these layers sandwich the core material 503 (FIGS. 25(b) and (c)).

With this isocyanurate foam layer and/or polyurethane foam layer, the strength of the entire refractory/heat insulating panel is greatly increased. Further, deformation due to heat hardly occurs, and the fire resistance of joint portions is greatly improved. Since the isocyanurate foam layer and/or the polyurethane foam layer act as an air ventilating layer, the condensed water remaining in the core material over the curing period of the refractory/heat insulating panel after it is manufactured or even after panels are assembled can be effectively released outside the panel. As a result, deformation (swelling, warping, etc. of the surface) of the panel with time after the manufacture can be prevented.

Seventh embodiment (FIG. 26 through FIG. 29)

Figure 26:
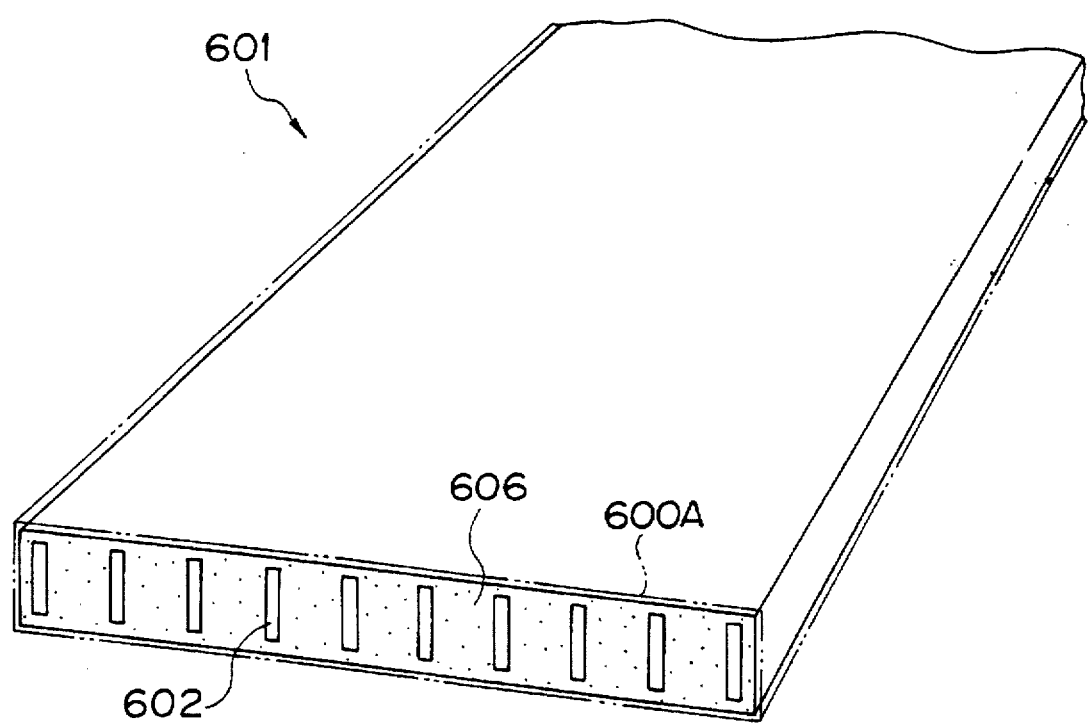
FIG. 26 is a perspective view of the essential part of the core material portion of a refractory/heat insulating panel according to the seventh embodiment of the invention.
Figure 27:
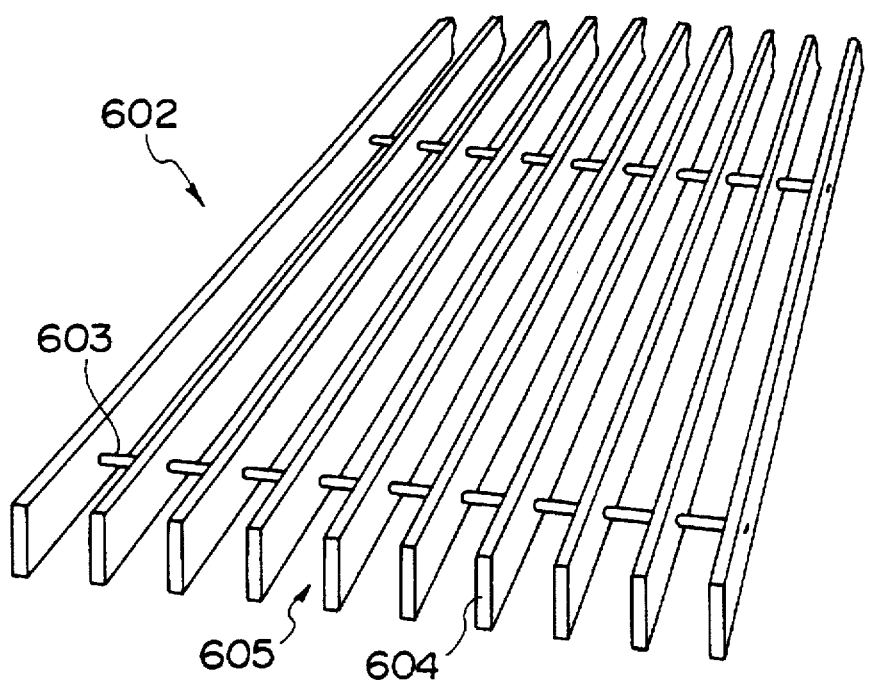
FIG. 27 is a perspective view of the essential part of the wooden skeleton members shown in FIG. 1.

A refractory/heat insulating panel according to the present embodiment is an example in which a wooden skeleton member is buried in a core material. A typical example of such panel is shown in FIG. 26. FIG. 27 shows a typical example of a wooden skeleton member which is buried in the core material.

A wooden skeleton member 602 is formed by combining lateral cross-pieces 603 having a rod-like shape and longitudinal rods 604 having a board-like shape which is perpendicular to the lateral pieces, and bas (1) a reinforcing function, (2) a moisture controlling function, (3) a size stabilizing function and (4) a function of removing hindrances in reaction. Specifically, the functions (1) and (3) are functions obtained by the wooden skeleton member 602. The wooden skeleton member 602 is a material having a capability of controlling moisture, which realizes the function (2) by which changes such as shrinkage can be suppressed, and condensed water produced during the reaction of the core material can be absorbed. Since the core material 606 is made of a similar material as used in the above-described embodiments, and is a foamed material having a small degree of water absorbing function by itself, the core material 606 also has a function of releasing the absorbed water (by evaporation).

Next, an example of a method of manufacturing the panel will be described briefly. A sheet material 600A is placed on the entire inner wall of a predetermined die material (not shown). Subsequently, the wooden skeleton member 602 is placed on a lower die which is heated to a temperature of about 40 to 90 an unfoamed core material 606 in the foam of a stock solution, to which various components have been added and mixed, is uniformly filled in space 605. Immediately after the filling step, a heated upper die is placed on the lower die. After a predetermined period of time (about 1 to 10 minutes) has elapsed, the dies are removed to obtain a core material 601 as shown in FIG. 26 in which the wooden skeleton is embedded. Air ventilating holes may be formed in the upper and lower dies if necessary.

Figure 28:
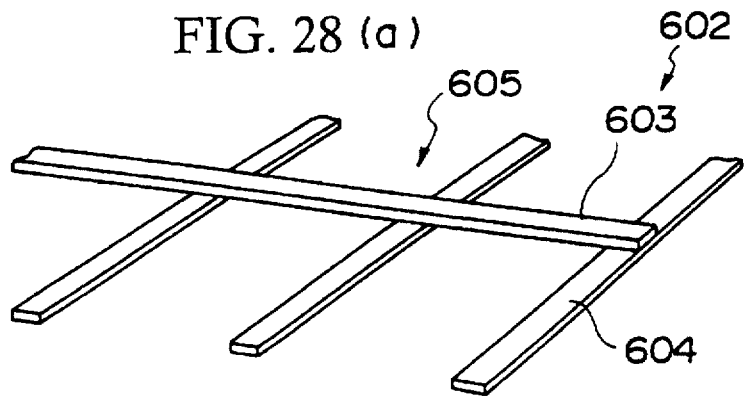
FIG. 28 presents perspective views showing the essential part of other embodiments of wooden skeleton members.
Figure 28:
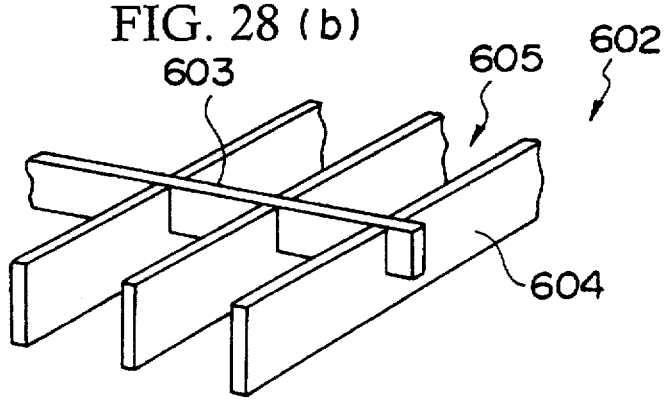
Figure 28:
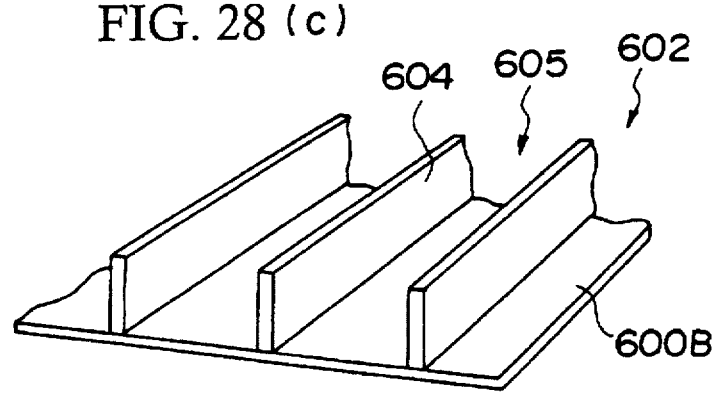
Figure 28:
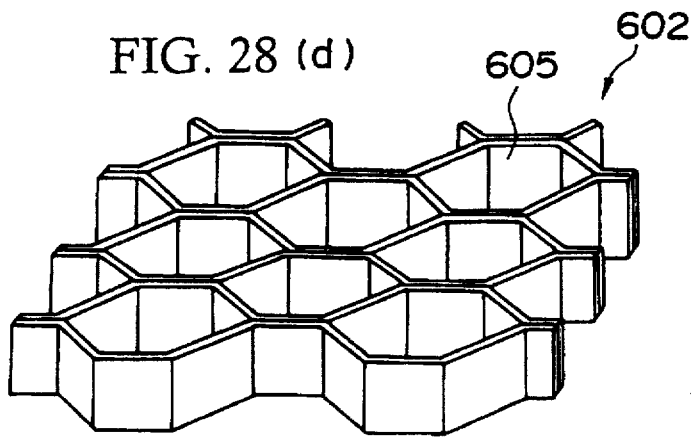

The wooden skeleton member 602 may be constructed as shown in FIG. 28. Namely, a wooden skeleton member 602 shown in FIG. 28(a) has lateral cross-pieces 603 and longitudinal rods 604 which are made of materials similar to each other and are assembled to form a grid-like configuration. A wooden skeleton member 602 shown in FIG. 28(b) includes longitudinal frames 604 each having a cut-away portion, for example, at one side thereof, into which lateral rods 603 are fitted. In a wooden skeleton member 602 shown in FIG. 28(c), longitudinal cross-pieces 604 are attached on a board material 600B in parallel with each other. A wooden skeleton member 602 shown in FIG. 28(d) is a paper honeycomb (including ones formed with a noncombustible paper obtained by a condensed phosphoric acid process, etc.).

Further, the core material 601 in which the wooden skeleton is buried may be formed as shown in FIG. 29. Namely, in a core material 606 shown in FIG. 29(a), board materials 600b are integrally disposed at the upper and lower faces of the core material. A core material 601 shown in FIG. 29(b) is provided with a board material 600B at its one face, and a sheet 600A at the other face. FIG. 29(c) shows a core material 601 formed integrally with a sheet 600A, wherein the rectangular peripheral surfaces are covered by the sheet 600A. In a core material 601 shown in (d), board materials 600B and sheets 600A are integrally disposed at side surfaces, and the upper and lower faces, respectively. A core material 601 shown in (e) is provided with a cushion material 600C at its top face, and a board material 600B at its bottom side.

The sheet 600A is a flexible material formed of one or more kinds of materials selected from the group consisting of paper, synthetic resins, metals, nonwoven fabrics made of noncombustible fibers and materials having a net-like structure. The board material 600B is formed of one or more kinds of material selected from plywoods, wood-texture boards, metallic plates, synthetic resin plates, noncombustible boards (plaster boards, calcium silicate boards, calcium carbonate boards, ALC boards, cement boards, cement boards including wooden fibers, cement board including wooden chips and the like).

The cushion material 600C is a material of synthetic resin type, glass fiber type, inorganic fiber type having bulk densities of two to five times, rubbers, or the like.

Eighth embodiment (FIG. 30 through FIG. 37)

Figure 30:
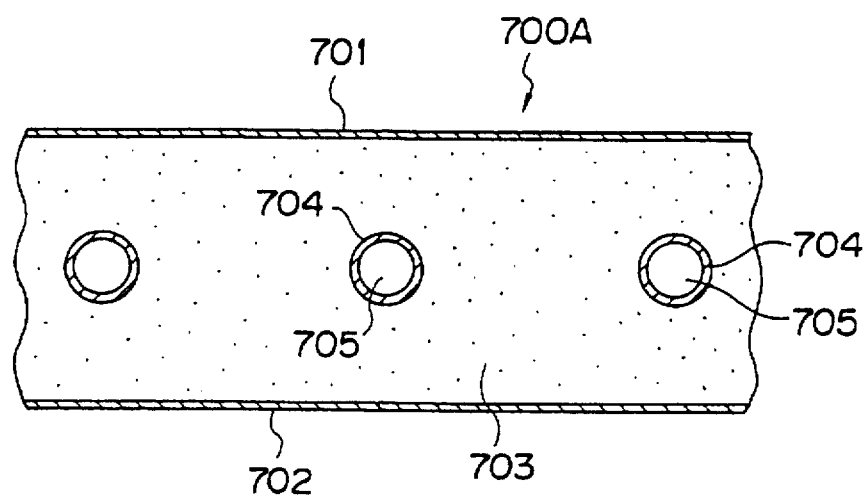
FIG. 30 is a sectional view of the essential part of a refractory/heat insulating panel according to the eighth embodiment of the invention.
Figure 31:
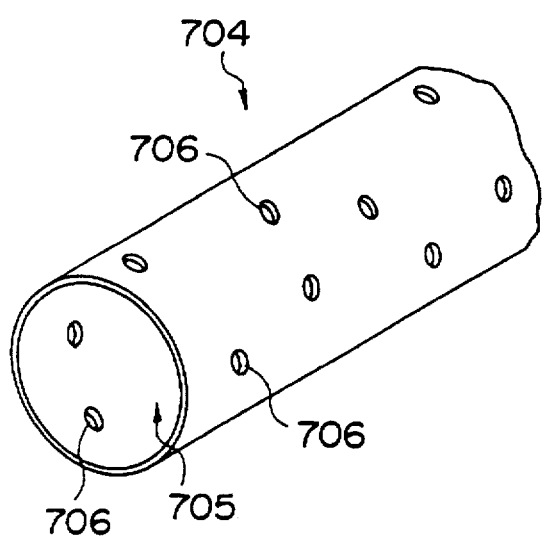
FIG. 31 presents perspective views showing the essential part of embodiments of the pipe-shaped member in FIG. 30.
Figure 31:
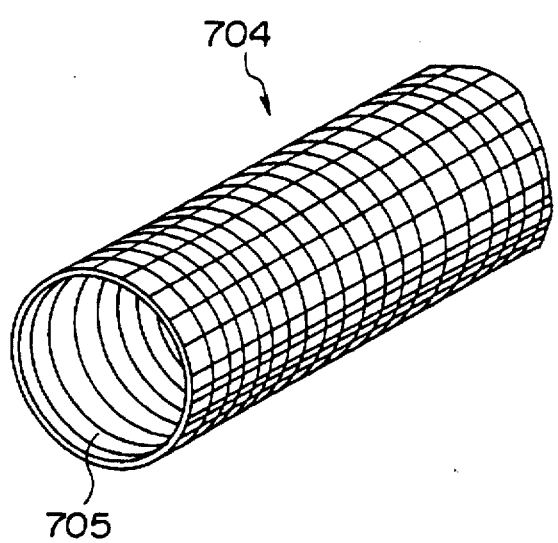
Figure 32:
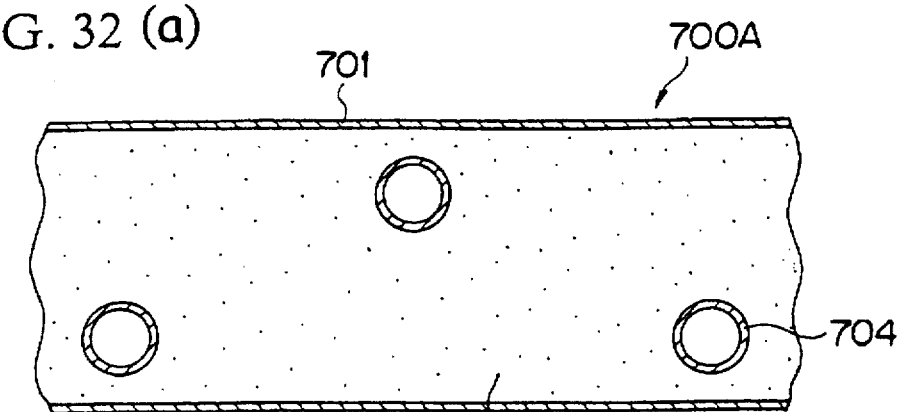
FIG. 32 presents sectional views showing the essential part of other embodiments of a refractory/heat insulating panel in which pipe-shaped members are buried.
Figure 32:
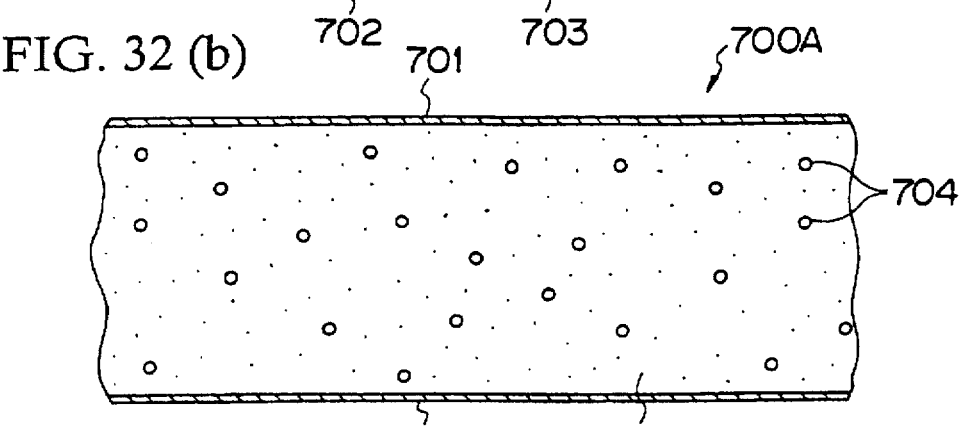
Figure 32:
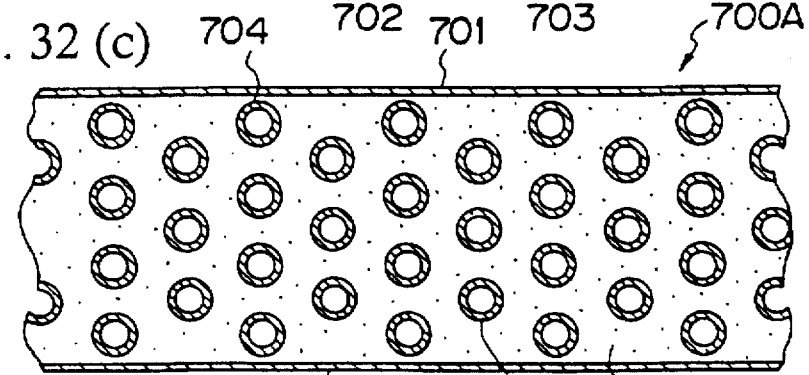
Figure 32:
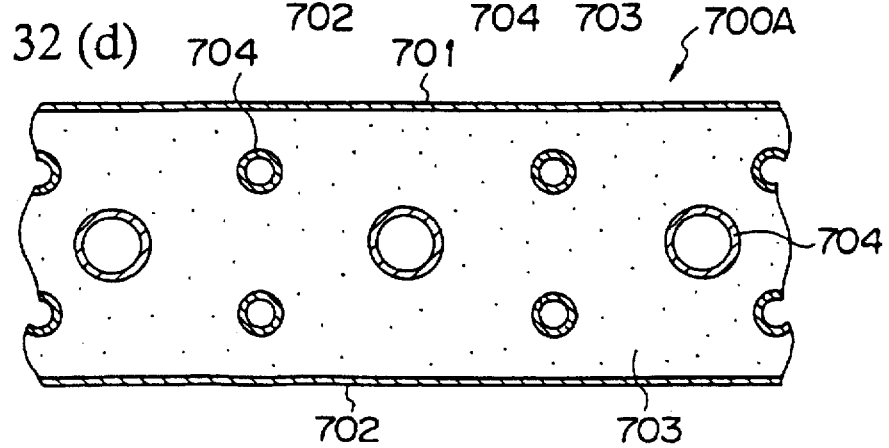

A refractory/heat insulating panel according to the present embodiment is an example in which pipe-shaped members having an air-ventilation property are buried in a core material, and the cross section of a typical example thereof is schematically shown in FIG. 30. As shown in this drawing, a refractory/heat insulating panel 700A is composed of a surfacing material 701, a backing material 702, a core material 703, and pipe-shaped members 704.

The surfacing material 701, the backing material 702, and the core material 703 are made of materials similar to those used in the above described embodiments.

Each of the pipe-shaped members 704 has a hollow 705, as enlarged and shown in FIG. 31(a) and FIG. 31(b), and at least one pipe-shaped member 704 is placed in the core material 703 along the longitudinal direction of the panel 700A. Examples of the materials suitable for the pipe-shaped members 704 shown in FIG. 31(a) include iron plates, aluminum plates, copper plates, stainless steel plates, titanium plates, steel plates plated with an alloy of aluminum and zinc, porcelain enameled steel plates, clad steel plates, laminated steel plates (polyvinyl chloride-coated steel plates and the like), sandwiched steel plates (vibration damping steel plates and the like), inorganic extruded materials, plastic resins, FRP and the like. Examples of the materials suitable for the pipe-shaped members 704 shown in FIG. 31(b) include polyester fibers, nylon fibers, boron fibers, carbon fibers, alumina fibers, silicon carbide fibers, aramid fibers, and glass fibers.

The pipe-shaped members 704 which are made of fibers as shown in FIG. 31(b) exhibit air-permeable property utilizing clearances between fibers. Pipe-shaped members 704 as shown in FIG. 31(a) pass air through a plurality of small holes 706 formed in the peripheral surface of the pipe-shaped members 704.

When one or more pipe-shaped members 704 are disposed in the core material 703, the pipe-shaped members 704 act as reinforcing materials for the core material 703, thereby increasing the mechanical strength of the panel 700A. As a result, the flexural strength and the wind pressure resisting strength of the panel 700A are increased, and the pitch at which the plate is mounted to a building frame can be made longer. Since the pipe-shaped member 704 has an air ventilating function, the condensed water remaining in the phenol foam of the core material 703 over the curing period of the panel 700A or after the panel is manufactured can be effectively released and ventilated from a butt end of the panel 700A through the hollow 705 of the pipe-shaped member 704. As a result, deformation (swelling, warping, etc. of the surface) of the panel 700A with time after manufacture can be prevented. Additionally, since acidic components contained in the phenol foam of the core material 703 is released to a certain extent outside together with water, generation of rust and deterioration in quality of the panel can be prevented in the cases where the surfacing material 701 and the backing material 702 are made of a steel plate or the like.

The above-described refractory/heat insulating panel 700A may be formed as follows. In panels 700A shown in FIGS. 32(a) through 32(d), pipe-shaped members 704 are disposed in core materials 703 in different manners. In the example shown in FIG. 32(a), pipe-shaped members 704 having a large diameter are alternately disposed near the surfacing material 701 and the backing material 702. In the example shown in FIG. 32(b), pipe-shaped members 704 having a small diameter are randomly distributed. In the example shown in FIG. 32(c), a plurality of pipe-shaped members 704 are uniformly distributed. In the example shown in FIG. 32(d), pipe-shaped members 704 having a large diameter and pipe-shaped members 704 having a small diameter are alternately disposed.

Figure 33:
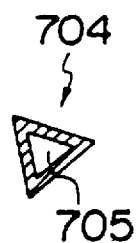
FIG. 33 presents sectional views showing other embodiments of pipe-shaped members.
Figure 33:
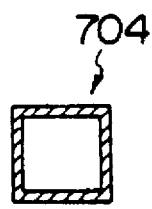
Figure 33:
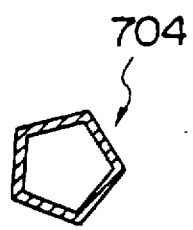
Figure 33:
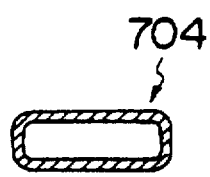
Figure 33:
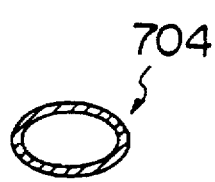
Figure 33:
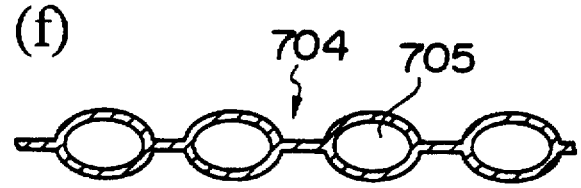
Figure 33:
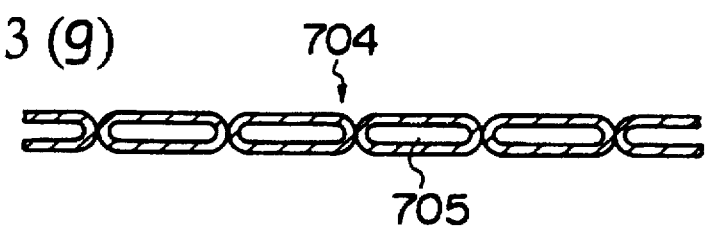

FIG. 33 (a) through (g) show modified examples of pipe-shaped members having different cross sections. In the examples shown in FIG. 33(a) through FIG. 33(e), the shape of each pipe-shaped member 704 is modified. In the examples shown in FIGS. 33(f) and 33(g), adjoining pipe-shaped members 704 are connected to each other to form a sheet-like shape.

Figure 34:
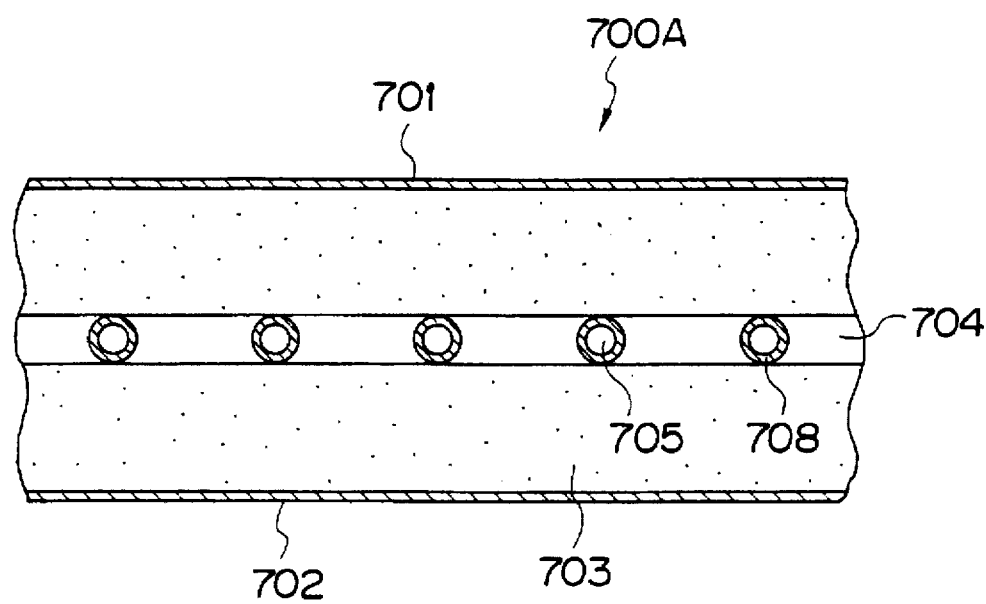
FIG. 34 is a sectional view of the essential part of a further embodiment of a refractory/heart insulating panel in which pipe-shaped members are buried.
Figure 35:
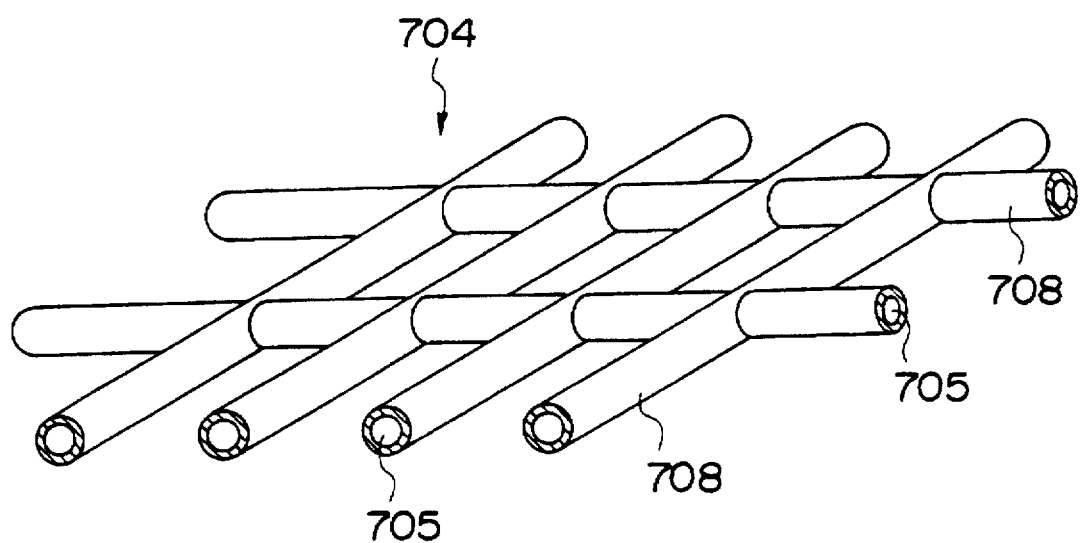
FIG. 35 presents a perspective view showing the essential part of the pipe-shaped member shown in FIG. 34.

Further, as shown in FIG. 34 and FIG. 35, the pipe-shaped member 704 may be formed to have two groups of pipes 708 each having a hollow 705, one group extending in a longitudinal direction and the other group in a lateral direction, intersect with each other, and to join them at the intersections to form a stitch-like or a net-like configuration. Further, one or more pipe-shaped members 704 having this structure may be disposed in the core material 703. Such a pipe-shaped member 704 may be modified as follows.

In panels 700A shown in FIGS. 36(a) and 36(b), pipe-shaped members 704 are distributed in the core material 703 in different manners. In the example shown in FIG. 36(a), two or more layers of pipe-shaped members 704 are buried in the core material 703. In the example shown in FIG. 36(b), pipe-shaped materials 704 are previously bonded with an adhesive (not shown) and fixed to the inner side of the surfacing material 701 and the inner side of the backing material 702, both the inner sides facing the core material 703. In this structure, the pipe-shaped members 704 act as a nonwoven fabric, thereby increasing adhering strength between the surfacing material 701 or the backing material 702, and the core material 703.

Figure 37:
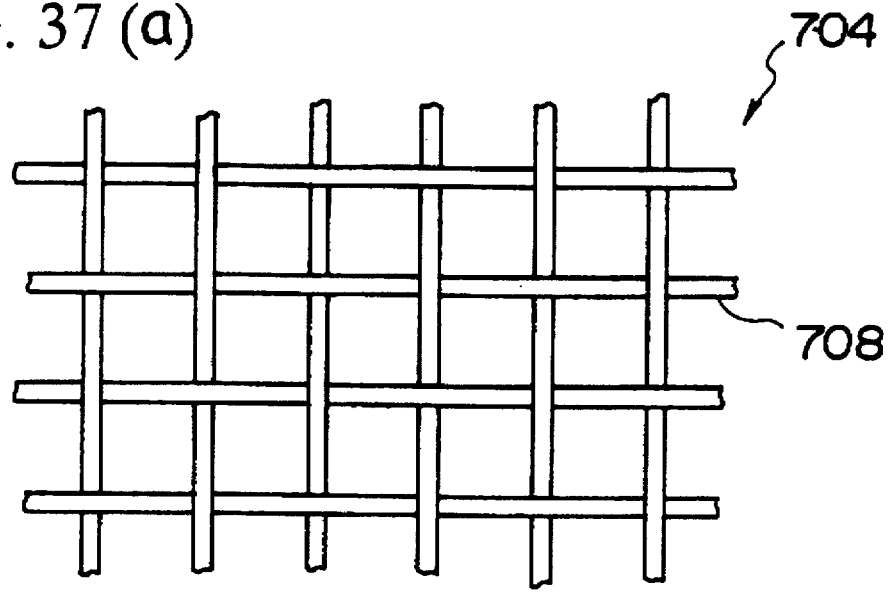
FIG. 37 presents side views showing the essential part of still further embodiments of a pipe-shaped member.
Figure 37:
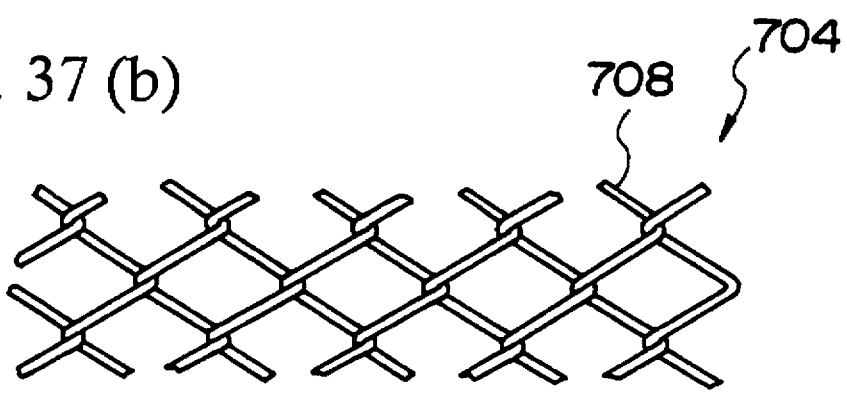
Figure 37:
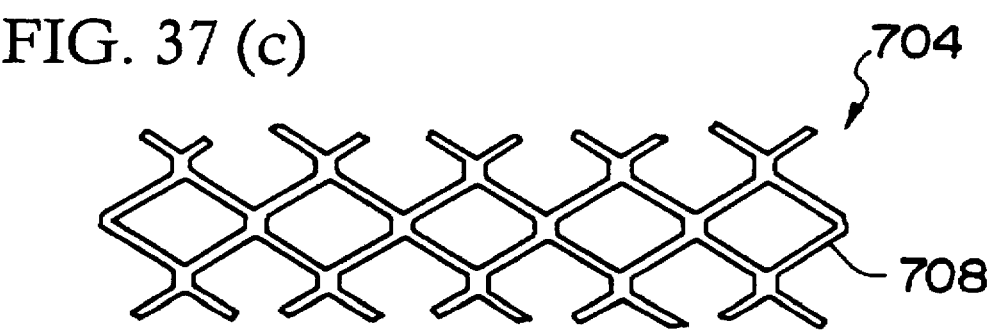

FIGS. 37 (a) through (c) show modifications of the pipe-shaped member 704 itself. In the example shown in FIG. 37(a), the pipe-shaped materials 704 form a shape of plain woven fabric. In the example shown in FIG. 37(b), the pipe-shaped materials 704 form a shape of lozenge woven fabric. In the example shown in FIG. 37(c), the pipe-shaped materials 704 form a lozenge continuous grid. Other woven forms suitable for the pipe-shaped materials 704 include twill weave, plain matting weave, twill-matting weave, matting weave, strand weave, triple, weave, crimp weave, hexagonal type, circular type, and the like.

Ninth embodiment (FIG. 38 through FIG. 54)

Figure 38:
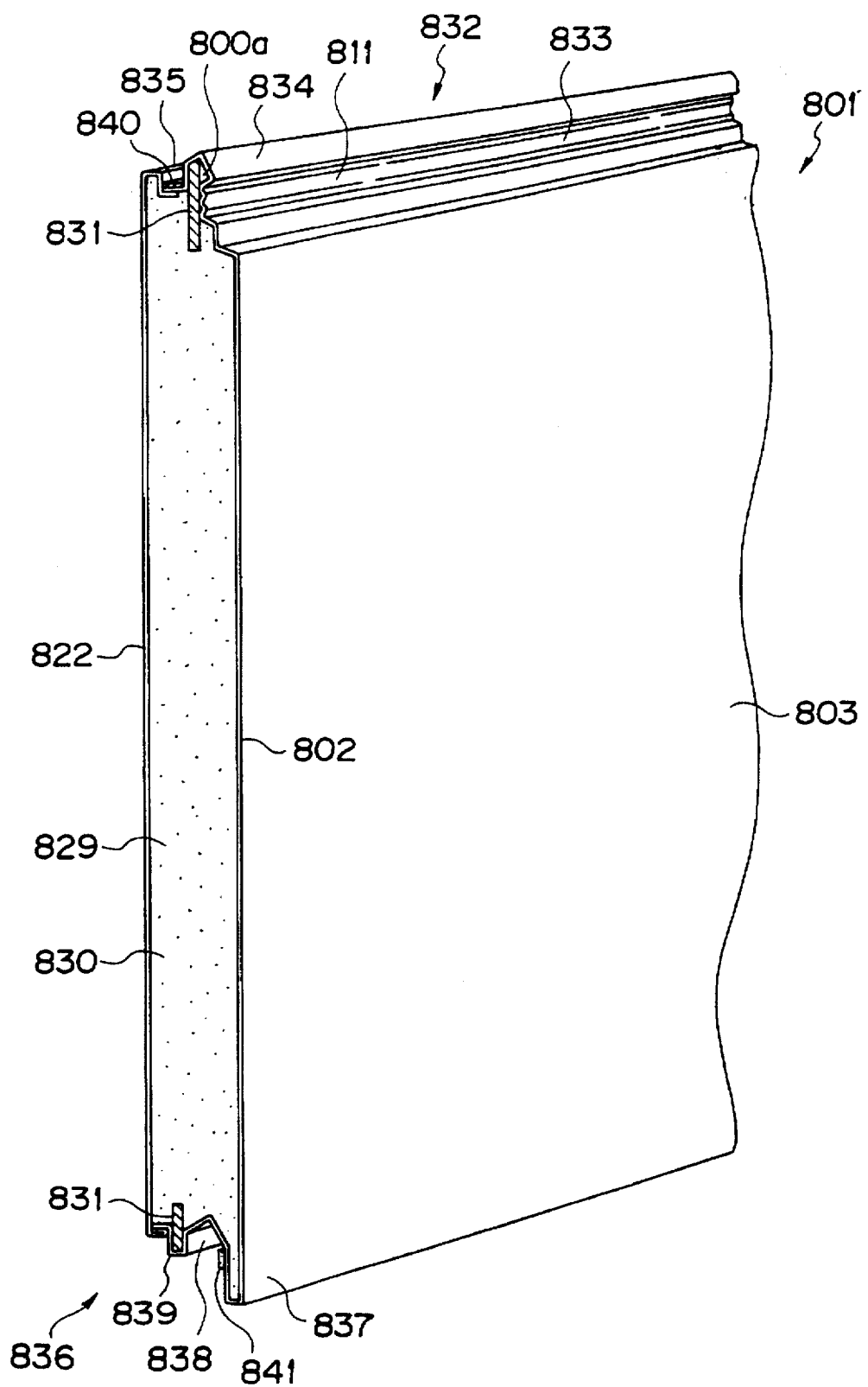
FIG. 38 is a perspective view of the essential part of the refractory/heat insulating panel according to the ninth embodiment of the invention.
Figure 39:
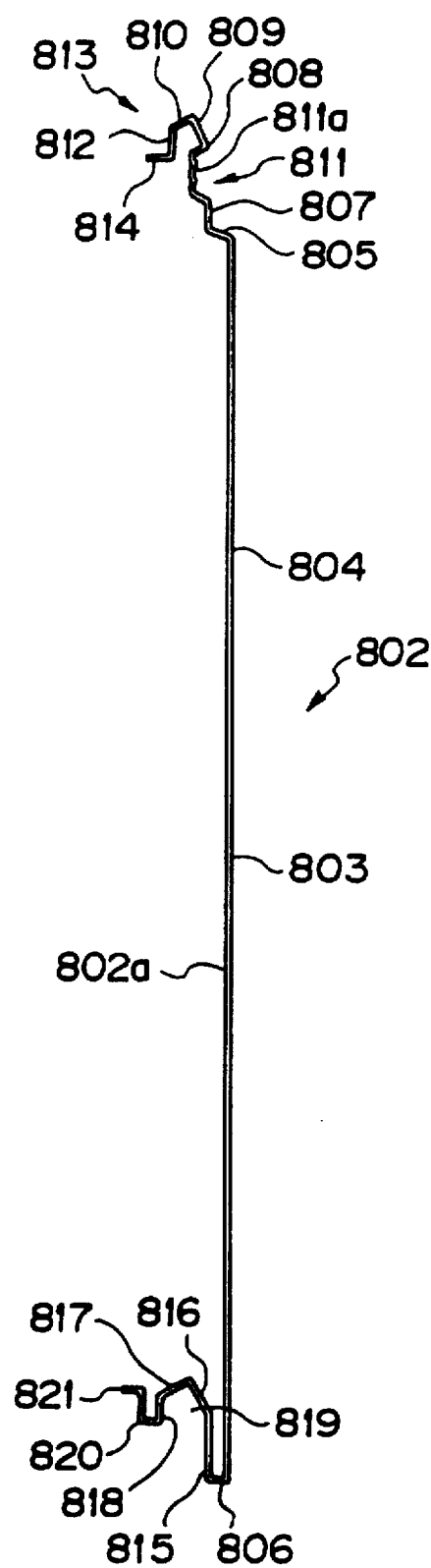
FIG. 39 presents side views of the surfacing material and backing material shown in FIG. 38.
Figure 39:
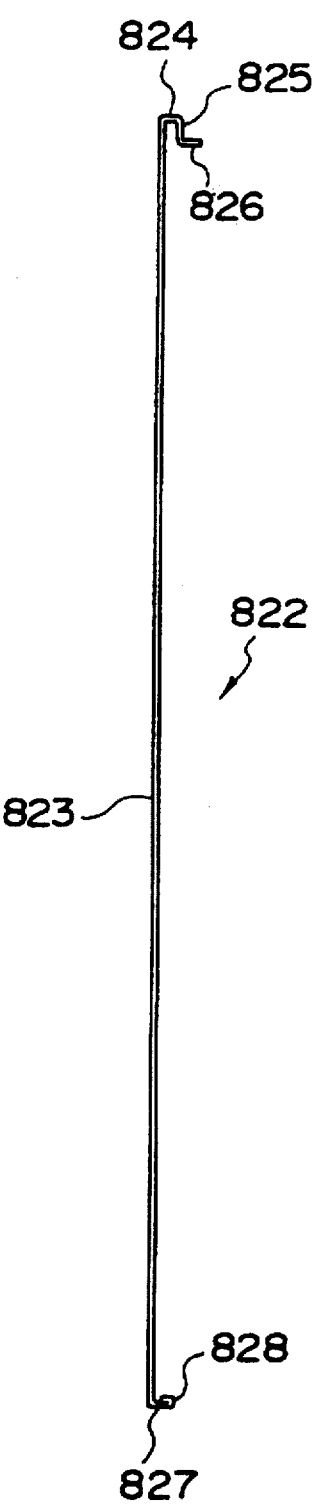

Next, most preferred embodiments regarding the joint portions of the refractory/heat insulating panels according to the above described embodiments will be described. FIG. 38 is a partially cut-away perspective view showing a typical example of a refractory/heat insulating panel. Numeral 801 denotes a refractory/heat insulating panel having a sandwich structure, in which a core material 829 is integrally disposed between a surfacing material 802 and a backing material 822. The panel 801 is provided with a male joint portion 832 and a female joint portion 836 at both longitudinal sides thereof.

To describe specifically, the surfacing material 802 and the backing material 822 are made of a thin metallic sheet or an inorganic material. In the former case, a material such as an iron plate, an aluminum plate, a copper plate, a stainless steel plate, a titanium plate, a steel plate plated with an alloy of aluminum and zinc, a porcelain enameled steel plates, a clad steel plate, a laminated steel plate (a polyvinyl chloride-coated steel plate and the like), a sandwiched steel plate (a vibration damping steel plate and the like), and the like (of course, a colored metallic plate obtained by painting one of the above-described plates may be used) is formed in various shapes by roll-molding, press molding, extrusion or the like.

Further, as shown in FIG. 39(a), a laterally elongated decorative surface portion 803 of the surfacing material 802 includes a flat decorative surface 804, side edges, 805 and 806 which are formed by bending both of the lateral side edges of the decorative surface 804 inwardly, a joint bottom surface 807 extending from the lower end of the side edge 805. Formed at one end of the surfacing material 801 are a stationary convex portion 813 and a guide portion 814. The stationary convex portion 813 includes an upper surface 808 outwardly projected from the tip of the joint bottom surface 807, slanted surfaces 809 and 810 which are sides of an approximately triangle-formed by extending the tip of the upper surface 808, a fixation groove 811 formed in the upper surface and having a concave cross section, and a lower surface 812 inwardly extending from the lower end of the slanted surface 810. The guide section 814 is formed by extending the tip of the lower surface 812 in a direction perpendicular to the lower surface 812.

Further, formed at the other end of the surfacing material 801 are an insertion groove 819 having an approximately U-like cross section, an insertion convex portion 820 and a guide section 821 having an approximately L-like cross section. The insertion groove 819 is formed by a lower edge 815 inwardly extending from the lower end of the side edge 806, slanted abutment surfaces 816 and 817 which are formed by bending the tip end of the lower edge 815 downward, and a lower surface 818 outwardly extending from the tip of the inclined abutment surface 817. The insertion convex portion 820 is formed by inwardly bending the tip of the lower surface to form a U-like shape. The guide section 821 is extended from the lower edge of the insertion convex portion 820.

Moreover, two protrusions 811a are formed in the bottom surface of the fixation groove 811 to prevent the attachment position of a fixture 800β from deviating in the right or left directions which may occur when the refractory/heat insulating panel 801 is fixed to the frame 800α.

As shown in FIG. 39(b), the backing material 822 has a laterally elongated bottom surface 823 opposing the decorative surface portion 803. At one end of the bottom surface 823 are formed an abutment section 824 which is inwardly bent to have a U-like shape, an inner section 825 inwardly extending from the tip of the abutment section 824, and a guide section 826 outwardly protruding from the tip of the inner section 825. At the other end of the bottom surface 823 are formed a guide section 827 inwardly projecting from the other end, and a flap section 828 folded by bending the tip of the guide section 827.

The guide sections 814, 821, 826 and 827 prevent the positions of the surfacing material 802 and the backing material 822 shown in FIGS. 39(a) and (b) from deviating from predetermined superimposing positions at the time when these materials are superimposed as shown in FIG. 38. This increases the dimensional accuracy of the refractory/heat insulating panel 801 and prevents liquid from leaking which may occur when foaming is effected to produce the core material 829 made of synthetic resin foam.

The core material 829 is made of a plastic foam 830 in which inorganic boards 831 are disposed at its both ends. The plastic foam 830 acts as a heat insulating material, a fire resistant material, an adhesive material, a reinforcing material, a buffering material, a sound absorbing material, a volume increasing material, a weight reducing material and the like.

Unfoamed raw materials of the plastic foam 830 are supplied between the surfacing material 802 and the backing material 822, and are allowed to react to foam, thereby combining all the structural materials. As a concrete example, the structure described in the first embodiment is preferred.

As the core material 829, foams in which long or short fibers (glass wool, rock wool, carbon fibers, graphite and the like) are uniformly dispersed or locally placed may be used.

The inorganic board 831 is used for enhancing the fire resistance of the joint portion 800γ which will be described later. The inorganic board 831 includes an elongated material made of one or more materials selected from a calcium silicate board, a calcium carbonate board, a plaster board, a pearlite cement board, a rock wool board, a slate board, an ALC board, a PC board, other light-weight inorganic materials, light-weight inorganic foaming materials, composite boards of these boards and materials, and super high density resins such as high density phenol foam. The inorganic boards 831 are formed to have a rectangular, square, circular or polygonal shape, and integrally disposed as inserted into the stationary convex section 813, and the insertion convex portion 820.

Figure 40:
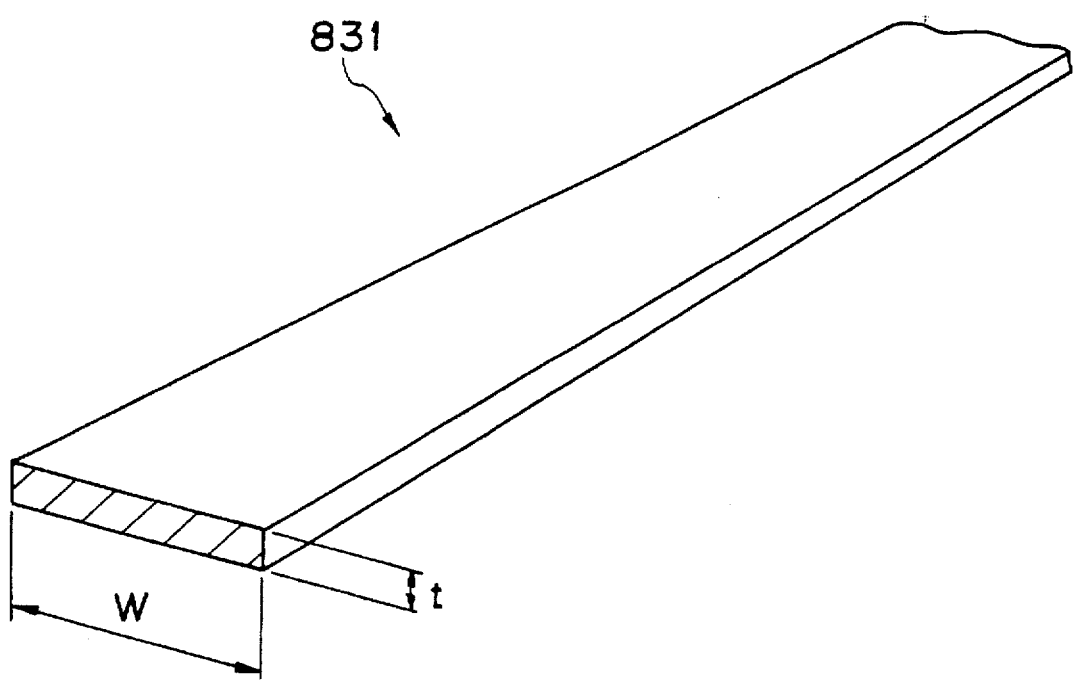
FIG. 40 is a perspective view of the essential part of the inorganic board shown in FIG. 38.

The inorganic board 831, for example, has a shape shown in FIG. 40, and the thickness t thereof ranges from about 3 to 100 mm while the width W thereof ranges from about 5 to 200 mm. As to the length L of the board, a single elongated inorganic board or a plurality of short inorganic boards are formed depending on the length of the refractory/heat insulating panel 801. The shape of the inorganic boards 831 is not limited to the above-described shapes, and may be modified to have shapes corresponding to those of the inner sides of the male joint portion 832 and the female joint portion 836 so that the inorganic boards 831 entirely occupy the joint portions.

The male joint portion 832 is a side portion which is formed by the stationary convex section 813, the guide section 814, the abutment section 824, and the inner section 825, which are united by the core material 829. The male joint portion 832 has a step portion 833 which is formed by depressing one side edge of the decorative surface portion 803 so as to receive a cover portion 837 of the female joint portion 836 such that the cover portion 837 is flush with the decorative surface portion 803 without projecting therefrom. The male joint portion 832 also has an upper protrusion 834 for acting as a guide and for increasing engagement force, and an insertion concave portion 835 engageable with the insertion convex section 820.

The female joint portion 836 is formed by the insertion groove 819, the insertion convex section 820, and the guide section 827 which are united by the core material 829. The female joint portion 836 has a cover portion 837 for covering the step portion 833, an insertion groove 838 having a U-like cross section, and a main convex portion 839 which will be fitted into the insertion concave portion 835.

Numeral 840 denotes an inorganic packing material made of, for example, a rock wool felt, ceramic wool, etc. The inorganic packing material 840 prevents the formation of crevices at the joint portion 800γ at the time when a refractory construction test is carried out, thereby preventing flames from entering. The inorganic packing material is useful for providing functions as a refractory material, a material having air tightness, and the like.

Numeral 841 denotes a waterproofing packing material selected from commercially available materials such as of polyvinyl chloride type, chloroprene type, chlorosulfonated polyethylene type, ethylene propylene type, and asphalt impregnated polyuretane type. The waterproof material is useful for providing functions mainly as a waterproof material, an air-tight material, and the like.

To describe more specifically, in the cases where the core material 829 is made of a phenol foam or the like, the inorganic board 832 absorbs condensed water produced during reaction, thereby preventing the adhesive force between the surfacing material 802 and the core material 829 or between the core material 829 and the backing material 822 from decreasing. As a result, these materials will not be separated, and the surfacing material 802 and the backing material 822 are prevented from swelling or warping. Thus, the panel can be maintained flat.

The triangular space 800a formed in the stationary convex section 813 is provided for discharging condensed water absorbed in the inorganic board 831 from vertical joints formed at both ends of the refractory/heat insulating panel 801 or from other portions. This structure prevents the inorganic board 831 from deteriorating, and also prevents water from remaining inside the refractory/heat insulating panel 801, thereby preventing the mechanical strength of the refractory/heat insulating panel 801 itself from lowering.

Figure 41:
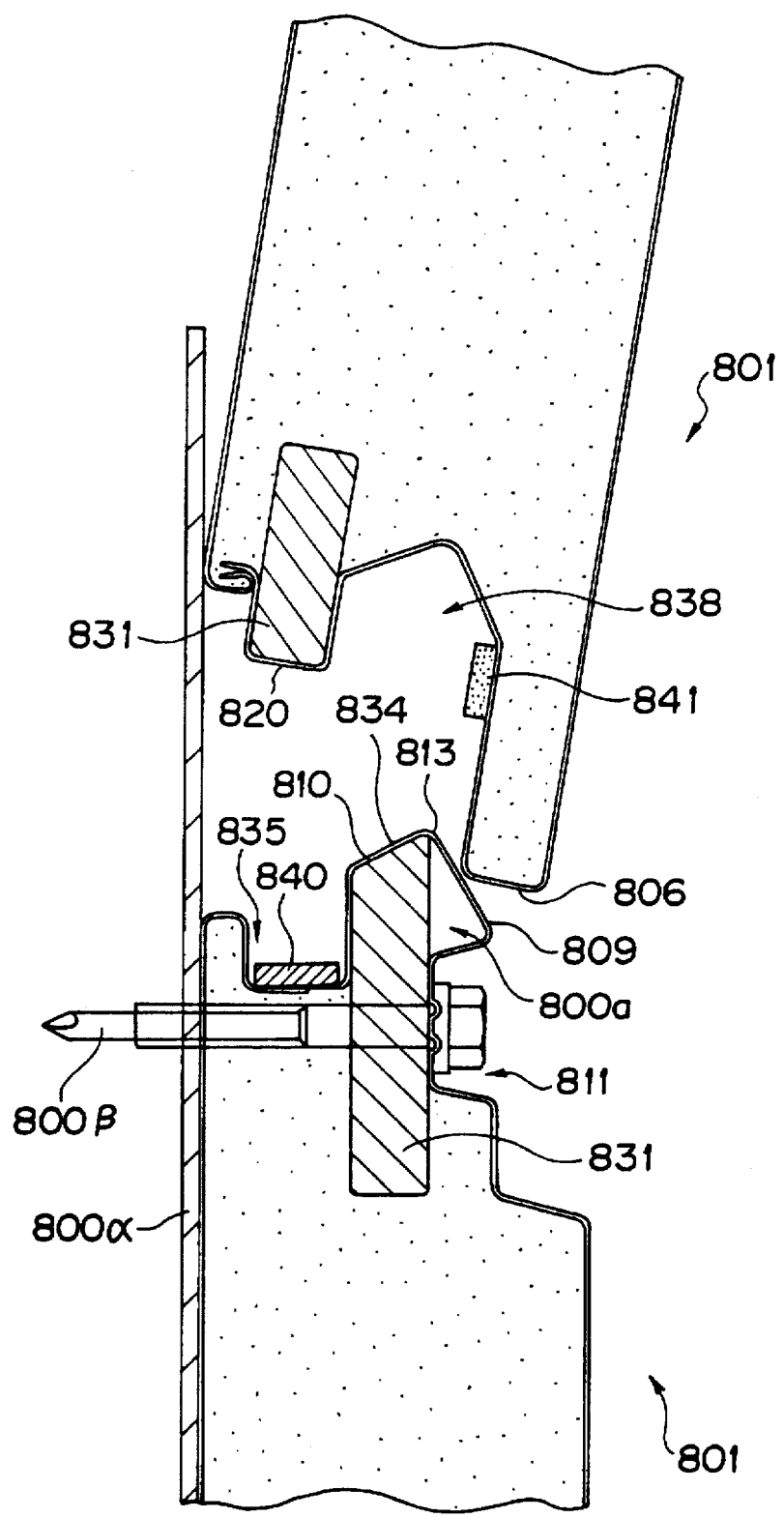
FIG. 41 is a longitudinal sectional view of the essential part of joint portions in the course of assembling refractory/heat insulating panels according to the ninth embodiment of the invention.
Figure 42:
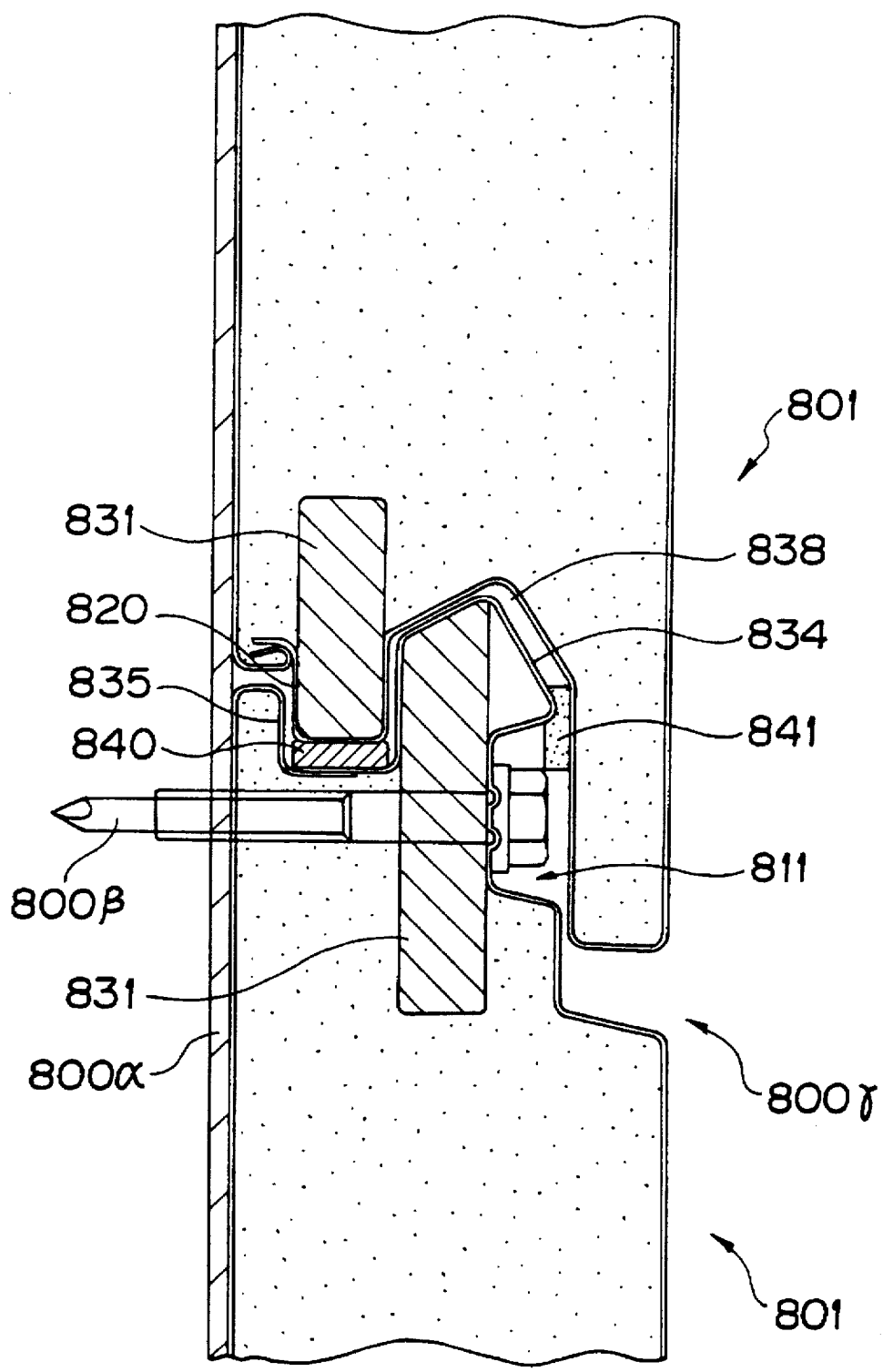
FIG. 42 is a longitudinal sectional view of the essential part of joint portions after refractory/heat insulating panels according to the ninth embodiment of the invention have been assembled.

The slanted surfaces 809 and 810 and the slanted surfaces 816 and 817 are formed for securing easy assembly even when the side edge 806 abuts on the stationary convex section 813 during the time when an upper refractory/heat insulating panel 801 is placed on a lower refractory/heat insulating panel 801 for assembly, as shown in FIG. 41. With this structure, the assembly can be greatly facilitated.

Next, an example of assembly will be briefly described. An assumption is made that the refractory/heat insulating panel 801 shown in FIG. 38 is assembled in a manner shown in FIG. 42. A water drip, a starter and the like are fixed to the lower end of the frame 800α made of an iron skeleton substrate although they are not illustrated in FIG. 42. As shown in the drawing, an n-th refractory/heat insulating panel 801 is fixed to the frame 800α by hammering the fixture 800B against the frame 800α at a location in the fixation groove 811.

Subsequently, the female joint portion 836 of an (n+1)-th refractory/heat insulating panel 801 is placed on the male joint portion 832 of the refractory/heat insulating panel 801. Accordingly, in order to form an exterior wall, the above-described step is successively carried out from the ground sill toward the caves.

Figure 43:
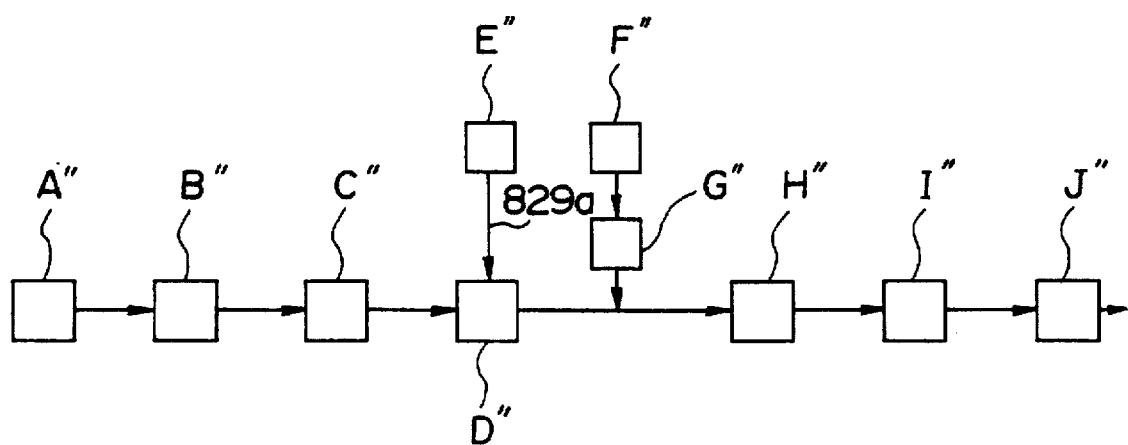
FIG. 43 is a schematic view showing the steps of manufacturing a refractory/heat insulating panel according to the ninth embodiment of the invention.
Figure 44:
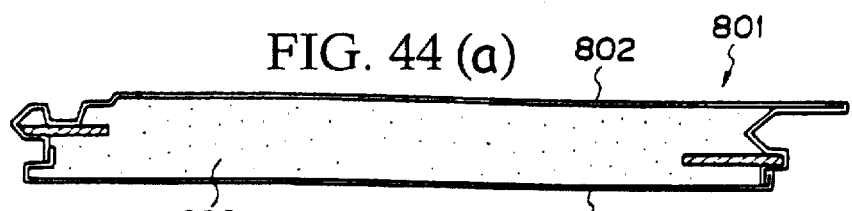
FIG. 44 presents sectional views showing the essential part of other embodiments of a refractory/heat insulating panel according to the ninth embodiment of the invention.
Figure 44:
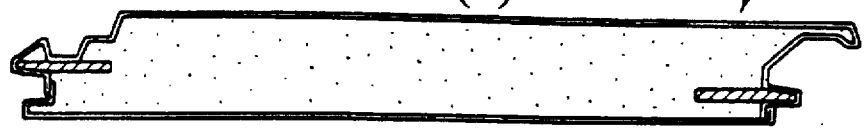
Figure 44:
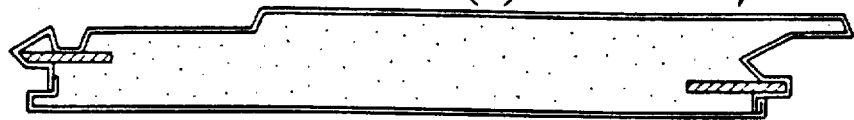
Figure 44:
Figure 44:
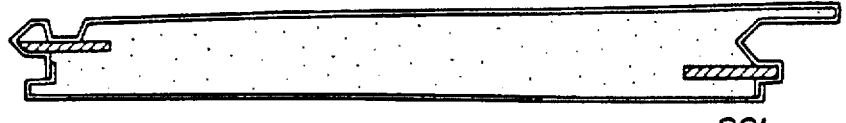
Figure 44:
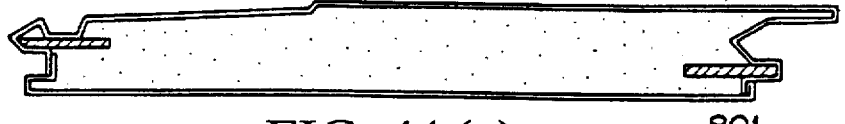
Figure 44:
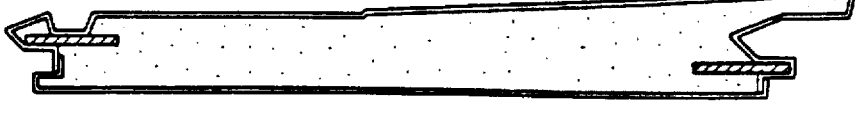
Figure 44:
Figure 44:
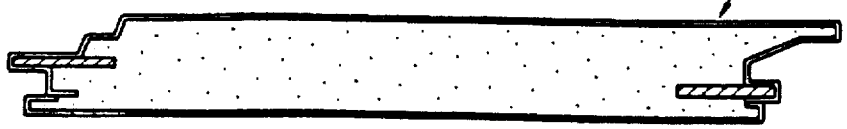
Figure 45:
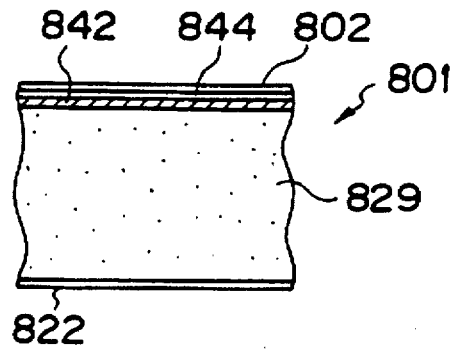
FIG. 45 presents sectional views showing the essential part of further embodiments of a refractory/heat insulating panel according to the ninth embodiment of the invention.
Figure 45:
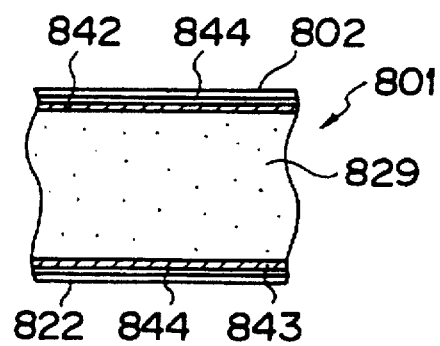
Figure 45:
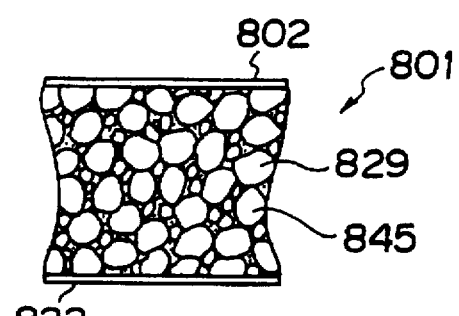
Figure 45:
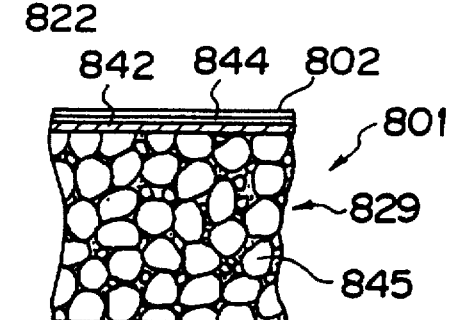
Figure 45:
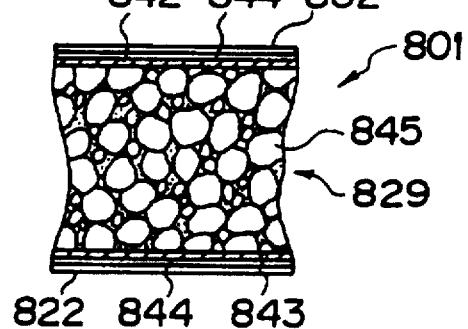
Figure 47:
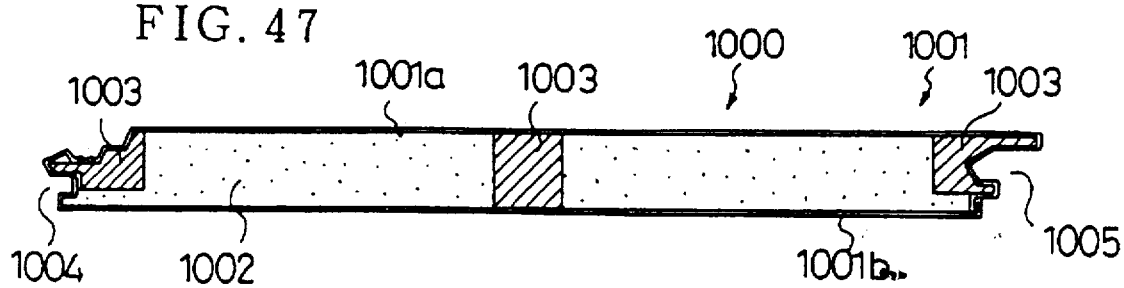
FIG. 47 is a sectional view showing the essential part of another embodiment of a refractory/heat insulating panel according to the ninth embodiment of the invention.
Figure 48:
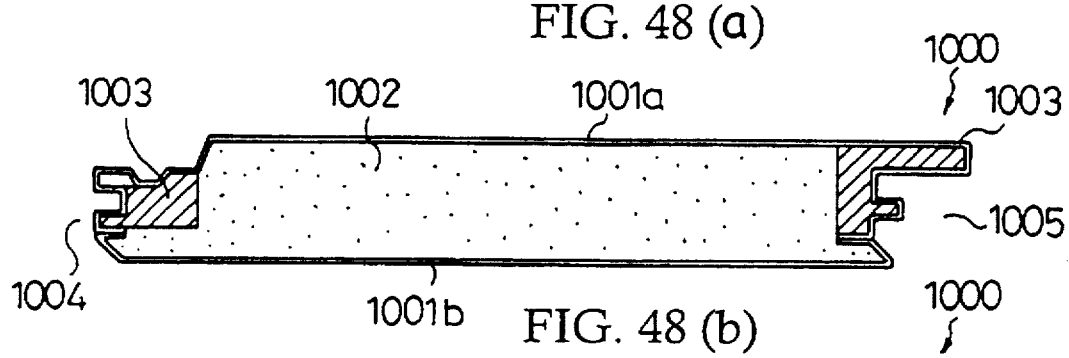
FIG. 48 presents sectional views showing the essential part of other embodiments of a refractory/heat insulating panel according to the ninth embodiment of the invention.
Figure 48:
Figure 48:
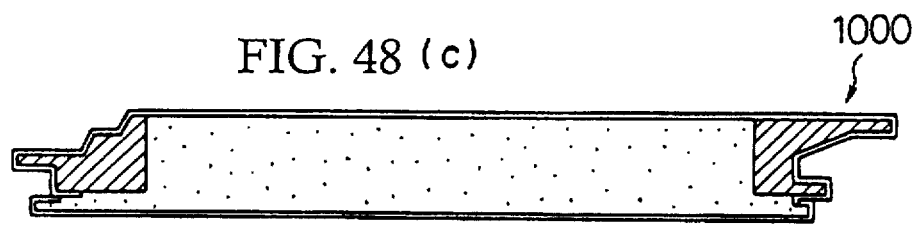
Figure 48:
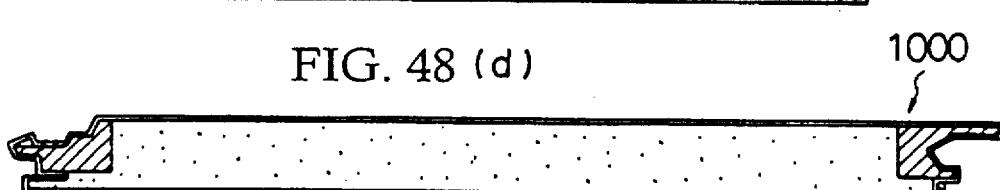
Figure 48:
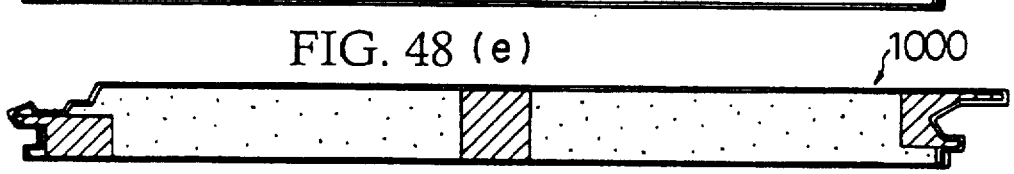
Figure 48:
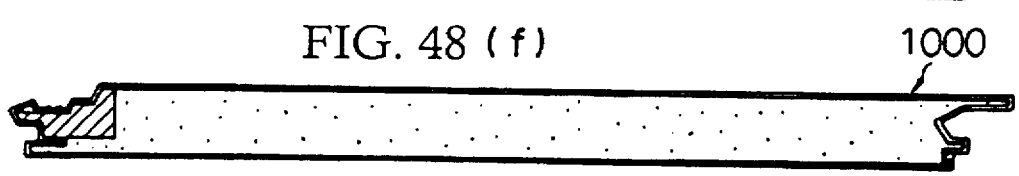
Figure 52:
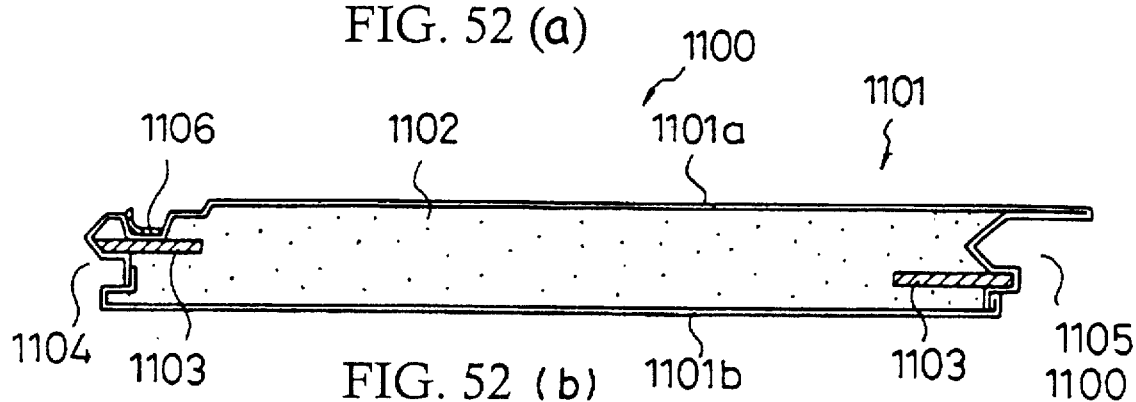
FIG. 52 presents sectional views showing the essential part of other embodiments of a refractory/heat insulating panel according to the ninth embodiment of the invention.
Figure 52:
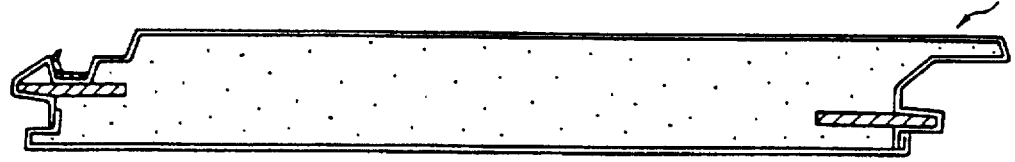
Figure 52:
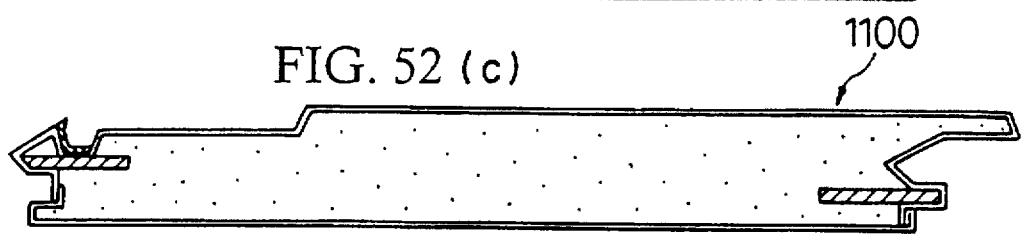
Figure 52:
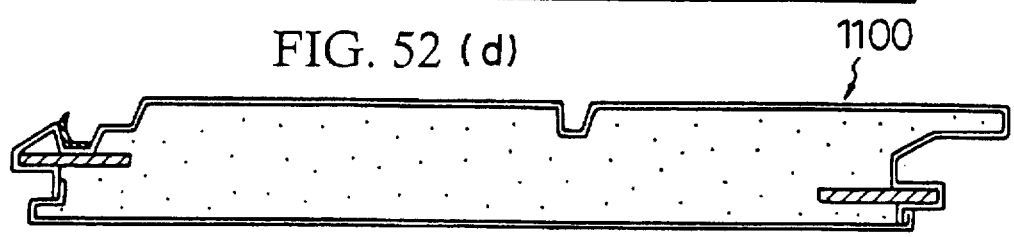
Figure 52:
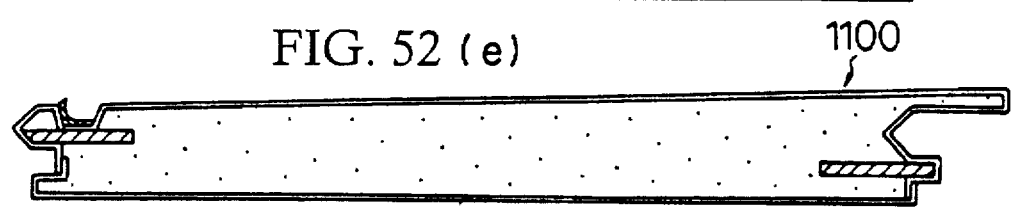
Figure 52:
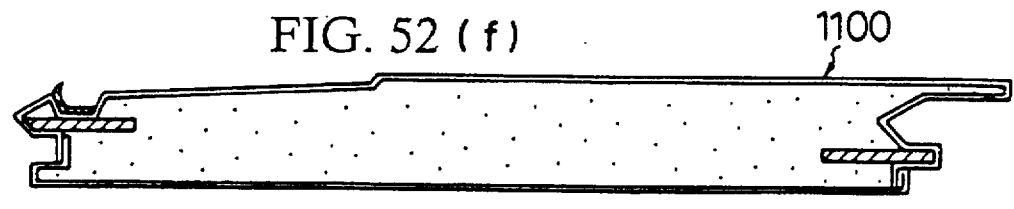
Figure 52:
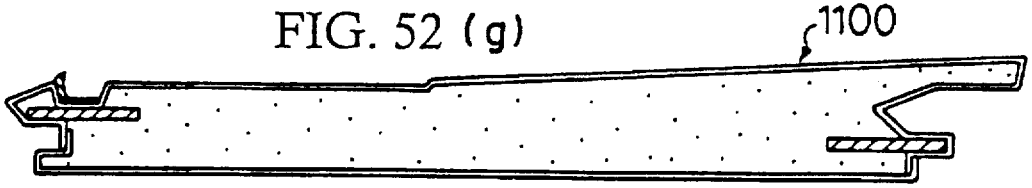
Figure 53:
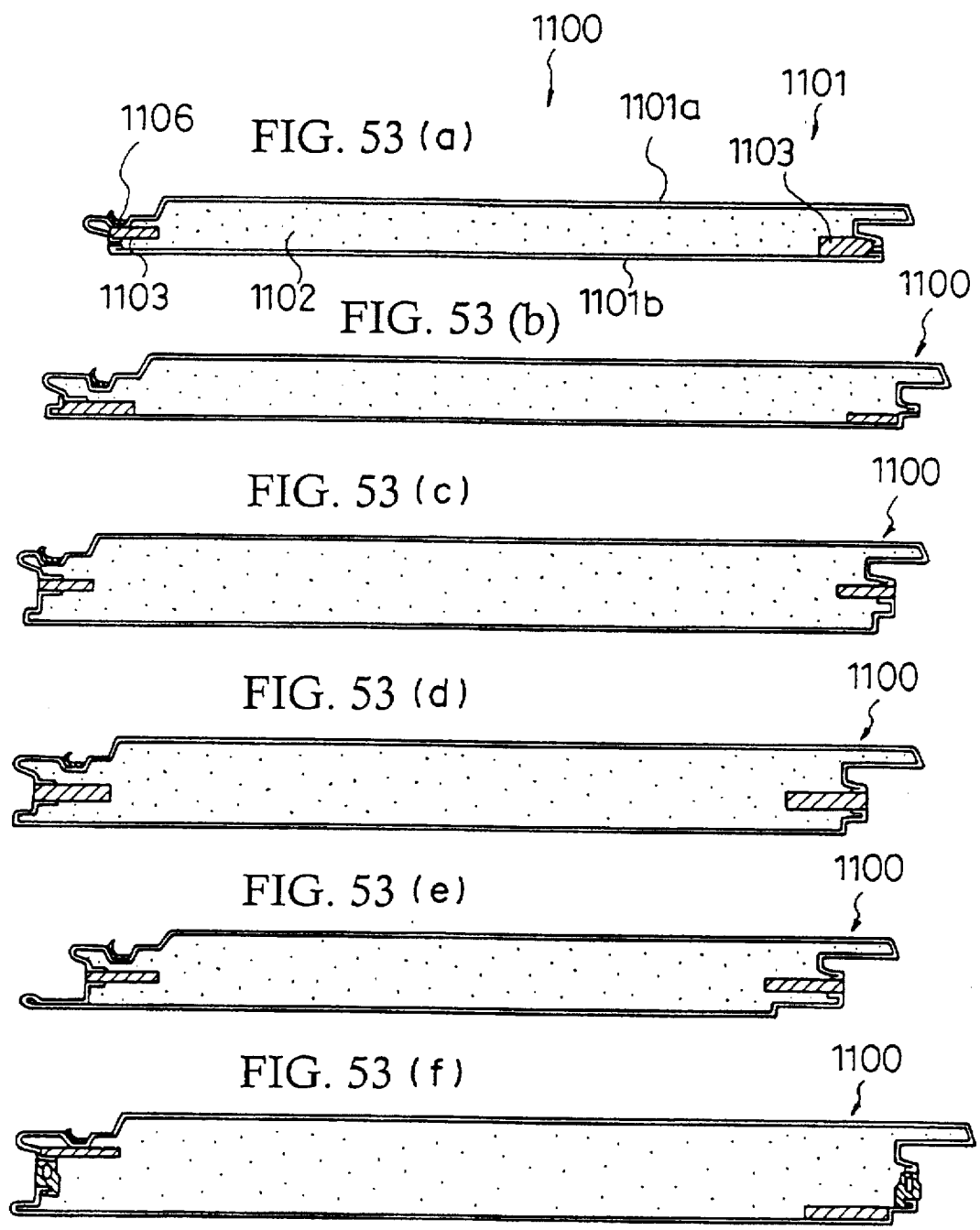
FIG. 53 presents sectional views showing the essential part of other embodiments of a refractory/heat insulating panel according to the ninth embodiment of the invention.

An example of a method of manufacturing the above-described refractory/heat insulating panel 801 is shown in FIG. 43. First, a surfacing material 802 made, for example, of a color steel sheet (having a thickness of 0.5 mm) is fed from a supply step A" (for example, an uncoiler or a lifter) to a forming step B" in which the surfacing material 802 is formed in a shape shown in FIG. 38. Subsequently, elongated calcium silicate panels having a thickness of 10 mm and a width of 50 mm are inserted from both lateral sides in an inorganic board forming step C". The surfacing material 802 is then transported to a raw material-delivering step D" in which a stock solution 829a of the core material 829 is delivered from a delivering machine E" to the back surface 802a of the surfacing material 802 to obtain a final density of about 150 to 300 Kg/m³. The starting liquid 829a is obtained by mixing various flame-retardants and reaction adjusting agents into an unfoamed liquid of resol type phenol, and uniformly stirring them. A backing material 822 made of a color steel sheet (having a thickness of 0.5 mm) supplied from the supply step F" (uncoiler, lifter or the like) is formed in a molding step G", and is then superimposed on the surfacing material 802, which is then transported to a cure oven H" in which curing is effected at a temperature of about 30° to 100° C. for 7 to 15 minutes by a continuous foaming process so that the liquid foams and hardens, thereby unifying the materials. The thus obtained material is then cut into a predetermined size by a cutter I", and is then fed to a packaging step J", thereby affording final products.

A 1-hour refractory construction test of JIS-A-1304 was performed to check the refractory performance of the mounting structure of the refractory/heat insulating panel 801. As a result, it was confirmed that the the panel was given the properties passed the test. The refractory/heat insulating panel 801 used in the test is such that the surfacing material 802 and the backing material 822 are made of a color steel sheet having a thickness of 0.5 mm, the core material 829 is made of a phenol foam (having a density of about 180 Kg/m³, and the inorganic board 831 is made of a calcium silicate board having an entire thickness of about 60 mm. Further, an inorganic packing material 840 made of rock wool felt is continuously formed at the joint portion 800γ.

The above-described refractory/heat insulating panel is only an example according to the present invention, and the panels may be formed as shown in FIGS. 44(a) through 44(g).

Further, it is possible to form the core material 829 of the refractory/heat insulating panel 801 as shown in FIGS. 45(a) through 45(e) to obtain refractory/heat insulating panels 801 having an enhanced fire resistance. In the examples shown in FIGS. 45(a) through 45(e), nonwoven fabrics 842 and 843 are interposed and bonded with an adhesive 844 between the surfacing material 802 and the core material 829 or between the core material 829 and the backing material 822, or light-weight aggregate 845 is filled at a high density using a plastic foam 830 as a binder.

The nonwoven fabrics 842 and 843 are in the form of sheet made of fibers of polyester type, nylon type, boron type, carbon type, alumina type, silicon carbide type, aramid fibers, or glass fibers, and they have functions for increasing the mechanical strength of the panel 801, increasing the adhesion between the surfacing material 802 and the core material 829 or between the core material 829 and the backing material 822, and improving the flatness of the surfacing material 802 and the backing material 822.

Example of the adhesive 844 includes elastomer type epoxy resins; an emulsion type or hot melt type of isocyanates such as methylene diisocyanate (abbreviation: MDI), and modified isocyanates thereof such as urethane-modified isocyanate, buret-modified isocyanate and isocyanurate-modified isocyanate, and one kind of the above adhesives is used.

Light-weight aggregate 845 is made of particles of pearlite, glass beads, plaster slag, talc, shirasu balloons or the like. In the examples shown in FIG. 45(c) through FIG. 45(e), particles of pearlite having a diameter of about 5 to 20 mm are used to improve the fire preventing function and the refractory function of the core material 829 and the mechanical strength of the panel 801.

Refractory/heat insulating panels 1000 shown in FIG. 46 through FIG. 49 are modified examples of the above-described embodiments. In these modified embodiment, inorganic boards are formed integrally in the male joint portion and the female joint portion. Numeral 1001 denotes a noncombustible substrate material composed of a surfacing material 1001a and a backing material 1001b. Numeral 1002 denotes a core material, 1003 in organic boards, 1004 a male joint portion, and 1005 a female joint portion.

Refractory/heat insulating panels 1100 shown in FIG. 50 through FIG. 53 are further modified examples of the above-described embodiments. In these modified embodiments, a packing material made of EPDM (which has excellent performances in weather resistance, heat resistance, resistance to ozone and resistance to chemicals) is formed in the fixation grooves, thereby greatly improving their waterproofing performance. Numeral 1101 denotes a noncombustible substrate material composed of a surfacing material 1101a and a backing material 1101b. Numeral 1102 denotes a core material, 1103 in organic boards, 1104 a male joint portion, 1105 a female joint portion, and numeral 1106 a packing material.

Figure 54:
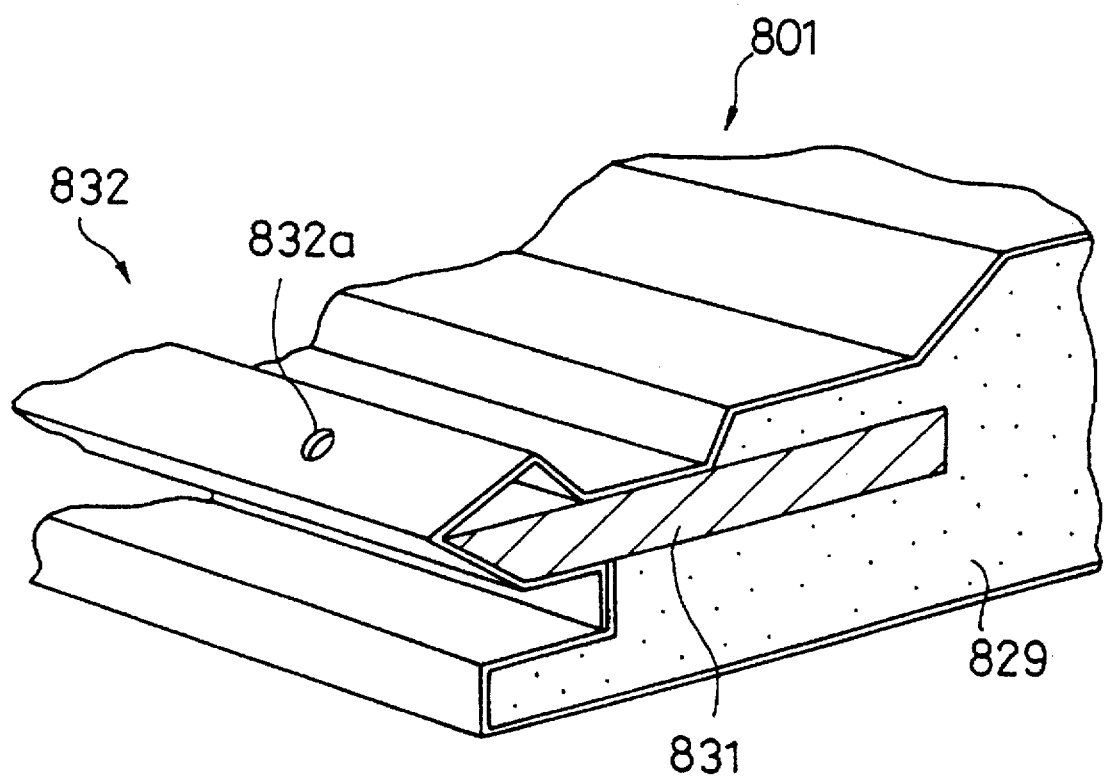
FIG. 54 is a sectional view showing the essential part of another embodiment of a refractory/heat insulating panel according to the ninth embodiment of the invention.

Further, FIG. 54 shows an embodiment in which an air ventilating hole 832a communicating with a space adjacent to the inorganic board 831 of the female joint portion is formed so as to release outside the condensed water discharged from the core material 829 and toxic gasses produced during a refractory construction test.

Figure 55:
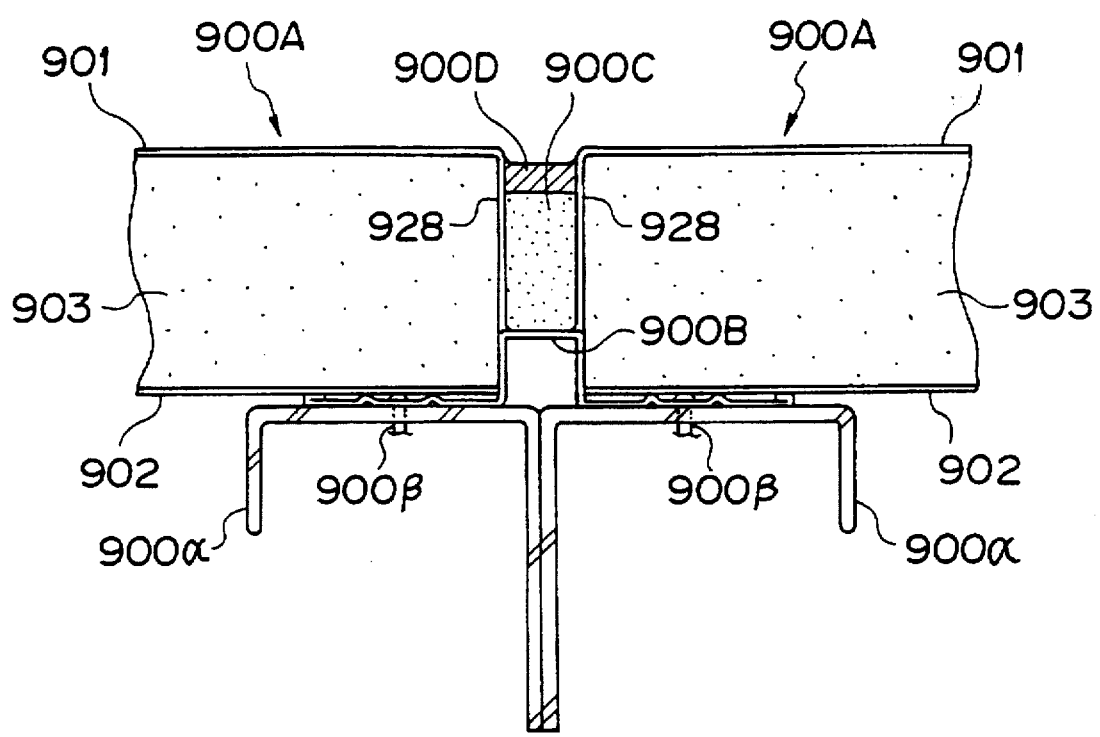
FIG. 55 is a sectional view showing the essential part of an embodiment of a square bending covering a butt end of a refractory/heat insulating panel.

Application of a waterproof film to the butt end surface and square bending at the butt end (FIG. 55)

In the above-described embodiments, if paints are applied to the butt end surfaces, or a sheet in the form of a thin film is placed thereon, they can effectively prevent rain or the like from entering inside the panel through the butt end surfaces. Since this technique can be easily understood by those having ordinary knowledge in the art without drawings, drawings are omitted.

Further, as shown in FIG. 55, the tip of the surfacing material 901 located at a butt end surface of a refractory/heat insulating panel 900A is bent toward the core material 903 to form a bent flap section 928. The bent flap section 928 acts as a portion to which caulking material 900D acts as an adhering portion when the caulking material 900D is filled in vertical joint formed between left-hand and right-hand refractory/heat insulating panels 900A. Also, the bent section 928 acts to increase the mechanical strength of the surfacing material 901 and the flatness of the panel. In FIG. 55, numeral 900B denotes a joiner having a hat-like shape, which is made by a similar manner as applied to the surfacing material 901 with a similar material, 900C a back-up material made of a noncombustible inorganic material, 900α a frame and 900β a fixture.

Mounting structure of refractory/heat insulating panels (FIG. 56 through FIG. 62)

An example of mounting structures for the refractory/heat insulating panels according to the above-described embodiments will be described below in detail.

Figure 56:
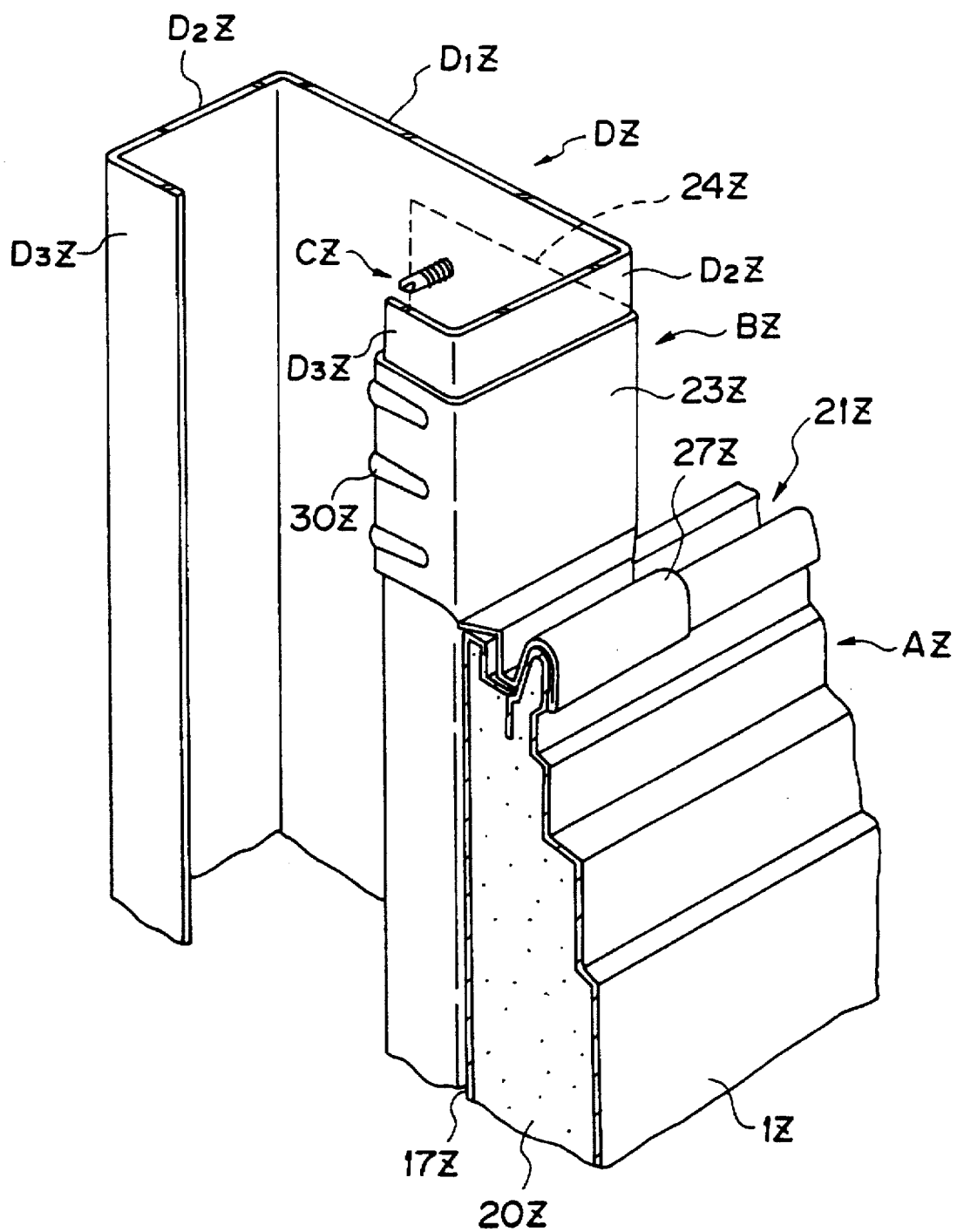
FIG. 56 is a perspective view showing the essential part of an embodiment of a mounting structure for a refractory/heat insulating panel against a building frame.
Figure 57:
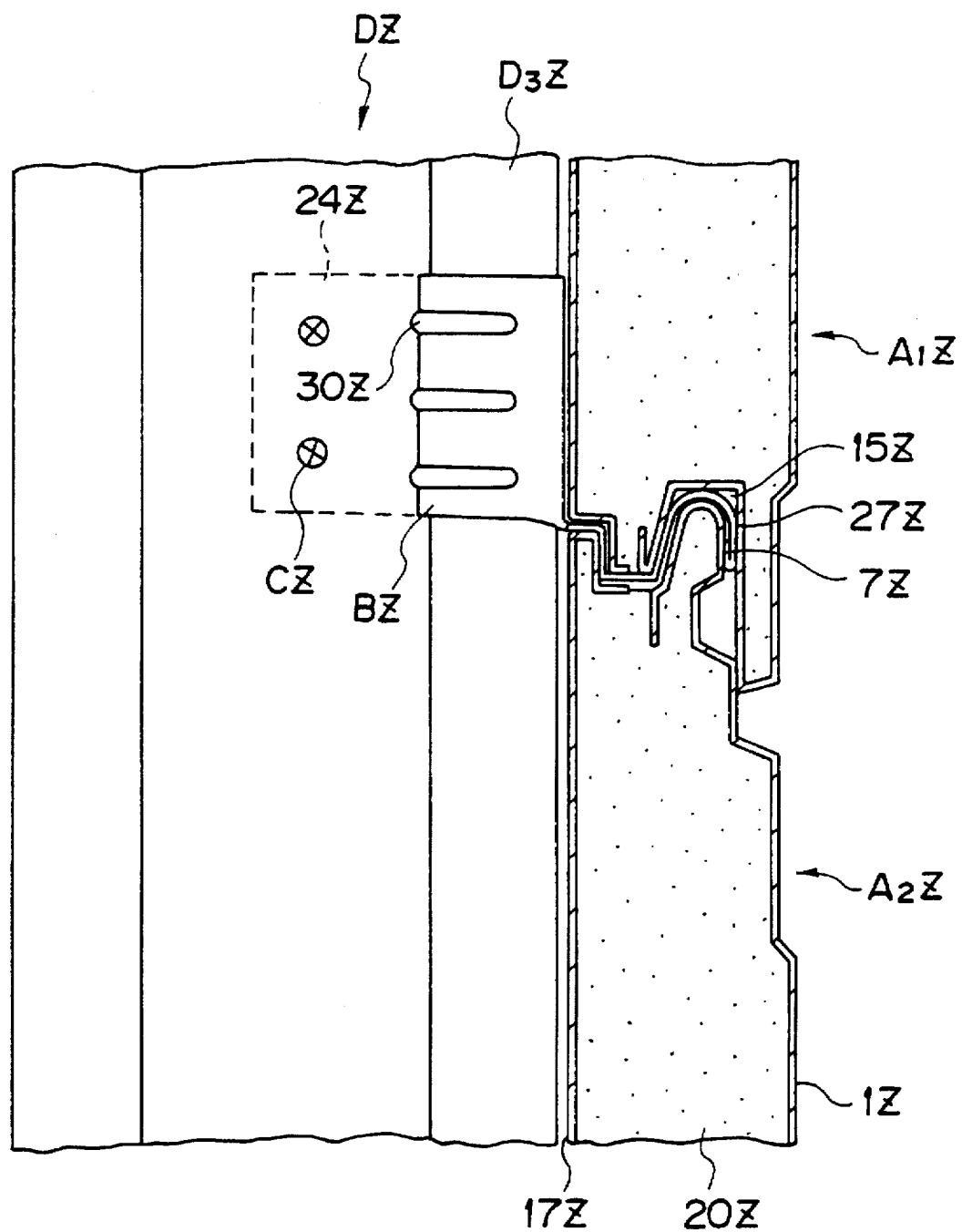
FIG. 57 is a side view containing a segmented side view of an embodiment of a mounting structure for a refractory/heat insulating panel against a building frame.
Figure 58:
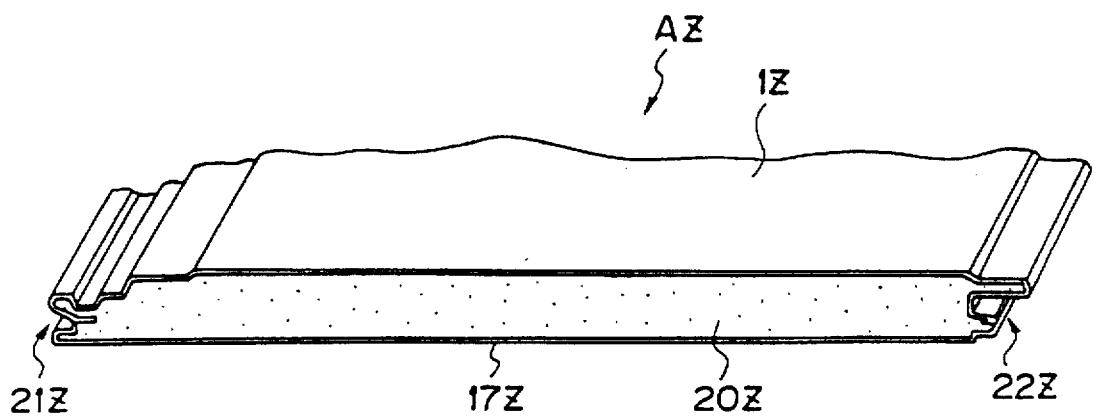
FIG. 58 shows a refractory/heat insulating panel which appears in FIG. 47 for demonstrating the mounting structure for panels, in which (a) is a perspective view of the essential part of a refractory/heat insulating panel, and (b) and (c) each are a side view of the surfacing and backing materials.
Figure 58:
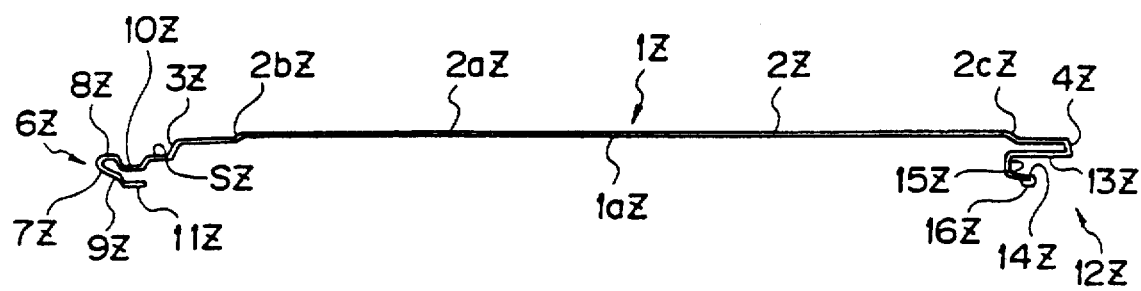
Figure 58:
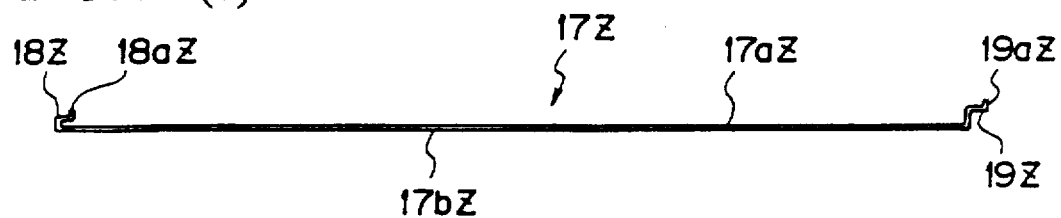

FIG. 56 and FIG. 57 are a perspective view and a horizontal sectional view showing a typical example of mounting structures according to the present invention. The mounting structure of the present example includes a refractory/heat insulating panel AZ, a mounting bracket BZ, a fixation bracket CZ and a substrate material DZ. The panel AZ is a refractory/heat insulating panel which is made from materials as used in the above-described embodiment and which has a sandwich structure composed of a surfacing material 1Z, a backing material 17Z and a core material 20Z, as shown in FIG. 58(a).

To describe in more detail, in the surfacing material 1Z, a gutter-shaped portion 1aZ is formed by a laterally elongated decorative surface portion 2Z, a male joint portion 6Z and a female joint portion 12Z, as shown in FIG. 58(b). The decorative surface portion 2Z is provided with a side walls 3Z and 4Z which are formed by inwardly bending the longitudinal ends of the decorative surface 2aZ at arbitrary angles, and a joint substrate 5Z outwardly projecting from the lower end portion of the side wall 3Z. The male joint portion 6Z includes an insertion edge 7Z composed of an upper edge 8Z outwardly projecting from the tip of the joint substrate 5Z and a lower edge 9Z formed by inwardly bending the tip of the upper edge 8Z in an approximately inverted U-like shape, a concave groove 10Z formed in the upper edge 8Z of the insertion edge 7Z, and a reinforcing section 11Z formed by inwardly bending the tip of the lower edge 9Z in an L-like shape.

As shown in FIG. 57, the insertion edge 7Z is inserted into an insertion groove 15Z of a female joint portion 12Z which will be described later so as to be fixed to the substrate material DZ. The insertion edge 7Z is also inserted into a fixation groove 28Z of the mounting bracket BZ to be united therewith. The concave groove 10Z is a portion to which a fixation groove 29Z of the mounting bracket BZ is attached, and forms an air gap in the joint portion, thereby preventing occurrence of the capillary phenomenon so as to enhance the waterproofness.

The female joint portion 12Z includes an upper surface 13Z formed by inwardly bending the lower edge portion of the side wall 4Z, a lower surface 14Z formed by outwardly bending the tip of the upper surface 13Z, the insertion groove 15Z formed between the upper surface 13Z and the lower surface 14Z to have an approximately inverted U-like cross sectional shape, and a reinforcing section 16Z inwardly extending from the tip of the lower surface 14Z. The insertion groove 15Z is engaged with the insertion edge 7Z of the male joint portion 6Z so as to fix the panel AZ to the substrate material DZ. Step portions 2bZ and 2cZ formed on the decorative surface 2aZ provide a three-dimensional shape to the joint portion and make the shape of the joint portion outstanding by making the decorative joint a step-like shape, thereby improving its design quality.

As shown in FIG. 58(c), the backing material 17Z is made of an elongated plate, and is provided at its one end with an inner section 18Z which is approximately parallel to the plate and is inwardly bent in an L-like shape, and at its other end with an outer section 19Z which is approximately parallel to the plate and is outwardly bent in an L-like shape. In the drawing, the tips of the inner section 18Z and the outer section 19Z are bent to form stabilizing sections 18aZ and 19aZ, which act as guide surfaces at the time of engagement, and also act as dies in the manufacturing process. These sections form a gutter-shaped portion 17aZ. The backing material 17Z covers the back surface of the core material 20Z to form the panel AZ having a sandwich structure, thereby increasing the mechanical strength of the panel AZ itself and acting as an noncombustible sheet, a waterproof film, a heat insulating sheet, a water absorbing sheet, a sound insulating sheet, a packing material or the like. Examples of materials suitable for the backing material 17Z include a metallic material having a similar quality as that of the surfacing material 1Z, asbestos paper, kraft paper, asphalt felt, metal foils (Al, Fe, Pb, Cu), synthetic resin sheet, rubber sheet, fabric sheet, plaster paper, aluminum hydroxide paper, nonwoven fabric of glass fibers, materials obtained by laminating one kind or two kinds or more of the above-described materials, and sheets subjected to waterproof treatment or flame-retardant treatment.

The surfacing material 1Z and the backing material 7Z are united together with the core material 20Z so that a female solid portion 21Z having a concave cross section is formed by the lower edge 9Z and the inner section 18Z, and a male solid portion 22Z having a convex cross section is formed by the lower surface 14Z and the outer section 19Z. As shown in FIG. 56 and FIG. 57, the joining between the panels AZ is achieved by assembling them such that the insertion edge 7Z is engaged with the insertion groove 15Z via the mounting bracket BZ and the male solid portion 22Z is inserted into the female solid portion 21Z. The inner section 18Z and the outer section 19Z of the backing material 17Z are provided to greatly increase the fire resistance, the water-proofing performance and the air tightness at the joint portion. In the case of fire, flames are prevented from entering and reaching the back surface 17bZ. This makes the panel AZ pass a refractory test.

BZ is a mounting bracket which is formed by press working, bending or the like using a similar material as used for the surfacing material 1Z, or a steel material, etc. An example of the mounting bracket is shown in FIG. 59(a), FIG. 59(b) which is a sectional view along line A—A of FIG. 59(a), and FIG. 59(c) which is a development elevation. As shown in these drawings, the mounting bracket BZ is composed of a fixation portion 26Z having an approximately U-like cross section and a engagement portion 27Z.

The fixation portion 26Z is composed of an abutment section 23Z having a vertical flat shape, fixation sections 24Z formed by substantially perpendicularly bending one of the right and left side edges of the abutment section 23Z, an engagement groove 25Z formed by substantially perpendicularly bending the other side edge and further bending it inwardly to give the engagement groove 25Z a hook-like cross section. The engagement portion 27Z is formed by bending the lower edge portion of the abutment section 23Z in a horizontal direction. The engagement portion 27Z is formed in a shape corresponding to the shapes of the male solid portion 22Z and the male joint portion 6Z, and has an engagement section 28Z and a fixation groove 29Z.

Figure 59:
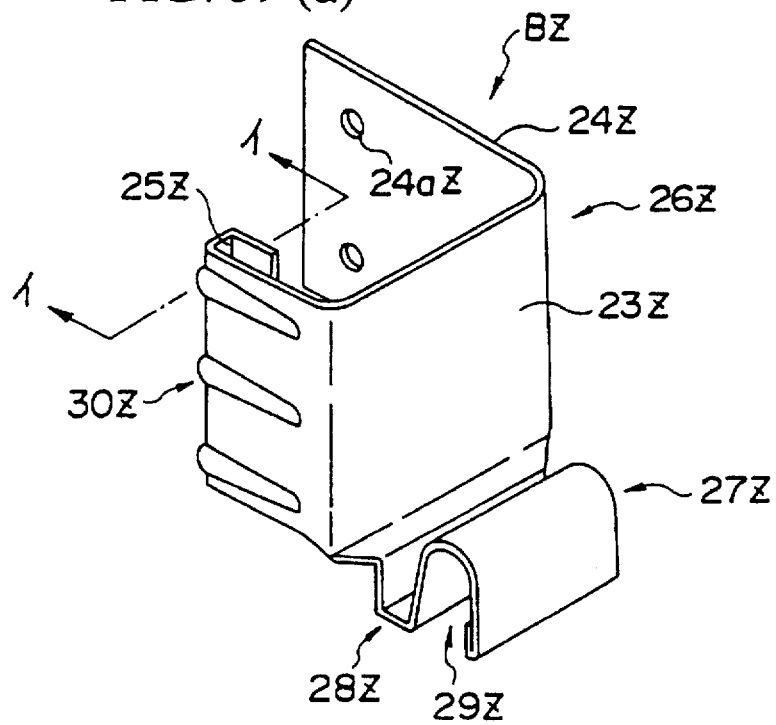
FIG. 59 shows the mounting bracket shown in FIG. 47, in which (a) is a perspective view, (b) is a sectional view along the line A—A in (a), and (c) is a development elevation.
Figure 59:
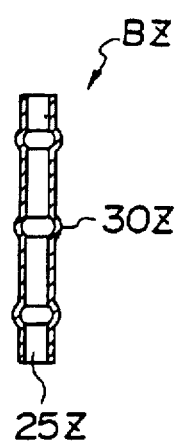
Figure 59:
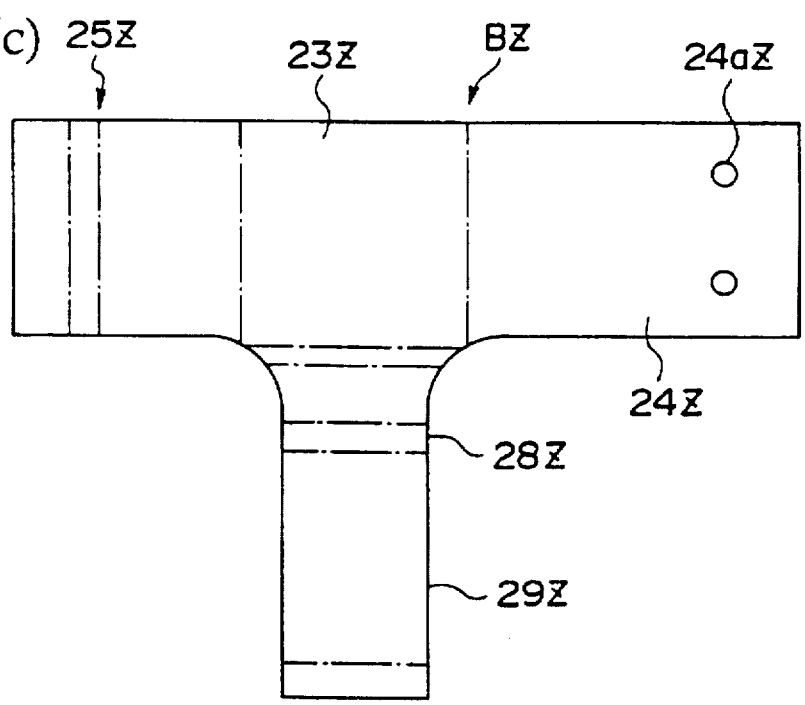
Figure 60:
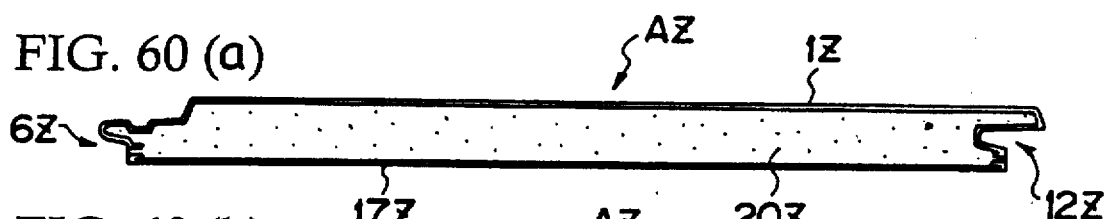
FIG. 60 presents sectional views showing other embodiments of the refractory/heat insulating panel shown in FIG. 47.
Figure 60:
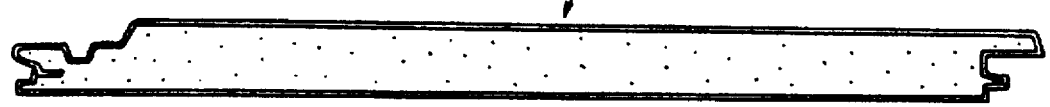
Figure 60:
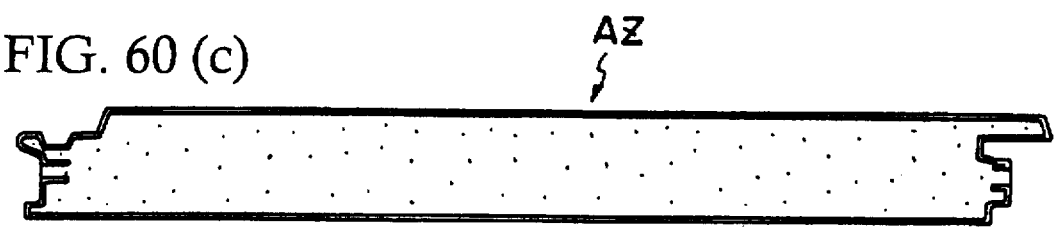
Figure 60:
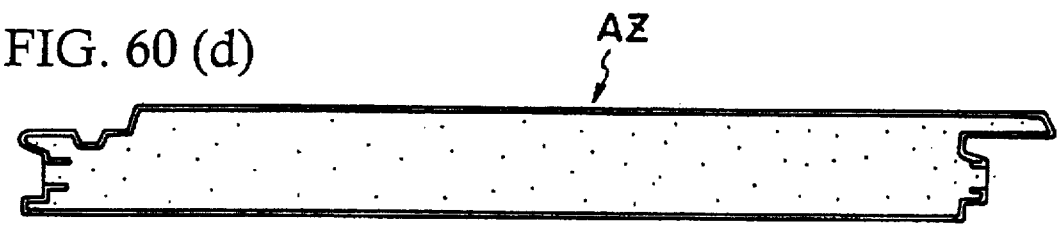
Figure 60:
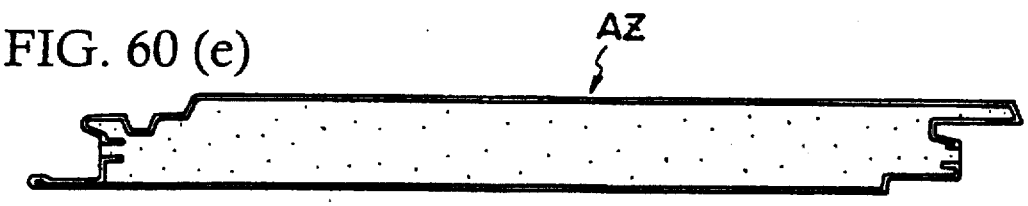
Figure 60:
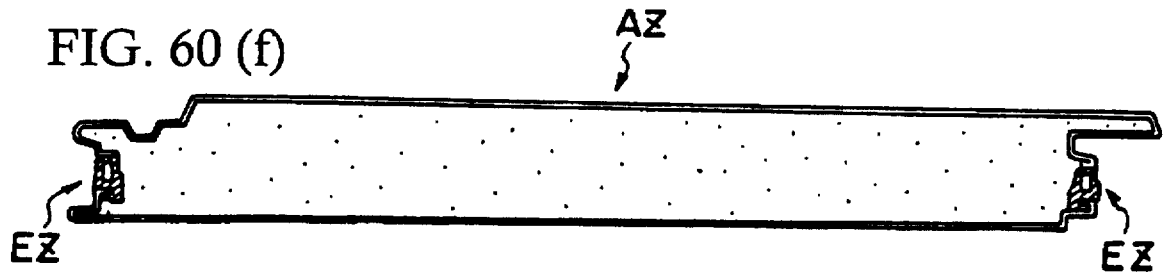

Further, as shown in FIG. 59(b), the engagement groove 25Z is proved with reinforcement ribs 30Z made of one or more convex grooves, concave grooves, or the like. The reinforcement ribs 30Z increase the strength of the mounting bracket BZ, thereby preventing the engagement groove 25Z from opening even when a pulling-force is imposed from the outside after the engagement groove 25Z is engaged with an flap section $D_3$ Z of the substrate material DZ which will be described later. Accordingly, the mounting bracket BZ is prevented from falling down from the substrate material. As shown in the drawings, the fixation section 24Z is provided with prepared holes 24aZ through which the mounting fixtures CZ penetrate. As shown in the, development, elevation of FIG. 59(c), it is preferred that the corners between the abutment section 23Z and the engagement portion 27Z have a curved shape (round shape). When a pulling-force toward the surface of the panel AZ is imposed on the engagement portion 27Z, the pulling-force is spread due to the curved shape. Accordingly, the strength of the mounting bracket BZ can be drastically increased. As shown in FIG. 56 and FIG. 57, the fixation section 24Z is a portion which is fixed to a rear portion D, Z by using the mounting fixture CZ such as rex, hex, screw vis and the like, or by welding (not shown) or other methods. As shown in FIG. 59, it is preferred to form lower holes 24aZ in advance. The engagement portion 27Z is composed of the engagement section 28Z and the fixation groove 29Z and has a shape approximately the same as the shape from the concave groove 10Z to the inner section 18Z of the male joint portion 6Z of the panel AZ. The engagement portion 27Z is interposed in the joint portion between two panels AZ and is engaged therewith, as shown in FIG. 57.

The mounting fixture CZ is a screw vis, tex, hex, or the like, and is used for integrating a fixing surface 24Z of the mounting bracket BZ and the rear portion $D_1$ Z of the substrate material DZ made of a C-shaped steel material. The fixation of the mounting bracket BZ to the substrate material DZ can be made by welding between metallic materials although it is not illustrated in the drawings. As the substrate material DZ, a C-shaped steel material having a rear portion $D_1$ Z, a side portion $D_2$ Z, and an flap portion $D_3$ Z is used as shown in FIG. 56 and FIG. 57.

Figure 36:
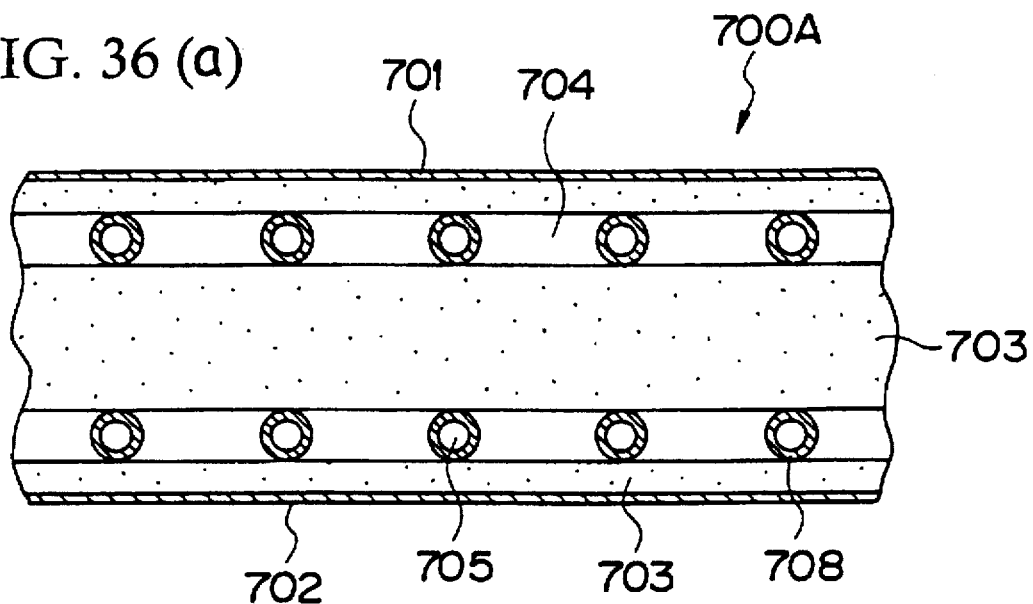
FIG. 36 presents sectional views of the essential part of still further embodiments of a refractory/heat insulating panel in which pipe-shaped members are buried.
Figure 36:
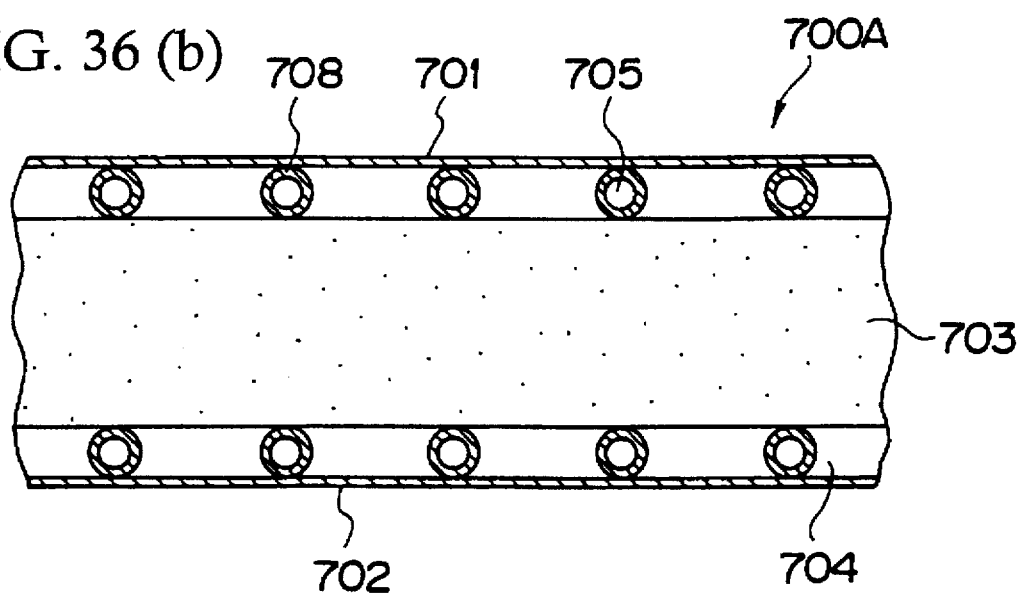

Next, an example of assembly will be briefly described. An assumption is made that the mounting bracket BZ shown in FIG. 59 and the panel AZ shown in FIG. 58(a) are used for effecting assembly such that panels horizontally extend as shown in FIG. 36 and FIG. 57. The mounting bracket BZ is formed of a stainless steel plate having a thickness of about 0.6 mm. In order to fix the male joint portion 6Z of an n-th panel A1Z to the substrate material made of the C-shaped steel, the engagement groove 25Z of the mounting bracket BZ is fitted onto the flap portion D3Z of the substrate material while the engagement portion 27Z is placed over the insertion edge 7Z.

Next, the fixation section 24Z is fixed to the rear portion D, Z of the substrate member DZ using the mounting fixture CZ made of a screw vis. Subsequently, (n+1)-th panel $A_2$ Z is hung down from the roof floor of the building by a crane, winch, or the like, and is placed on the n-th panel $A_1$ Z such that the engagement groove 15Z of the female joint portion 12Z of the (n+1)-th panel $A_2$ Z engages the insertion edge 7Z of the panel $A_1$ Z via the engagement portion 27Z of the mounting bracket BZ. With this process, the panels AZ are mounted to the substrate member DZ from the back side of the panel AZ, i.e., from the inside of the room. To completely form the wall, the above-described assembling work is successively performed from the ground sill toward the eaves. It is necessary to provide a water drip (not shown) for ground sill portions. Further, it is necessary to apply a caulking material or to attach accessories to projected corners, recessed corners, vertical joint portions, and the like.

The above-described is an example of the mounting structure of panels for buildings, and the panel AZ can be modified to have cross sections shown in FIGS. 60(a) through 60(f). Especially, in the example shown in FIG. 60(f), EZ is a packing material which is embedded in the female solid portion 21Z and the male solid portion 22Z, and which is a foamed material made from a soft silicone, rubber, plastic or the like.

Figure 61:
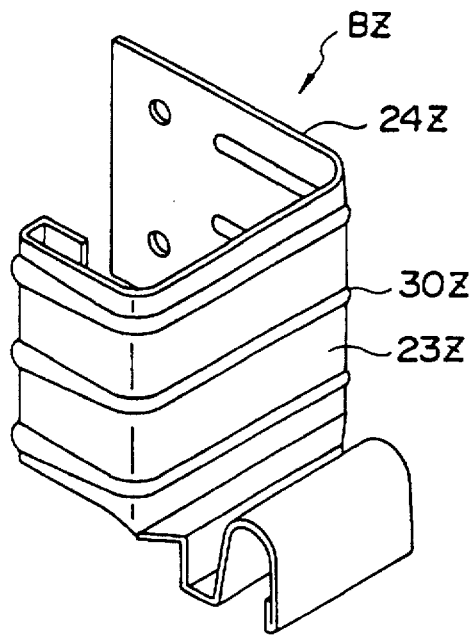
FIG. 61 presents perspective views showing other embodiments of a mounting bracket.
Figure 61:
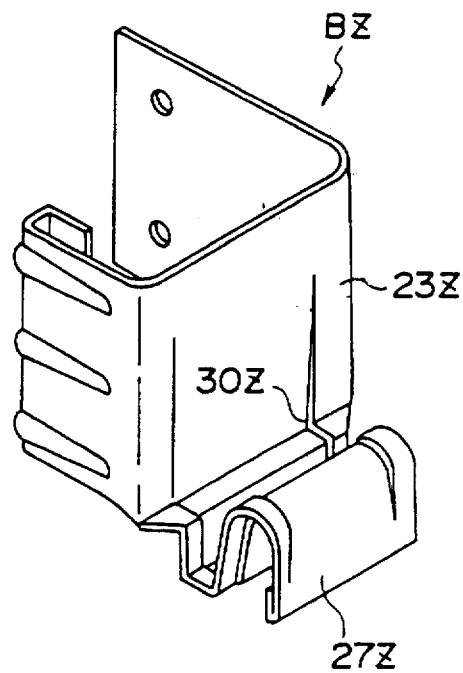
Figure 61:
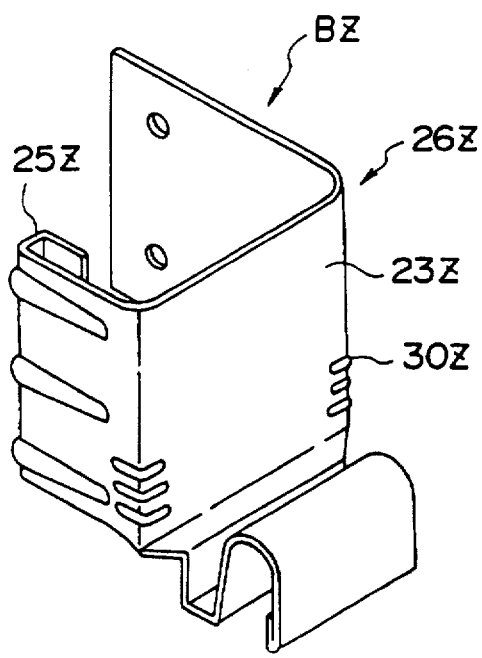
Figure 61:
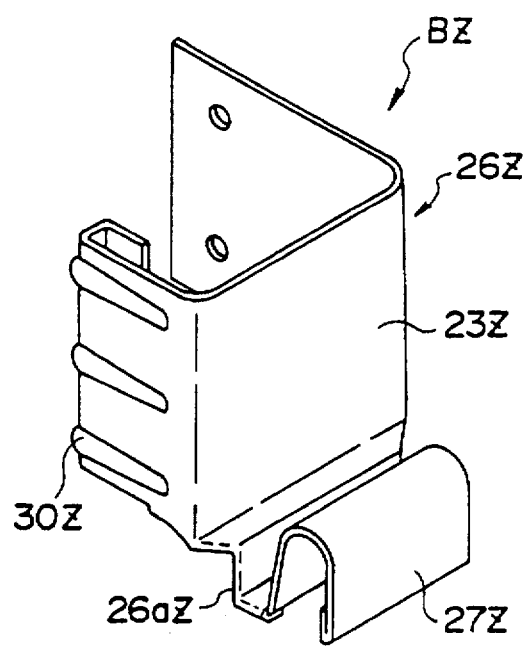
Figure 62:
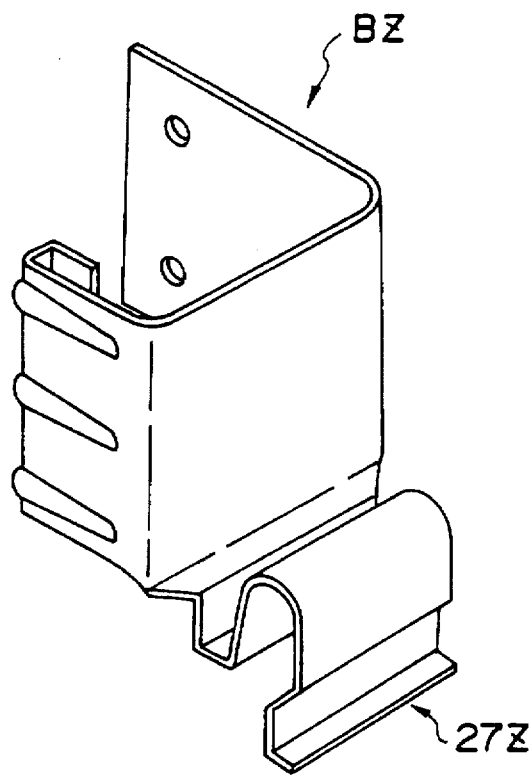
FIG. 62 presents perspective views showing still other embodiments of a mounting bracket.
Figure 62:
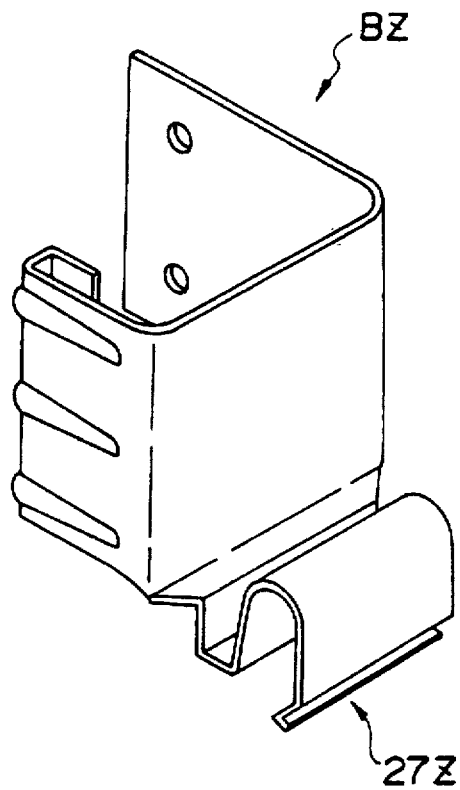
Figure 62:
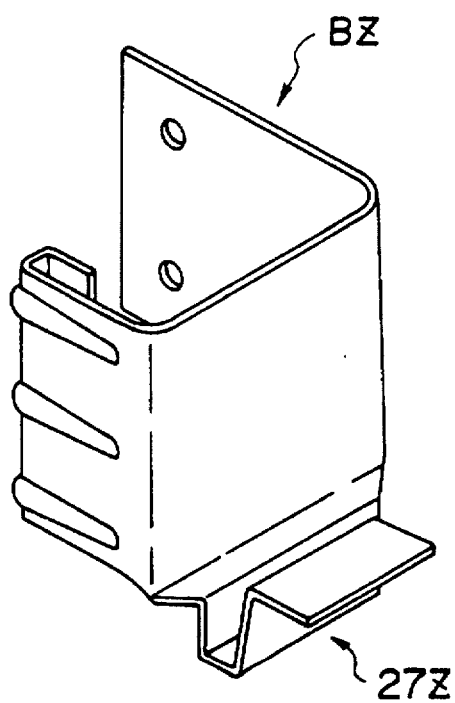
Figure 62:
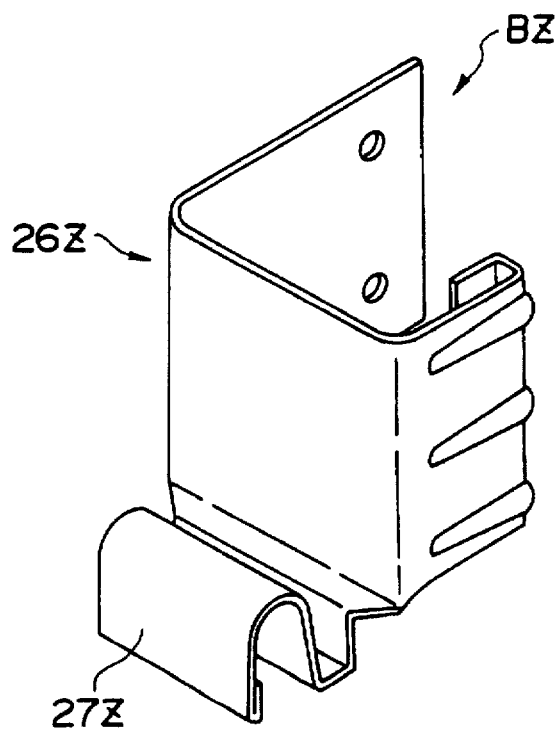
Figure 63:
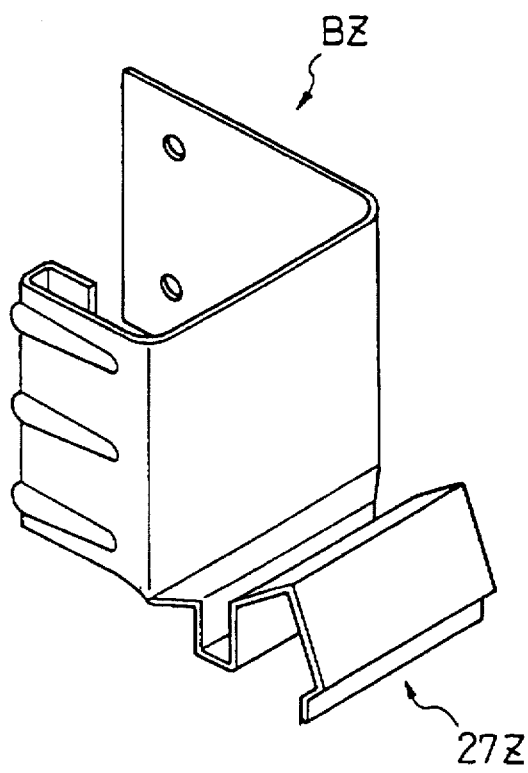
FIG. 63 presents perspective views showing still more other embodiments of a mounting bracket.
Figure 63:
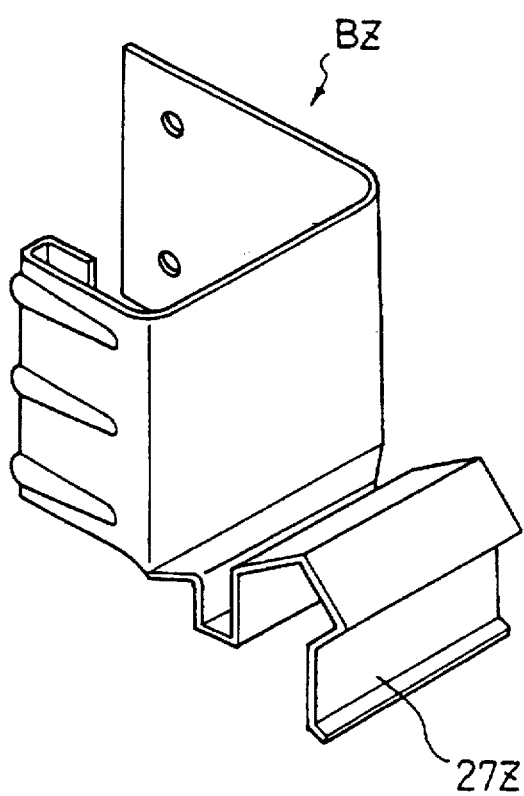
Figure 63:
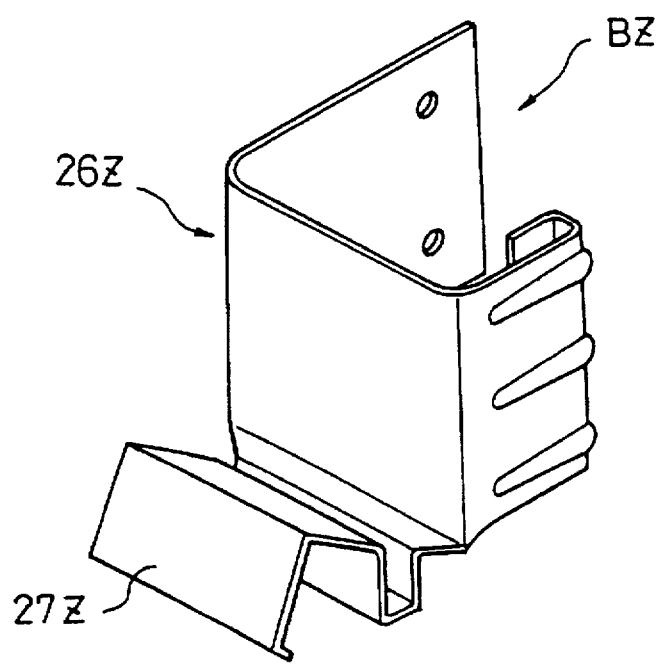

FIG. 61 and FIG. 62 show modifications of the mounting bracket BZ. In the example shown in FIG. 61(a), convex reinforcement ribs 30Z are formed on the abutment section 23Z and the fixation section 24Z as well. In the example shown in FIG. 61(b), a reinforcement rib 30Z is also formed to extend from the abutment portion 23Z to the engagement portion 27Z over the circumferential portion thereof. In the example shown in FIG. 61(c), reinforcement ribs 30Z are formed to extend from the abutment portion 23Z to the bent portions of the fixation portion 26Z. In the example shown in FIG. 61(d), there is formed a bent portion 26aZ which is formed by bending an outer edge portion extending from the lower end of the fixation portion and the end of the engagement portion 27Z, thereby increasing the strength of the mounting bracket BZ. FIG. 62(a) through FIG. 62(c) show examples in which the shape of the engagement portion 27Z is changed. FIG. 62(d) shows an example of the mounting bracket BZ which is used for the symmetrical mounting. FIG. 63(a) through FIG. 63(c) show examples in which the shape of the engagement portion 27Z is changed.

Industrial Applicability

In the refractory/heat insulating panels according to the present invention, the mechanical strength, especially the mechanical strength of the joint portion can be greatly increased as compared with the conventional ones, and the fire resistance is also greatly increased. Accordingly, the panels can easily pass the 1-hour refractory construction test of JIS-A-1304. Further, since the adhesion between the surfacing material and the core material or between the core material and the backing material are strong, no separations occur among the materials. In addition, the surfacing material and the backing material will not have deformation such as swelling and warping. The panels have excellent effects including increase in the engagement force between panels. Therefore, they markedly enhance the safety of the buildings, structures, and the like.

We claim:

1. A refractory/heat insulating panel having an integrated structure in which a core material including, as a main component, a plastic foam which itself has noncombustible properties equal to or superior to a quasi-noncombustible material is filled between a surfacing material and a backing material, each having a square shape and being noncombustible, and in which a male joint portion is provided at one of opposing sides, a female joint portion is provided at the other side, and the refractory/heat insulating panel is mountable on a building frame in a position such that the male joint portion of said refractory/heat insulating panel and the female joint portion of a second like panel may engage each other, wherein the male joint portion is provided with an upper protrusion having a predetermined thickness and extended from a decorative surface portion of the surfacing material, with a step of a thickness sufficient to receive the female joint portion being formed between the decorative surface portion and the upper protrusion, and an insertion concave portion which has a predetermined width and which is formed adjacent to a back side of the upper protrusion, said upper protrusion being provided with a fixation groove which is formed at a side portion of the upper protrusion closer to the decorative surface portion and has a sufficient depth for receiving a head portion of a fixture in a state where the fixture is attached to the building frame, and a slanted surface portion formed at a tip portion of a cover portion located outside with respect to the fixation groove and which slants toward the back side, wherein an inorganic board is entirely disposed within the upper protrusion to form a space between the inner surface of the slanted surface portion and the inorganic board, and wherein the female joint portion is provided with said cover portion which adjoins the decorative surface portion of the surfacing material and has a thickness corresponding to the amount of said step at the male joint portion, an insertion groove which is formed adjacent to a back side of said cover portion and has a shape corresponding to the shape of the tip portion of said upper protrusion, and a main convex portion which is formed adjacent to the insertion groove at a side closer to the back side of the panel and has a shape corresponding to the shape of said insertion concave portion, wherein an inorganic board is entirely disposed within the main convex portion, whereby, at the time when a second like refractory/heat insulating panel is joined with said refractory/heat insulating panel, which has already been mounted to a building frame with a fixture penetrating to the side facing the building frame through said fixation groove, in such a way that the female joint portion of said next refractory/heat insulating panel engages the male joint portion of said refractory/heat insulating panel, the tip portion of said cover portion is guided by the slanted surface portion of said upper protrusion so that said cover portion is smoothly passed over the head portion of the fixture and is brought into a jointed state in which the cover portion covers the side portion of the upper protrusion, and the upper protrusion is received by the insertion groove while said main convex portion is received by the insertion concave portion.

2. The refractory/heat insulating panel according to claim 1, in combination with an inorganic packing material, wherein when the male joint portion of said panel is joined with the main convex portion of the female joint portion of a second like panel, said inorganic packing material is interposed between the insertion concave portion of the male joint portion of said panel and said main convex portion of the female joint portion of said second panel.

3. The refractory/heat insulating panel according to claim 1, wherein the refractory/heat insulating panel is in combination with a waterproof packing material positioned so that it will be interposed between the upper protrusion of the male joint portion of said panel and the cover portion of the female joint portion of a second like panel when joined therewith.

4. The refractory/heat insulating panel according to claim 1, wherein a packing material made of EPDM is provided in the fixation groove of the male joint portion.

5. The refractory/heat insulating panel according to claim 1, wherein the core material is formed by mixing 50 to 300 parts by weight of aluminum hydroxide, 1 to 25 parts by weight of ammonium polyphosphate, 2 to 30 parts by weight of graphite, 2 to 50 parts by weight of a foaming agent, and 10 to 50 parts by weight of a curing agent, all based on 100 parts by weight of phenol foam, followed by allowing the mixture to foam and cure, to be filled in the panel.

6. The refractory/heat insulating panel according to claim 1, wherein the core material is filled such that the density at the male and female joint portions is higher than that at the center of the panel.

7. The refractory/heat insulating panel according to claim 1, wherein a nonwoven fabric is interposed between the core material and at least one of the surfacing material and the backing material.

8. The refractory/heat insulating panel according to claim 1, wherein a light-weight aggregate is closely filled at least in the core material of the male and female joint portions.

9. The refractory/heat insulating panel according to claim 1, wherein a surface of at least one of the surfacing material corresponding to the decorative surface portion which faces the core material and the backing material corresponding to the decorative surface portion which faces the core material is embossed.

10. The refractory/heat insulating panel according to claim 1, wherein a layer of at least one of isocyanurate foam and polyurethane foam is provided in the core material.

11. The refractory/heat insulating panel according to claim 1, wherein a wooden reinforcing material is embedded in the core material.

12. The refractory/heat insulating panel according to claim 1, wherein a pipe-shaped member capable of passing air therethrough is buried in the core material.

13. A mounting structure between a refractory/heat insulating panel and a substrate material, in which the refractory/heat insulating panel is formed by filling a core material between a surfacing material and a backing material, both having a square shape and being noncombustible, in which a male joint portion is provided at one of opposing sides, a female joint portion is provided at the other side, and mutual connection of panels is achieved by engagement between the male and female joint portions, and in which the substrate material is a C-shaped steel material which has a rear portion having vertical flat shape, side portions perpendicular to said rear portion, and a flap sections formed by inwardly bending a tip portions of the side portion, wherein the refractory/heat insulating panel is fixed to the substrate material by using a mounting bracket composed of a fixation portion and an engagement portion, the fixation portion being provided with a setting section corresponding to a side portion of the C-shaped steel material, a fixation section extending from one end of said setting section and corresponding to the rear portion of the C-shaped steel material, and an engagement section which is formed by being extended from the other end of the setting section to correspond to the flap section of the C-shaped steel material, and further bending a tip portion of the bent portion in a hook-like shape, said engagement section being engageable with said flap section; and the engagement portion extending from the setting section of the fixation portion in a direction opposite to the direction in which the fixation section and the engagement section extend, and having a shape corresponding to the shapes of the male and female joint portions of the refractory/heat insulating panel, and wherein refractory/heat insulating panels are joined by engaging the male joint portion and the female joint portion so that the engagement portion of the mounting bracket is interposed between the male joint portion and the female joint portion of refractory/heat insulating panels to be joined, an engagement groove portion of the mounting bracket is fitted on the flap section of the C-shaped steel material, and the fixation section is fixed to the rear portion of the C-shaped steel material with a fixture.

14. The refractory/heat insulating panel according to claim 13, wherein one or more reinforcing ribs having a concave or convex shape are formed on the engagement section of the mounting bracket.

* * * * *